(12) United States Patent
Akiyama et al.

(10) Patent No.: US 7,321,702 B2
(45) Date of Patent: Jan. 22, 2008

(54) OPTICAL MODULATOR, OPTICAL TRANSMITTER, OPTICAL MODULATING METHOD AND MANUFACTURING METHOD OF THE OPTICAL MODULATOR

(75) Inventors: Suguru Akiyama, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/041,953

(22) Filed: Jan. 26, 2005

(65) Prior Publication Data

US 2005/0254743 A1 Nov. 17, 2005

(30) Foreign Application Priority Data

May 13, 2004 (JP) ............... 2004-143575
Aug. 27, 2004 (JP) ............... 2004-248749

(51) Int. Cl.
 *G02F 1/035* (2006.01)
(52) U.S. Cl. ............... 385/3; 385/1; 385/2
(58) Field of Classification Search ............. 385/1–3
See application file for complete search history.

(56) References Cited

U.S. PATENT DOCUMENTS

| | | | | |
|---|---|---|---|---|
| 5,276,743 A | * | 1/1994 | Penner et al. ............... | 385/14 |
| 5,991,471 A | | 11/1999 | Yu | |
| 6,795,594 B2 | * | 9/2004 | Betty ............... | 385/3 |

2003/0190107 A1 10/2003 Walker

FOREIGN PATENT DOCUMENTS

| | | |
|---|---|---|
| JP | 07-199133 | 8/1995 |
| JP | 09-061766 | 3/1997 |
| JP | 2003-322831 | 11/2003 |
| JP | 2004-53830 | 2/2004 |

OTHER PUBLICATIONS

"Integrated Tunable Transmitters for WDM Network" in Session Th.1.2.1 of International Conference, European Conference on Optical Communication 2003 (ECOC'03).
"InP/GaInAsP π-phase-shifted Mach-Zehnder modulator for wavelength independent (1530-1560 nm) propagation performance at 10 Gbit/s over standard dispersive fiber" of Scientific prepublication paper journal, Electronics Letters vol. 33, p. 697 (1997).
S. Akiyama et al. "40 Gb/s InP-based Mach-Zehnder Modulator with a driving voltage of 3 Vpp" 16th International Conference on Indium Phosphide Related Materials, ThA1-4, 2004.

(Continued)

*Primary Examiner*—Jennifer Doan
(74) *Attorney, Agent, or Firm*—Kratz, Quintos & Hanson, LLP.

(57) ABSTRACT

An optical interference unit branching inputted input light into two optical waveguides, combining the respective branched lights propagating through the respective optical waveguides and outputting modulated light is included, and bias voltage supplied to at least one optical waveguide out of the two optical waveguides is controlled in accordance with wavelength of the input light. Further, a phase of the modulated light is controlled by phase adjusting voltage in accordance with the wavelength of the input light.

44 Claims, 29 Drawing Sheets

OTHER PUBLICATIONS

D. Hoffmann et al. "45 GHZ Bandwidth Traveling Wave Electrode Mach-Zehnder Modulator With Integrated Spot Size Converter" 16International Conference on Indium Phosphide Related Material, ThA1-5, 2004.

"Wavelength Tunable DFB Laser Array for WDM Application" in the session 3.3.1 of International Conference, European Conference on Optical Communication 2002 (ECOC'02).

"10Gbit/s, 1.56μ Multiquantum Well InP/InGaAsP Mach-Zehnder Optical Modulator" in pp. 471-472 of Journal of technical papers, Electronics Letters, Mar. 4, 1993, vol. 29, No. 5.

A 40-Gbit/s InP-based n-i-n Mach-Zehnder modulator with a π-voltage of 2.2 V in Session We.2.$^{5.}$2 of International conference, European Conference on Optical Communication 2003 (ECOC'03).

16$^{th}$ International Conference on Indium Phosphide Related Materials, ThA 1-5. 2004.

L.A. Coldren: "Integrated Tunable Transmitters for WDM Networks", ECOC, 2003, pp. 1-4 * abstract *.

S. Akiyama et al: "40 Gb/s InP-based Mach-Zehnder Modulator with a driving voltage of 3Vpp", International Conference on Indium Phosphide and Related Materials, May 31, 2004, pp. 581-584.

D. Hoffmann et al: "45 GHZ Bandwidth traveling wave electrode Mach-Zehnder Modulator with integrated spot size converter", International Conference on Indium Phosphide and Related Materials, May 31, 2004, pp. 585-588.

* cited by examiner

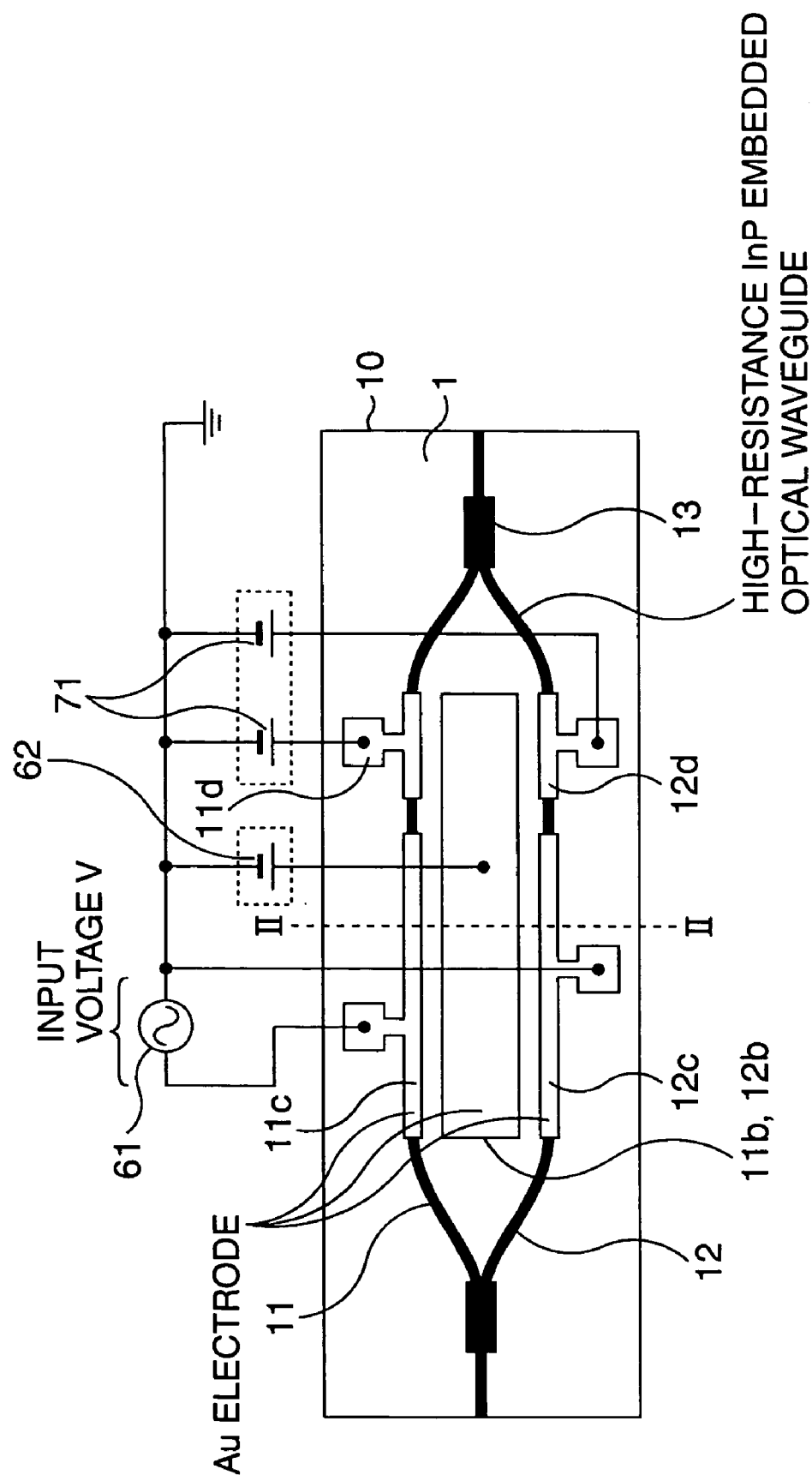

OPTICAL MODULATOR, OPTICAL TRANSMITTER, OPTICAL MODULATING METHOD AND MANUFACTURING METHOD OF THE OPTICAL MODULATOR

CROSS-REFERENCE TO RELATED APPLICATIONS

This application is based upon and claims the benefit of priority from the prior Japanese Patent Application Nos. 2004-143575, filed on May 13, 2004, and 2004-248749, filed on Aug. 27, 2004, the entire contents of which are incorporated herein by reference.

BACKGROUND OF THE INVENTION

1. Field of the Invention

The present invention relates to an optical modulator having an optical interference unit which branches inputted light into two optical waveguides and combines the respective branched lights propagating through the respective optical waveguides, an optical transmitter including the optical modulator, and an optical modulating method for modulating light inputted into an optical interferometer, and a manufacturing method of the optical modulator.

2. Description of the Related Art

As a constitution of the optical transmitter used in a WDM (Wavelength Division Multiplex) system of an intermediate/long distance transmission, the combination of a DFB laser (Distributed Feedback Laser) and the optical modulator is generally used. In the conventional WDM system, there are more than several tens of wavelength channels, and as the wavelength of the input light (continuous light) which is inputted into the optical modulator, the wavelength width is about 35 nm, for example, with the C band taken as an example. Therefore, as the optical modulator, it is desired to be able to cope with the wavelength of the input light in a wide range. This eliminates necessity to manufacture optical modulators of different structures corresponding to the respective wavelength channels of the WDM system, and therefore, great advantage can be obtained in terms of cost.

In the development for the WDM system of the next generation, studies of an optical ADM (Add/Drop Multiplex) which performs add/drop and routing in accordance with the wavelength of data, optical cross connect (OXC), optical burst switching and the like have been enthusiastically made in recent years. In this next-generation WDM system, an optical transmitter capable of widely changing the wavelength of the input light in the C-band having the wavelength bandwidth of, for example, 35 nm is required. In such an optical transmitter, a wavelength tunable laser is used as a CW (Continuous Wave) light source. In this case, as the optical modulator, an optical modulator, which can be used in the wide wavelength bandwidth capable of coping with allotment of the wide wavelength of the optical transmitter, is required.

Recently, as one of the optical modulators realizing the operation in the aforementioned wide wavelength bandwidth, a Mach-Zehnder (MZ) type of optical modulator constituted of a semiconductor material is studied. FIG. 32 is a schematic diagram of a semiconductor Mach-Zehnder type optical modulator.

A Mach-Zehnder type optical interferometer 10 is constructed on a high-resistance InP substrate 1, and an optical waveguide is formed in this Mach-Zehnder type optical interferometer 10. This optical waveguide is constituted so as to branch the continuous light inputted into one end (input end) of the Mach-Zehnder type optical interferometer 10 into two and propagates them in the Mach-Zehnder type optical interferometer 10, and irradiates the modulated light, which is generated by combining the branched and propagated lights again, from the other end (output end). Of the two branched optical waveguides, a pair of electrodes 11a and 11b are formed at an upper first arm 11, and a high-frequency driving power supply 61 for driving the optical modulator is connected to the upper first arm 11 via the pair of electrodes 11a and 11b.

A direct-current power supply 62 for biasing is connected to the high-frequency driving power supply 61. Here, voltage amplitude of the high-frequency driving power supply 61 is set as Vpp, and the bias voltage of the direct-current power supply 62 is set as Vb. Meanwhile, at a lower second arm 12, a pair of electrodes 12a and 12b are formed, and a direct-current power supply 71 for phase adjustment is connected to the lower second arm 12 via a pair of electrodes 12a and 12b. Here, the phase adjusting voltage of the direct-current power supply 71 is set as Va.

FIG. 33 is a characteristic chart showing the optical output characteristics in the input voltage of the semiconductor Mach-Zehnder type optical modulator shown in FIG. 32. What is shown in FIG. 33 is a so-called extinction curve. The horizontal axis represents the input voltage V between the electrodes of the first arm and the vertical axis represents the optical output. When the input voltage V is 0, namely, the input voltage is low-level in FIG. 33, the light propagating through the first arm 11 is the light of the same phase as the light propagating through the second arm 12. Accordingly, when both of them are combined at the output end of the Mach-Zehnder type optical interferometer 10, modulated light with the same intensity as the input light is regenerated. In this manner, the on level of the modulated light is outputted.

When the input voltage V is increased from 0, the refractive index of the light, which propagates through the first arm 11, also changes. As a result, the light propagating through the first arm 11 has a phase difference with respect to the light propagating through the second arm 12. When the input voltage V reaches a magnitude of some extent, namely, at high-level input voltage, the phase difference between the light propagating through the first arm 11 and the light propagating through the second arm 12 becomes $\pi$, and when both of them are combined at the output end of the Mach-Zehnder type optical interferometer 10, they cancel each other out, which results in extinction. In this manner, the off level of the modulated light is outputted. Here, the on level and the off level of the modulated light are respectively set at 0 and $\pi$, but if they are respectively set at the values which are the results of adding or subtracting an integral multiple of $2\pi$ to or from 0 and $\pi$, the modulation is similarly possible.

FIG. 34 is a characteristic chart of the phase difference (phase difference between the arms) of the light propagating through each of the arms with respect to the input voltage of the semiconductor Mach-Zehnder type modulator shown in FIG. 32. Here, the horizontal axis represents the input voltage V between the electrodes of the first arm 11 and the vertical axis represents the phase difference of the light propagating through the first arm 11 and the light propagating through the second arm 12. In an ordinary Mach-Zehnder type optical modulator, the amplitude Vpp of the high-frequency driving power supply 61 is set so that the phase difference of the lights from the respective arms changes from 0 to $\pi$ between the on level and the off level, as shown in FIG. 34. As a result, it is possible to modulate the maximum optical output intensity and the minimum optical output intensity on the extinction curve shown in FIG. 33 respectively corresponding to the on level and the off level of the light.

In the general Mach-Zehnder type optical modulator, the low level and the high level of the input voltage V respectively correspond to the on level and the off level of the optical output as shown in FIG. 33. Namely, when the input voltage V is high-level, the optical output becomes off-level, and when the input voltage V is low-level, the optical output becomes on-level. In this case, in the input voltage V, the central position of the input voltage applied at the time of the on level of the modulated light and the input voltage applied at the time of off level is set by the bias voltage Vb of the direct-current power supply 62. Accordingly, when the input voltage V is changed from 0 to Vpp, the bias voltage Vb is set at (Vpp/2).

As shown in FIG. 34, in the semiconductor Mach-Zehnder type optical modulator, the phase difference of the lights propagating through the respective arms nonlinearly increases with respect to the input voltage V, and its gradient increases as the input voltage V becomes larger. This non-linear characteristic remarkably appears, for example, by constructing the core layer of the optical waveguide by a multiple quantum well (MQW) layer, and utilizing the electro-optical effect by the quantum-confined Stark effect. In the extinction curve in FIG. 33, the space between the mountain and the valley is shown to be gradually shorter. This results from the above-described nonlinear characteristic with respect to the input voltage V, and is the characteristic peculiar to a semiconductor. As for the operation of the semiconductor Mach-Zehnder type optical modulator in the wide wavelength bandwidth, there are conventionally several known examples.

For example, the semiconductor Mach-Zehnder type optical modulator described in the following Non-patent Document 1 is cited. FIG. 35 is a diagram showing a setting method of the drive condition with respect to a channel with short wavelength and a channel with long wavelength of the semiconductor Mach-Zehnder type optical modulator in the Non-patent Document 1. As shown in FIG. 35, in the extinction curve of the channel with short wavelength, the input voltage V before the extinction is small, while in the extinction curve of the channel with long wavelength, the input voltage V before extinction is large.

For the extinction curve having such a characteristic, in the semiconductor Mach-Zehnder type optical modulator in the Non-patent Document 1, the amplitude Vpp of the high-frequency driving power supply 61 is set by being changed in accordance with the wavelength of the input light as shown in FIG. 35. Namely, when the wavelength of the input light is short wavelength, the amplitude Vpp is set to be comparatively small (Vpp1), and when the wavelength of the input light is long wavelength, the amplitude Vpp is set to be comparatively large (Vpp2). In the Non-patent Document 1, the amplitude Vpp of the high-frequency driving power supply 61 is controlled in accordance with the wavelength of the input light, and thereby, the maximum optical output intensity and the minimum optical output intensity of the extinction curve for the wavelength of each of various input lights are modulated respectively corresponding to the on level and the off level of each of the lights.

There is also the semiconductor Mach-Zehnder type optical modulator described in the following Non-patent Document 2. FIG. 36 is a diagram showing a setting method of the drive condition with respect to the channel with short wavelength and the channel with long wavelength of the semiconductor Mach-Zehnder type optical modulator in the Non-patent Document 2. In this Non-patent Document 2, the amplitude Vpp of the high-frequency driving power supply 61 is set as the same with respect to the wavelengths of different input lights, and with the case where the wavelength of the input light is shortwave as the reference, the maximum optical output intensity and the minimum optical output intensity of the extinction curve are modulated respectively corresponding to the on level and the off level.

In the optical transmitter (optical modulator), it is desired to suppress the change of the wavelength which occurs accompanying the optical intensity modulation, namely, so-called wavelength chirping to be small (low wavelength chirping operation). This is because the intensity waveform of the light which is transmitted is lost due to wavelength dispersion of the optical fiber if the wavelength chirping is large, and as a result, the transmitting distance is limited to be short.

Especially in a optical transmitting system for medium/long distance transmission, it is required to make the total dispersion of the transmission line zero by using a dispersion compensating fiber, and to make the wavelength chirping of the optical transmitter (optical modulator) substantially equal to zero. This makes it possible to provide the system capable of keeping favorable waveform quality irrespective of the transmission distance and insusceptible to the fluctuation of the total dispersion amount of the transmission line.

In order to realize low wavelength chirping, it is general to use a semiconductor laser (for example, a laser diode LD) emitting continuous light, and an external modulator which modulates the intensity of the continuous light in accordance with the input electrical signal in combination, as an optical transmitter. Among the external modulators, a Mach-Zehnder type optical modulator of push-pull drive is considered to be promising because it can realize zero chirping in theory.

Here, FIGS. 37A and 37B are schematic diagrams showing the constitution of the semiconductor Mach-Zehnder type optical modulator of push-pull drive. FIG. 37B is a sectional view in the line XI-XI in FIG. 37A.

In the semiconductor Mach-Zehnder type optical modulator which performs a push-pull operation, the Mach-Zehnder optical interferometer is constructed by two optical waveguides (arms) 50A and 50B, and two optical couplers 51 and 52 as shown in FIG. 37A, and the continuous light incident from one end portion is temporarily branched at the optical coupler 51, and is guided to the two arms 50A and 50B, after which, the branched lights are coupled by the optical coupler 52 again, and the modulated light is emitted from the other end portion. The optical waveguides 50A and 50B have the structure in which an optical waveguide core layer 55 is sandwiched by an upper and lower conductive semiconductor clad layers 53 and 54 as shown in FIG. 37B. As shown in FIGS. 37A and 37B, electrodes 56A and 56B are respectively formed on the two arms 50A and 50B. Further, as shown in FIG. 37A, driving power supplies 57 and 58 are respectively connected to these electrodes 56A and 56B, so that electrical signals (voltage) are inputted into the respective electrodes 56A and 56B from these driving power supplies 57 and 58. These electrodes are called signal electrodes. As shown in FIG. 37B, an electrode 59 is formed on a lower side (backside) of the optical waveguides 50A and 50B via the conductive semiconductor clad layer 54. This electrode 59 is grounded and at the ground potential, and therefore, called a ground electrode.

When the electrical signals are inputted into the signal electrodes 56A and 56B from the two driving power supplies 57 and 58, voltage is applied to the respective two arms 50A and 50B, and the respective refractive indexes of the two arms 50A and 50B change in accordance with the magnitude of the applied voltage due to the electro-optical effect.

Next, the operation of the Mach-Zehnder type optical modulator utilizing the electro-optical effect constituted as above will be explained.

First, when the ON state of light is to be outputted, the voltage of V0 is equally applied to the respective electrodes 56A and 56B on the two arms 50A and 50B. In this case, the refractive indexes of the two arms 50A and 50B respectively change due to the electro-optical effect. As a result, the phases of the lights propagating through the insides of the two arms 50A and 50B after branched at the optical coupler 51 change as compared with those when the voltage is zero. However, since the equal voltage is given to the two arms 50A and 50B, the change amounts of the phases of the lights propagating through the two arms 50A and 50B are equal. Accordingly, when these lights are coupled with the optical coupler 52 again, the phases of these lights become equal, and therefore, the light with the same intensity as the original incident light is regenerated. By outputting the light which is regenerated to have the same intensity as the incident light, the ON state of the light is outputted.

Meanwhile, when the OFF state of light is to be outputted, voltage of V0±ΔV is applied to the respective electrodes 56A and 56B on the two arms 50A and 50B. In this case, the refractive indexes of the two arms 50A and 50B change due to the electro-optical effect, and the refractive index of the one arm 50A (or 50B) becomes low, while the refractive index of the other arm 50B (or 50A) becomes high. As a result, after the light is branched at the optical coupler 51, the phase of the light propagating through the one arm 50A (or 50B) delays and the phase of the light propagating through the other arm 50B (or 50A) advances, with the case where the light is brought into the ON state as the reference. Namely, when the phase in the case where the light is brought into the ON state is set at zero, and the side to which the phase advances is set as positive, and the side to which the phase delays is set as negative, the phases of the lights propagating through the insides of the two arms 50A and 50B change to the opposite signs from each other. The ΔV is determined so that the phase difference between these lights becomes π radian (180°) after the lights respectively propagate through the two arms 50A and 50B. Therefore, when these lights are coupled with the optical coupler 52 again, these two branched lights cancel each other out to be extinct. As a result, the optical intensity practically becomes zero, and the OFF state of the light is outputted.

In the Mach-Zehnder type optical modulator of push-pull type, the changes in the voltage applied to the two arms 50A and 50B are the same in amount and are opposite in sign on the occasion of the change of the state of ON to OFF (or OFF to ON) of light as described above. Accordingly, the changes in phase which the lights propagating through the two arms 50A and 50B receive on the occasion of change in the applied voltage are the same in amount and are opposite in sign. As a result, when the lights propagating through the two arms 50A and 50B are coupled with the optical coupler 52 again, the phase of the multiplexed light is always kept constant (except the part changing with the frequency of light). This indicates that the wavelength chirping expressed by the phase change of light per unit time becomes zero.

Incidentally, for example, Patent Document 1 describes that in the push-pull type Mach-Zehnder optical modulator as shown in FIGS. 37A and 37B, the wavelength chirping amount can be controlled by adjusting the length of the electrodes formed on the two arms.

Namely, when the lengths of the electrodes on the two arms are made equal, the phase changes of the lights propagating through the two arms become the same in amount and opposite in sign from each other as described above, and therefore, the wavelength chirping becomes zero chirping.

On the other hand, when the length of the electrode formed on one of the arms is made long, and the length of the electrode formed on the other arm is made short, namely, when the electrode lengths are made asymmetrical between the two arms, the phase change amounts of the lights propagating through the two arms become different. Namely, the light propagating through the arm on which the electrode of the longer electrode length is formed receives a larger phase change. In this case, the phase of the multiplexed light does not become constant when the lights propagating through the two arms are coupled with the optical coupler again, but the phase of the multiplexed light changes on the occasion of the change of the state of ON/OFF (or OFF/ON). As a result, chirping which is not zero occurs to the coupled light with the optical coupler. The wavelength chirping amount changes in accordance with asymmetry property of the electrode lengths.

As the Mach-Zehnder type optical modulator which performs a push-pull operation as in FIGS. 37A and 37B, there is a Mach-Zehnder type optical modulator having a capacitively loaded type electrode structure as shown in FIGS. 38A and 38B. The Mach-Zehnder type optical modulator having such a capacitively loaded type electrode structure (a kind of traveling-wave electrode) has been proposed as the modulator using GaAs related materials at first, and the GaAs related materials have been mainly studied.

Here, FIGS. 38A and 38B respectively show a plan view and a sectional view of the capacitively loaded type of Mach-Zehnder type optical modulator.

As shown in FIG. 38A, coplanar/slot-line type traveling-wave electrodes 123 and 124 which become high-frequency transmission lines are formed at both sides of two arms (optical waveguides) 120A and 120B. Electrodes 127 and 128 are discretely formed on the two arms 120A and 120B. These discrete electrodes 127 and 128 are respectively connected to the slot-line type traveling-wave electrodes 123 and 124. Portions provided with the discrete electrodes 127 and 128 function as microscopic phase modulators 132. The lengths of the discrete electrodes 127 and 128 are all the same. Namely, all the discrete electrodes 127 and 128 formed on the respective arms 120A and 120B have the same length, and when compared between the two arms 120A and 120B, the discrete electrodes 127 and 128 have the same length.

In the Mach-Zehnder type optical modulator having such a capacitively loaded type of electrode structure, an electrical signal for modulation is inputted from an end portion of one of the coplanar/slot-line type electrodes 123 and 124, and propagates on the slot-line type electrodes 123 and 124 while supplying voltage to the discrete electrodes 127 and 128 which are discretely formed. In this electrode structure, the loss is small when the electrical signal for modulation propagates through the traveling-wave electrodes, and therefore, a wide-range modulation operation is possible.

Here, of two coplanar/slot-line type electrodes, the electrode (signal electrode, signal side electrode) 123 connected to a signal terminal of a driving power supply (high-frequency driving power supply) 125 which supplies the modulation signal is formed to be narrower in the width of the electrode as compared with the electrode (ground electrode, ground side electrode) 124 which is connected to a ground terminal. Namely, in the capacitively loaded type of Mach-Zehnder type optical modulator, the shapes of the slot-line electrodes 123 and 124 connected to the discrete electrodes 127 and 128 formed on the two arms 120A and 12B are asymmetrical.

As shown in FIG. 38B (sectional view in the line XII to XII in FIG. 38A), each of the two optical waveguides 120A and 120B has the structure in which the optical waveguide core layer 103 is sandwiched by the conductive semiconductor layers 102 and 104 as the clad layers. The high-frequency driving power supply 125 for modulation is connected to the discrete electrodes 127 and 128 which are formed on the two arms (optical waveguides) 120A and 120B via the two slot-line electrodes 123 and 124. The two arms 120A and 120B are electrically connected in series to the high-frequency driving power supply 125 via a conductive semiconductor layer 102 below the arms 120A and 120B.

Accordingly, the modulation voltage V supplied from the high-frequency driving power supply 125 is distributed in the opposite directions in the same magnitude and applied to the respective core layers of the two arms 120A and 120B as shown in FIG. 38B.

As described above, in the capacitively loaded type Mach-Zehnder optical modulator, by applying the voltage for modulation to the two arms 120A and 120B, namely, the optical waveguide core layers 103, push-pull modulation operation is possible as in the push-pull drive type of Mach-Zehnder type optical modulator as shown in FIGS. 37A and 37B. Accordingly, a zero chirping operation is also expected in the capacitively loaded type Mach-Zehnder optical modulator.

As a control method of the wavelength chirping in the capacitively loaded type Mach-Zehnder optical modulator, there is the one described in Patent Document 2, for example.

Patent Document 2 describes that in a capacitively loaded type Mach-Zehnder optical modulator made of GaAs related materials, the lengths of the electrodes formed on the two arms (optical waveguides) are made equal to provide the symmetrical structures, and thereby, zero chirping is realized. In Patent Document 2, by connecting an extra electric capacitive component to one of the electrodes in parallel while keeping the lengths of the electrodes formed on the two arms equal, chirping which is not zero is realized. This is because the magnitude of the voltage applied to the arm (optical waveguide) becomes smaller in the electrode to which the extra electric capacitive component is connected as compared with that in the other, and thereby, a difference occurs to the magnitudes of the phase changes of the lights propagating through the two arms.

Incidentally, it is studied to constitute the capacitively loaded type Mach-Zehnder modulator by InP related materials as shown in FIGS. 38A and 38B.

For example, in Non-patent Documents 3 and 4, it is described that the clad layers made of InP, and the optical waveguide core layer constituted of MQW (multiple quantum well) of InGaAsP are formed on an InP substrate, and the capacitively loaded type Mach-Zehnder modulator is constructed.

As the characteristics of the InP related materials, it is cited that the wavelength which causes band edge absorption (absorption edge wavelength) is near 1.3 µm band or 1.55 µm band of the operating wavelength in the ordinary optical communication system. Thus, the InP related materials have the characteristic that the change in the refractive index per unit length and unit voltage due to the electro-optical effect is large as compared with the other semiconductor materials such as GaAs, and dielectric materials such as $LiNbO_3$. Therefore, in the Mach-Zehnder type optical modulator made of InP related materials, it is possible to shorten the element length as compared with the optical modulators made of the other materials.

Since the wavelength which generates the band end absorption is near the operating wavelength as described above, in the case of using the InP related materials, there is a different point that loss due to absorption occurs to the light propagating through the optical waveguide from the case where the other materials are used. The absorption amount of light changes in accordance with the voltage which is applied to the optical waveguide.

Besides these arts, there are the arts described in, for example, Patent Documents 3 to 5 as the arts for adjusting chirping in the Mach-Zehnder type optical modulators.

[Patent Document 1] U.S. Pat. No. 5,991,471

[Patent Document 2] U.S. Patent Application Publication No. 2003/0190107

[Patent Document 3] Japanese Patent Application Laid-open No. 2003-322831

[Patent Document 4] Japanese Patent Application Laid-open No. 7-199133

[Patent Document 5] Japanese Patent Application Laid-open No. 9-61766

[Patent Document 6] Japanese Patent Application Laid-open No. 2004-53830

[Non-patent Document 1] "INTEGRATED TUNABLE TRANSMITTERS FOR WDM NETWORK" in Session Th.1.2.1 of International Conference, European Conference on Optical Communication 2003 (ECOC'03)

[Non-patent Document 2] "InP/GaInAsP π-shifted Mach-Zehnder modulator for wavelength independent (1530-1560 nm) propagation performance at 10 Gb/s over standard dispersive fiber" of Scientific prepublication paper journal, Electronics Letters vol. 33, 697 page, (1997)

[Non-patent Document 3] S. Akiyama et al. "40 Gb/s InP-based Mach-Zehnder Modulator with a driving voltage of 3 VPP" 16th International Conference on Indium Phosphide Related Materials, ThA1-4, 2004

[Non-patent Document 4] D. Hoffmann et al. "45 GHZ BANDWITH TRAVELLING WAVE ELECTRODE MACH-ZEHNDER MODULATOR WITH INTEGRATED SPOT SIZE CONVERTER" 16th International Conference on Indium Phosphide Related Materials, ThA1-5, 2004

[Non-patent Document 5] "Wavelength Tunable DFB Laser Array for WDM Application" in the session 3.3.1 of International Conference European Conference on Optical Communication 2002 (ECOC'02)

[Non-patent Document 6] "10 Gbit/s, 1.56 µm MULTI-QUANTUM WELL InP/InGaAsP MACH-ZEHNDER OPTICAL MODULATOR" in pages 471 to 472 of Journal of technical papers, ELECTRONICS LETTERS, 4 Mar. 1993, Vol. 29, No. 5

[Non-patent Document 7] "A 40-Gbit/s InP-based n-i-n Mach-Zehnder modulator with a π-voltage of 2.2 V" in Session We.2.5.2 of International conference, European Conference on Optical Communication 2003 (ECOC'03)

[Non-patent Document 8] 16th International Conference on Indium Phosphide Related Materials, ThA1-5. 2004

However, in Non-patent Document 1, the amplitude Vpp of the high-frequency driving power supply 61 is controlled in accordance with the wavelength of the input light, and therefore, it is necessary to prepare the high-frequency driving power supply 61 which makes the amplitude variable corresponding to the wavelengths of various input lights, but there exists the problem that use of such a high-frequency driving power supply 61 causes rise in cost of the optical transmitter, complication of the structure and huge apparatus construction.

In Non-patent Document 2, there is the problem that the quality deterioration of the optical output waveform occurs dependently on the wavelength of the input light.

Here, the explanation will be made more specifically with the example shown in FIG. 36. In FIG. 36, when the wavelength of the input light is long wavelength, the on level of light is smaller than the maximum optical output on the extinction curve. In order to obtain favorable optical modulation waveform in the Mach-Zehnder type optical modulator, it is generally necessary to modulate the maximum optical output intensity and the minimum optical output intensity on the extinction curve corresponding to the on level and the off level. This is because the gradient of the optical output intensity with respect to the input voltage V is zero at the maximum optical output intensity and the minimum optical output intensity of this extinction curve, and therefore, even if the voltage changes in the vicinity of this input voltage, it hardly has the influence on the optical output. The on level of the light in the case where the wavelength of the input light is long wavelength shown in FIG. 36 is not the maximum optical output on the extinction curve, and therefore, there is the fear that the on level of the light cannot be kept when the voltage change due to the influence of noise, bandwidth limitation and the like occurs to the input voltage V.

In the push-pull type Mach-Zehnder optical modulator as in Patent Document 1, the wavelength chirping amount can be controlled by adjusting the electrode length, and therefore, zero chirping can be obtained by properly designing the electrode lengths (specifically, by making the electrode lengths symmetrical). The same applies to the capacitively loaded type Mach-Zehnder modulator made of GaAs related materials, and zero chirping can be obtained by making the electrode lengths symmetrical. However, it has become apparent through the experiment by the inventor of the invention that even if the electrode lengths are made equal, and symmetrical between the two arms (optical waveguides) in the capacitively loaded type Mach-Zehnder modulator using InP related materials, zero chirping is not practically realized.

Here, the reason why zero chirping is not realized even if the electrode lengths are made equal, and symmetrical between the two arms (optical waveguides) is considered that the peculiar phenomenon to the InP related materials occurs, in which not only the refractive indexes of the optical waveguides but also the absorption indexes of the optical waveguides change at the same time by the voltage applied to the optical waveguides (arms) in the Mach-Zehnder modulator made of the InP related materials as described above. In the case of the capacitively loaded type electrode structure, the reason is further considered that the structures of the electrodes are asymmetrical between the two arms (optical waveguides). When the absorption indexes of the optical waveguides change with respect to the voltage, the way of influencing the wavelength chirping is complicated as compared with the case of the simple electrode structure as shown in FIGS. 37A and 37B because the structures of the electrodes are asymmetrical between the two arms (optical waveguides).

As described above, in the conventional capacitively loaded type Mach-Zehnder modulator made of the InP related materials, zero chirping is not obtained due to the optical absorption characteristic of the optical waveguides and asymmetrical electrode placement even when the electrode lengths are symmetrical. The relationship between asymmetry property of the electrode lengths and the wavelength chirping differs from the known relationship in an ordinary push-pull type Mach-Zehnder optical modulator, and is unclear. Therefore, in the capacitively loaded type Mach-Zehnder modulator made of InP related materials, the design of the optimal electrode lengths to obtain zero chirping is unclear, and as a result, zero chirping cannot be obtained by the adjustment of the electrode lengths as in the ordinary push-pull type Mach-Zehnder optical modulator. As a result, there arises the problem that the optical output waveform is lost and the quality deterioration of the optical output waveform occurs.

SUMMARY OF THE INVENTION

The present invention is made in view of the above-described problems, and has an object to provide an optical modulator, an optical transmitter, an optical modulating method and a manufacturing method of the optical modulator which realize generation of an optical output waveform of high quality with a simple apparatus constitution.

An optical modulator of the present invention includes an optical interference unit branching inputted input light into two optical waveguides, and combining respective branched lights propagating through the respective optical waveguides and outputting the combined light, a phase adjusting voltage supplier supplying voltage to adjust a phase of the propagating light to at least one optical waveguide out of the two optical waveguides, a direct-current voltage supplier supplying direct-current voltage to at least one optical waveguide out of the two optical waveguides, and a direct-current voltage controller controlling a value of the direct-current voltage supplied by the direct-current voltage supplier, in accordance with wavelength of the input light.

Another mode in the optical modulator of the present invention is that the direct-current voltage controller controls the value of the direct-current voltage so that a phase difference between the respective branched lights changes by an amount of $\pi$ between an on level and an off level of the combined light.

Still another mode in the optical modulator of the present invention further includes a phase adjustor adjusting a phase of at least one of the respective branched lights.

Still another mode in the optical modulator of the present invention is that the aforesaid phase adjustor adjusts a phase of at least one of the respective branched lights so that a phase difference between the respective branched lights becomes zero at a low level or a high level of the voltage supplied by the phase adjusting voltage supplier, and the combined light of an on level is outputted.

Still another mode in the optical modulator of the present invention includes a first and a second optical waveguides formed by InP related materials and constituting an optical interference unit, a first line electrode formed at a side of the first optical waveguide, a second line electrode formed at a side of the second optical waveguide and having a larger width than the first line electrode, a plurality of first discrete electrodes discretely formed on the first optical waveguide and connected to the first line electrode, and a plurality of second discrete electrodes discretely formed on the optical waveguide and connected to the second line electrode, wherein a plurality of first phase modulators are constituted by the plurality of first discrete electrodes and the first optical waveguide located below the plurality of first discrete electrodes, a plurality of second phase modulators are constituted by the second discrete electrodes and the second optical waveguide located below the second discrete electrodes, and a total operation length obtained by adding up respective effective operation lengths (the lengths of the parts at which light is practically modulated) of the plurality of second phase modulators is constituted to be longer than a total operation length obtained by adding up operation lengths of the plurality of first phase modulators.

Still another mode in an optical modulator of the present invention includes a first and a second optical waveguides formed by InP related materials and constituting an optical interference unit, a first line electrode formed at a side of the first optical waveguide, a second line electrode formed at a side of the second optical waveguide and having a larger width than the first line electrode, a plurality of first discrete electrodes discretely formed on the first optical waveguide and connected to the first line electrode, and a plurality of second discrete electrodes discretely formed on the second optical waveguide and connected to the second line electrode, wherein in a case of a drive condition that optical output becomes small when an absolute value of applied voltage of a negative sign applied to the second discrete electrodes is made large, with a total electrode length obtained by adding up respective lengths of the plurality of second discrete electrodes set as LG, a total electrode length obtained by adding up respective lengths of the plurality of first discrete electrodes set as LS, and an electrode length asymmetry parameter set as r=(LG−LS)/(LG+LS), a value of the electrode length asymmetry parameter r is constituted to be within a range of 0.05 to 0.17.

Still another mode in the optical modulator of the present invention includes a first and a second optical waveguides formed by InP related materials and constituting an optical interference unit, a first line electrode formed at a side of the first optical waveguide, a second line electrode formed at a side of the second optical waveguide and having a larger width than the first line electrode, a plurality of first discrete electrodes discretely formed on the first optical waveguide and connected to the first line electrode, and a plurality of second discrete electrodes discretely formed on the second optical waveguide and connected to the second line electrode, wherein in a case of a drive condition that optical output becomes large when an absolute value of applied voltage of a negative sign applied to the second discrete electrodes is made large, with a total electrode length obtained by adding up respective lengths of the plurality of second discrete electrodes set as LG, a total electrode length obtained by adding up respective lengths of the plurality of first discrete electrodes set as LS, and an electrode length asymmetry parameter set as r=(LG−LS)/(LG+LS), a value of the electrode length asymmetry parameter r is constituted to be within a range of 0.17 to 0.36.

Still another mode in the optical modulator of the present invention includes a first and a second optical waveguides formed by InP related materials and constituting an optical interference unit, a first line electrode formed at a side of the first optical waveguide, a second line electrode formed at a side of the second optical waveguide and having larger width than the first line electrode, a plurality of first discrete electrodes discretely formed on the first optical waveguide and connected to the first line electrode, and a plurality of second discrete electrodes discretely formed on the second optical waveguide and connected to the second line electrode, wherein an light confinement factor of the second optical waveguide is constituted to be larger than a light confinement factor of the first optical waveguide.

An optical transmitter of the present invention includes the aforesaid optical modulator, and a wavelength tunable laser device inputting the input light to the optical interference unit of the aforesaid optical modulator by tuning the wavelength.

Another mode of the optical transmitter of the present invention includes the aforesaid optical modulator, and a wavelength fixed laser device inputting the input light to the optical interference unit of the aforesaid optical modulator by fixing the wavelength.

An optical modulation method of the present invention is the optical modulation method on an occasion of branching inputted input light into two optical waveguides, combining the respective branched lights propagating through the respective optical waveguides and outputting the combined light, including the step of controlling a value of direct-current voltage supplied to at least one optical waveguide out of the two optical waveguides in accordance with wavelength of the input light.

A manufacturing method of an optical modulator of the present invention is a manufacturing method of the optical modulator including a first and a second optical waveguides formed by InP related materials and constituting an optical interference unit, a first line electrode formed at a side of the first optical waveguide, a second line electrode formed at a side of the second optical waveguide and having a larger width than the first line electrode, a plurality of first discrete electrodes discretely formed on the first optical waveguide and connected to the first line electrode, and a plurality of second discrete electrodes discretely formed on the second optical waveguide and connected to the second line electrode, including the steps of setting respective electrode lengths of the first discrete electrode and the second discrete electrode based on a characteristic indicating relationship between a chirp parameter indicating a chirping amount and an electrode length asymmetry parameter indicating asymmetry property of the electrode length, and manufacturing the optical modulator so that the respective electrode lengths of the first discrete electrode and the second discrete electrode become the respective set electrode lengths.

Further, a manufacturing method of an optical modulator of the present invention is a manufacturing method of an optical modulator including a first and a second optical waveguides formed by InP related materials and constituting an optical interference unit, a first line electrode formed at a side of the first optical waveguide, a second line electrode formed at a side of the second optical waveguide and having a larger width than the first line electrode, a plurality of first discrete electrodes discretely formed on the first optical waveguide and connected to the first line electrode, and a plurality of second discrete electrodes discretely formed on the second optical waveguide and connected to the second line electrode, including the steps of setting widths of the first and second optical waveguides based on a characteristic indicating relationship between a chirp parameter indicating a chirping amount and the width of the optical waveguide, and manufacturing the optical modulator so that the respective widths of the first and second optical waveguides become the respective set widths.

BRIEF DESCRIPTION OF THE DRAWINGS

FIG. 8 is a schematic block diagram of a semiconductor Mach-Zehnder type optical modulator in a third embodiment of the present invention;

FIG. 17A shows a structure used for calculation of the chirp parameter α, and FIG. 17B shows values of the chirp parameter α obtained as calculation results when the electrode length is changed;

FIG. 19A is a plane view, and FIG. 19B is a sectional view along the line X to X in FIG. 19A;

FIG. 20A is a plane view, and FIG. 20B is a sectional view along the line X to X in FIG. 20A;

FIG. 21A is a plane view, and FIG. 21B is a sectional view along the line X to X in FIG. 21A;

FIG. 22A is a plane view, and FIG. 22B is a sectional view along the line X to X in FIG. 22A;

FIG. 23A is a plane view, and FIG. 23B is a sectional view along the line X to X in FIG. 23A;

FIG. 24A is a plane view, and FIG. 24B is a sectional view along the line X to X in FIG. 24A;

FIG. 37A is a plane view, and FIG. 37B is a sectional view in the XI-XI in FIG. 37A; FIG. 38A is a plane view, and FIG. 38B is a sectional view in the XII-XII in FIG. 38A.

DETAILED DESCRIPTION OF THE PREFERRED EMBODIMENTS

Basic Gist of the Present Invention

The inventor of the present invention has reached the basic gist of the invention shown as follows in order to solve various problems which are caused by performing modulation by changing the amplitude of a high-frequency driving power supply, when modulating the input light of a wide-range wavelength region, and a problem that quality deterioration of an optical output waveform occurs dependently on the wavelength of the input light and the problem of quality deterioration of the optical output waveform due to inability of controlling chirping.

First, in order to avoid various problems caused by performing modulation of the input light by changing the amplitude of a high-frequency driving power supply (hereinafter, called high-frequency driving voltage), the inventor sets the high-frequency driving voltage as constant irrespective of the wavelength of the input light. The inventor has considered making it possible to perform optimal modulation for each input light of a wide-range wavelength region by controlling the bias voltage by a direct-current power supply connected to this high-frequency driving power supply. The modulating method will be shown hereinafter.

Figure 1A:
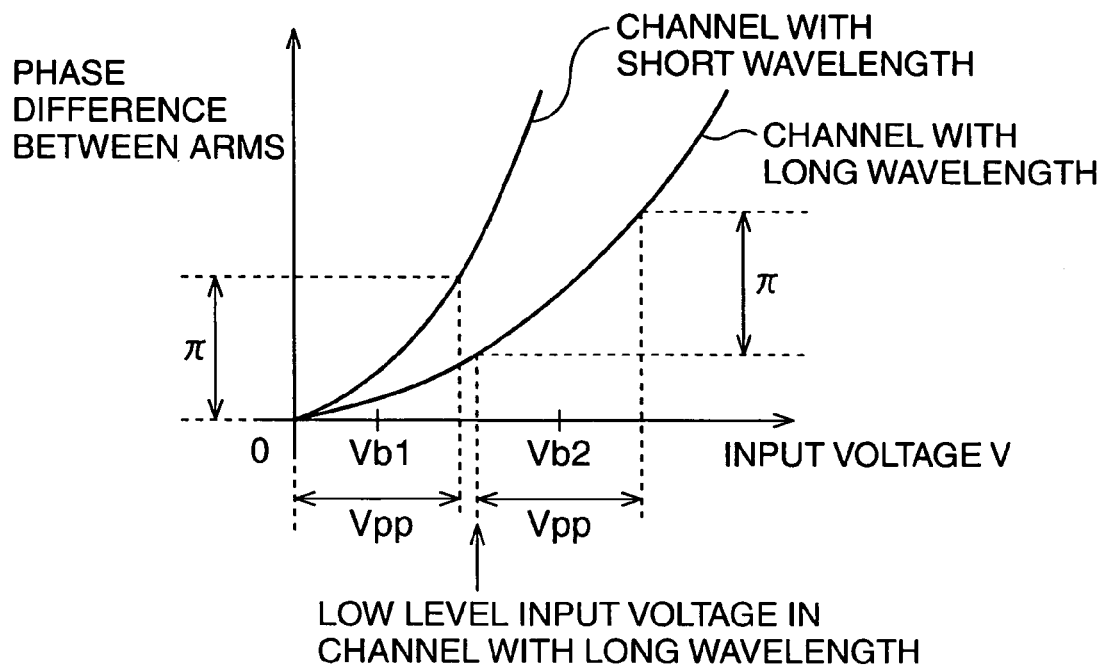
FIGS. 1A and 1B are diagrams each showing a setting method of a drive condition with respect to a channel with short wavelength and a channel with long wavelength of a semiconductor Mach-Zehnder type optical modulator according to the present invention.
Figure 1B:
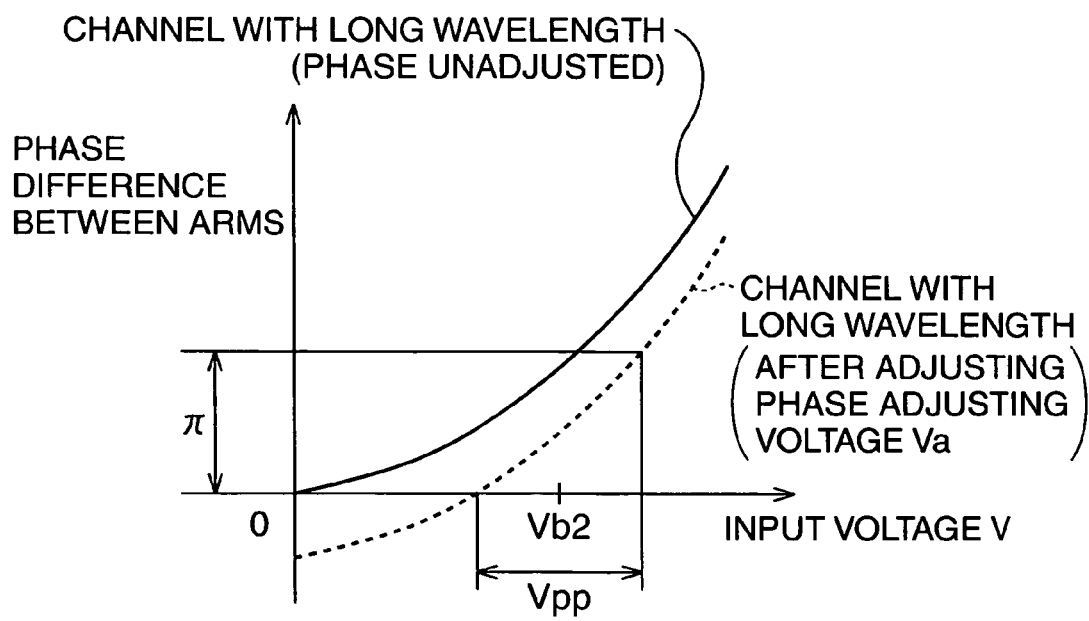

FIGS. 1A and 1B are diagrams showing setting methods of the drive condition for a channel with short wavelength and a channel with long wavelength of a semiconductor Mach-Zehnder type optical modulator according to the present invention. FIG. 1A shows the extinction curve in the phase difference of the lights propagating through the respective arms with respect to the input voltage V. As shown in FIG. 1A, when compared in the same input voltage V, the phase difference of the light propagating through the respective arms becomes larger when the wavelength of the input light is short wavelength than when it is long wavelength, and as the input voltage V becomes larger, the phase difference of the lights propagating through the respective arms increases nonlinearly.

In the semiconductor Mach-Zehnder type optical modulator according to the present invention, a bias voltage Vb by the direct-current power supply is adjusted so that the phase difference of the lights propagating through the respective arms equally changes by the amount of π between the on level and the off level of the modulated light in the extinction curve characteristic which changes in accordance with the wavelength of input light, when a fixed high-frequency driving voltage Vpp is supplied. The bias voltage Vb corresponds to an intermediate value between the input voltage applied at the time of on level of the modulated light and the input voltage applied at the time of off level of the modulated light. Namely, in the present invention, by setting a bias voltage value Vb2 in the case where the wavelength of the input light is long wavelength to be larger than a bias voltage value Vb1 in the case where the wavelength of the input light is short wavelength, the change amount of the phase difference of the lights propagating through the respective arms can be made π between the on level and the off level of the modulated light even in the case where the wavelength of the input light is long wavelength.

In the extinction curve characteristic in the case where the wavelength of the input light is long wavelength as shown in FIG. 1A, the phase difference of the lights propagating through the respective arms with respect to the input voltage applied at the time of on level of the modulated light (low-level input voltage in the channel with long wavelength in FIG. 1A) is not zero (a larger value than zero in FIG. 1A) and therefore, the maximum optical output on the extinction curve cannot obtained in the on level of the modulated light. At this time, the refractive indexes of the optical waveguide in the first arm 11 and the optical waveguide in the second arm 12 differ from each other. Therefore, in this invention, in addition to the control of the bias voltage Vb by the direct-current power supply, at least one of the phases of the respective branched lights is adjusted so that the phase difference of the lights propagating through the respective arms becomes zero at the on level of the modulated light. This adjustment of the phase corresponds to shifting the extinction curve to the position shown by the dotted line so that the phase difference of the lights propagating through the respective arms becomes zero at the on level of the modulated light, and is achieved by supplying a phase adjusting voltage Va to the optical waveguide. As a result, the maximum optical output of the modulated light can be obtained at the on level of the modulated light, and therefore, a high-quality optical output waveform can be generated.

Figure 2:
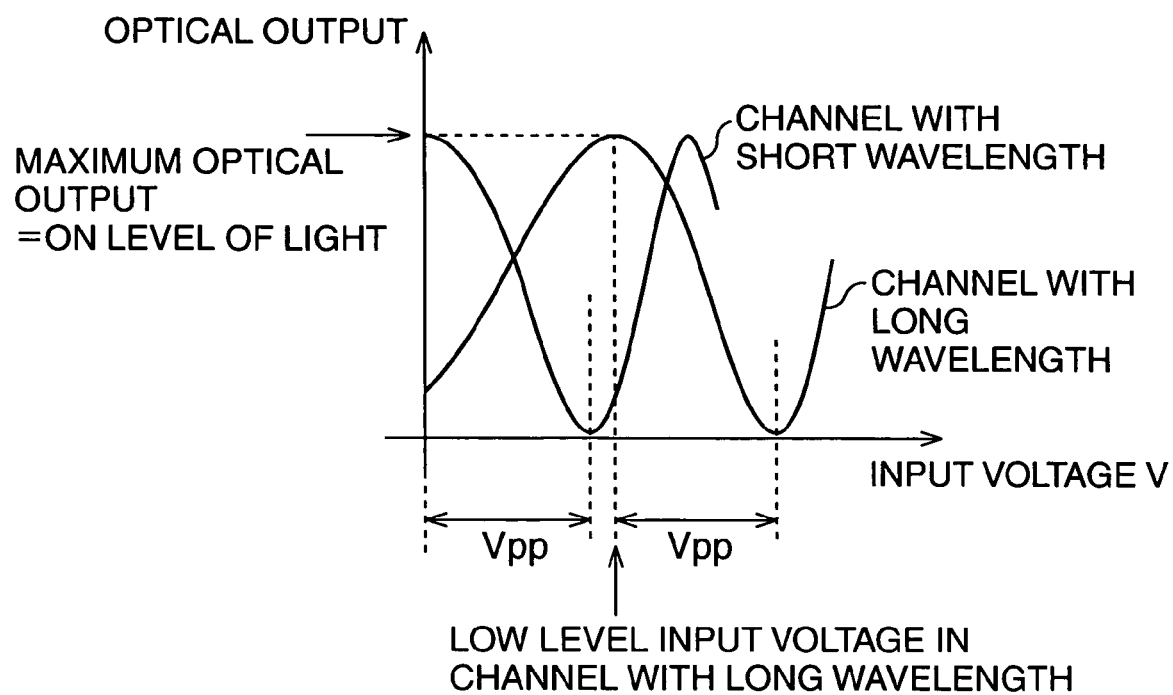
FIG. 2 is a diagram showing a setting method of a drive condition with respect to a channel with short wavelength and a channel with long wavelength of a semiconductor Mach-Zehnder type optical modulator according to the present invention.

In the semiconductor Mach-Zehnder modulator according to the present invention, the predetermined high-frequency driving voltage Vpp is supplied, and the bias voltage Vb and the phase adjusting voltage Va are controlled and supplied, whereby the extinction curve in which the on level of the modulated light becomes the maximum output as shown in FIG. 2 can be obtained with respect to the input light of a wide wavelength bandwidth. The concrete embodiments will be described in the first to fourth embodiments of the present invention.

Further, in order to avoid the problem of quality deterioration of the optical output waveform due to inability of controlling chirping in the optical modulator made of InP related materials, the inventor has considered finding out the structural parameter which achieves low chirping (including zero chirping).

For example, the inventor found the correlation of the structural parameter such as electrode length, for example, and chirping (chirp parameter) in the optical modulator made of InP related materials and has made it possible to perform control of chirping by adjusting the structural parameter. The embodiments will be described in the fifth to seventh embodiments of the present invention.

Embodiments to Which the Present Invention is Applied

Next, the embodiments on the basis of the basic gist of the present invention will be explained with reference to the drawings. As the embodiments according to the optical modulator of the present invention, the explanation will be made with a semiconductor Mach-Zehnder type modulator applied to the embodiments.

First Embodiment

Figure 3:
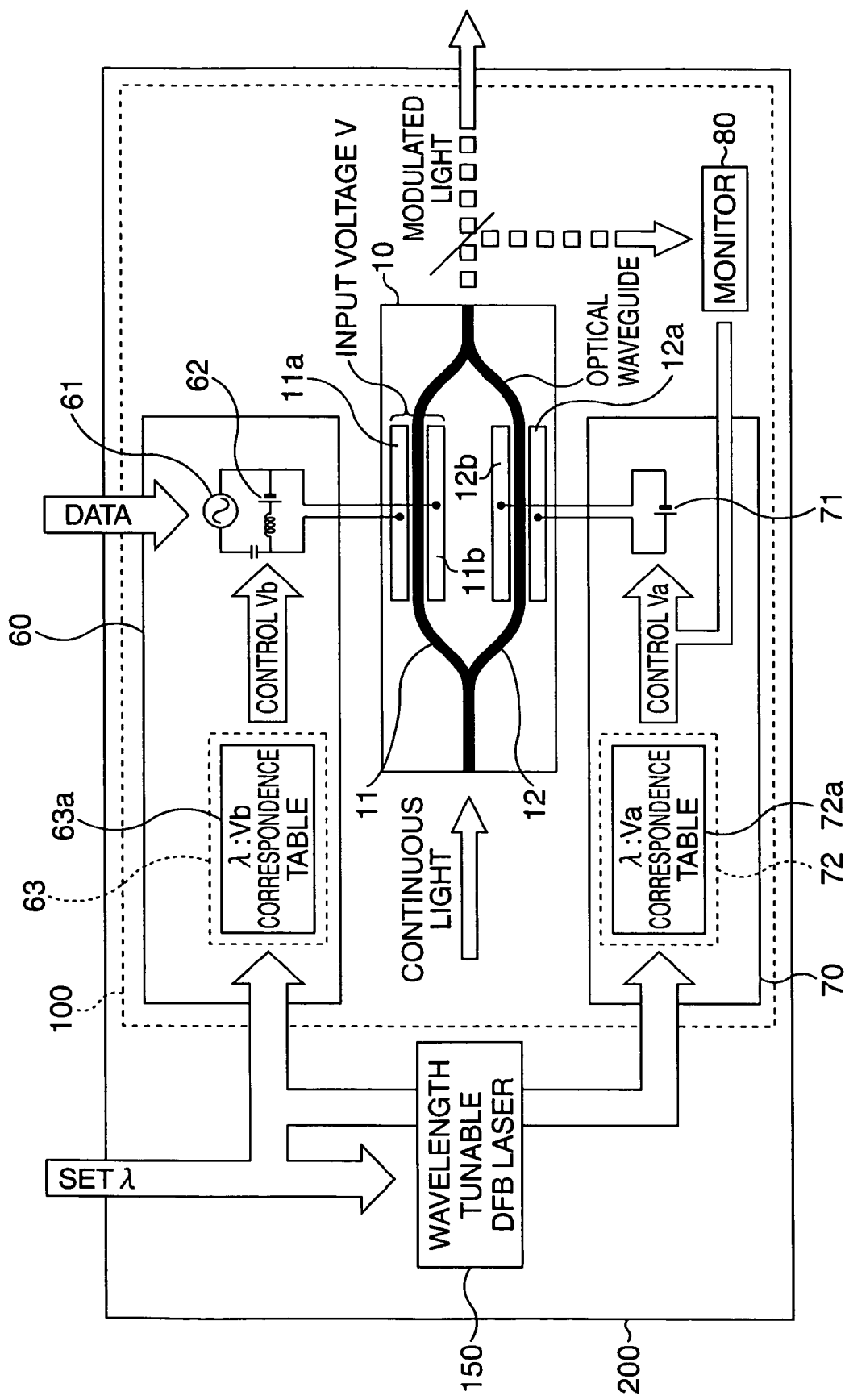
FIG. 3 is a conceptual diagram of an optical transmitter including a semiconductor Mach-Zehnder type optical modulator in a first embodiment of the present invention.

FIG. 3 is a conceptual diagram of an optical transmitter including a semiconductor Mach-Zehnder type optical modulator in the first embodiment of the present invention.

An optical transmitter 200 is constructed by including a wavelength tunable laser device 150 outputting light by tuning the wavelength of the light, and a semiconductor Mach-Zehnder type optical modulator 100 performing modulation for input light continuously incident from the wavelength tunable laser device 150. The wavelength tunable laser device 150 tunes the wavelength of the input light inputted into a Mach-Zehnder type optical interferometer 10 based on wavelength setting which is set by an external control device.

The semiconductor Mach-Zehnder type optical modulator 100 is constructed by including a Mach-Zehnder type optical interferometer 10 which branches the input light continuously inputted from the wavelength tunable laser device 150 into two optical waveguides, and outputs combined light (modulated light) generated by combining the respective branched lights propagating through the respective optical waveguides, a first arm control circuit 60 which controls the branched light propagating through an upper first arm 11 out of the two optical waveguides of the Mach-Zehnder type optical interferometer 10, a second arm control circuit 70 which controls the branched light propagating through a lower second arm 12 out of the two optical waveguides of the Mach-Zehnder type optical interferometer 10, and a monitor 80 which receives part of the modulated light outputted from the Mach-Zehnder type optical interferometer 10 and feeds it back to the second arm control circuit 70.

The first arm control circuit 60 is constructed by including a high-frequency driving power supply 61 which supplies the high-frequency voltage Vpp for drive via a pair of electrodes 11a and 11b formed at the first arm 11, a direct-current power supply 62 which supplies the bias voltage Vb via the pair of electrodes 11a and 11b, and a bias voltage control section (direct-current voltage supplying section) 63 which controls the bias voltage Vb supplied from the direct-current power supply 62 in accordance with the wavelength (λ) of the input light inputted to the Mach-Zehnder type optical interferometer 10 from the wavelength tunable laser device 150.

The second arm control circuit 70 is constructed by including a direct-current power supply 71 which supplies the phase adjusting voltage Va for adjusting the phase of the modulated light via a pair of electrodes 12a and 12b formed at the second arm 12, and a phase adjusting voltage control section (phase adjusting section) 72 which controls the phase adjusting voltage Va supplied from the direct-current power supply 71 in accordance with the wavelength (λ) of the input light inputted to the Mach-Zehnder type optical interferometer 10 from the wavelength tunable laser device 150.

The bias voltage control section 63 reads the optimal bias voltage Vb previously set corresponding to the wavelength of the input light inputted from the wavelength tunable laser device 150 with reference to a reference table including a correspondence table 63a of the wavelength (λ) of the input light and the bias voltage Vb, and controls the direct-current power supply 62 to be at the bias voltage which is read. The phase adjusting voltage control section 72 reads the optimal phase adjusting voltage Va previously set corresponding to the wavelength of the input light inputted from the wavelength tunable laser device 150 with reference to the reference table including a correspondence table 72a of the wavelength (λ) of the input light and the phase adjusting voltage Va, and controls the direct-current power supply 71 to be at the phase adjusting voltage which is read. Here, the reference table including the correspondence tables 63a and 72a shown in FIG. 3 will be shown in Table 1. This reference table is previously recorded in a storage section in the optical transmitter 200.

TABLE 1

| WAVELENGTH (μm) | BIAS VOLTAGE Vb (V) | LOW-LEVEL INPUT VOLTAGE (V) | HIGH-LEVEL INPUT VOLTAGE (V) | HIGH-FREQUENCY DRIVING VOLTAGE AMPLITUDE Vpp (V) | PHASE ADJUSTING VOLTAGE Va (V) |
|---|---|---|---|---|---|
| 1.53 | 1.25 | 0.00 | 2.50 | 2.50 | 0.00 |
| 1.54 | 3.95 | 2.70 | 5.20 | 2.50 | 2.70 |
| 1.55 | 5.75 | 4.50 | 7.00 | 2.50 | 4.50 |
| 1.56 | 7.65 | 6.40 | 8.90 | 2.50 | 6.40 |
| 1.57 | 8.75 | 7.50 | 10.00 | 2.50 | 7.50 |

As shown in FIG. 3, in this embodiment, the wavelength of the input light inputted into the Mach-Zehnder type optical interferometer 10 from the wavelength tunable laser device 150 and the high-frequency voltage Vpp supplied from the high-frequency driving power supply 61 are set by the external control device. In the semiconductor Mach-Zehnder type optical modulator 100, the optimal bias voltage Vb and phase adjusting voltage Va are set in accordance with the wavelength of the input light set by the external control device with reference to the reference table as shown in Table 1.

As for the phase adjusting voltage Va, fine adjustment corresponding to variation with time of the Mach-Zehnder type optical modulator 100 is performed as needed with the values of the reference table shown in Table 1 as the initial values. In the Mach-Zehnder type optical modulator 100, the phase difference of the respective branched lights propagating through the two optical waveguides generally changes with time, and therefore, the aforementioned fine adjustment is needed. This fine adjustment is performed by receiving part of the modulated light on the monitor 80, and feeding back the information. The fine adjustment is performed by using an automatic bias voltage adjusting method or the like which is generally performed in a Mach-Zehnder type optical modulator with $LiNbO_3$ as the material, for example.

Figure 4:
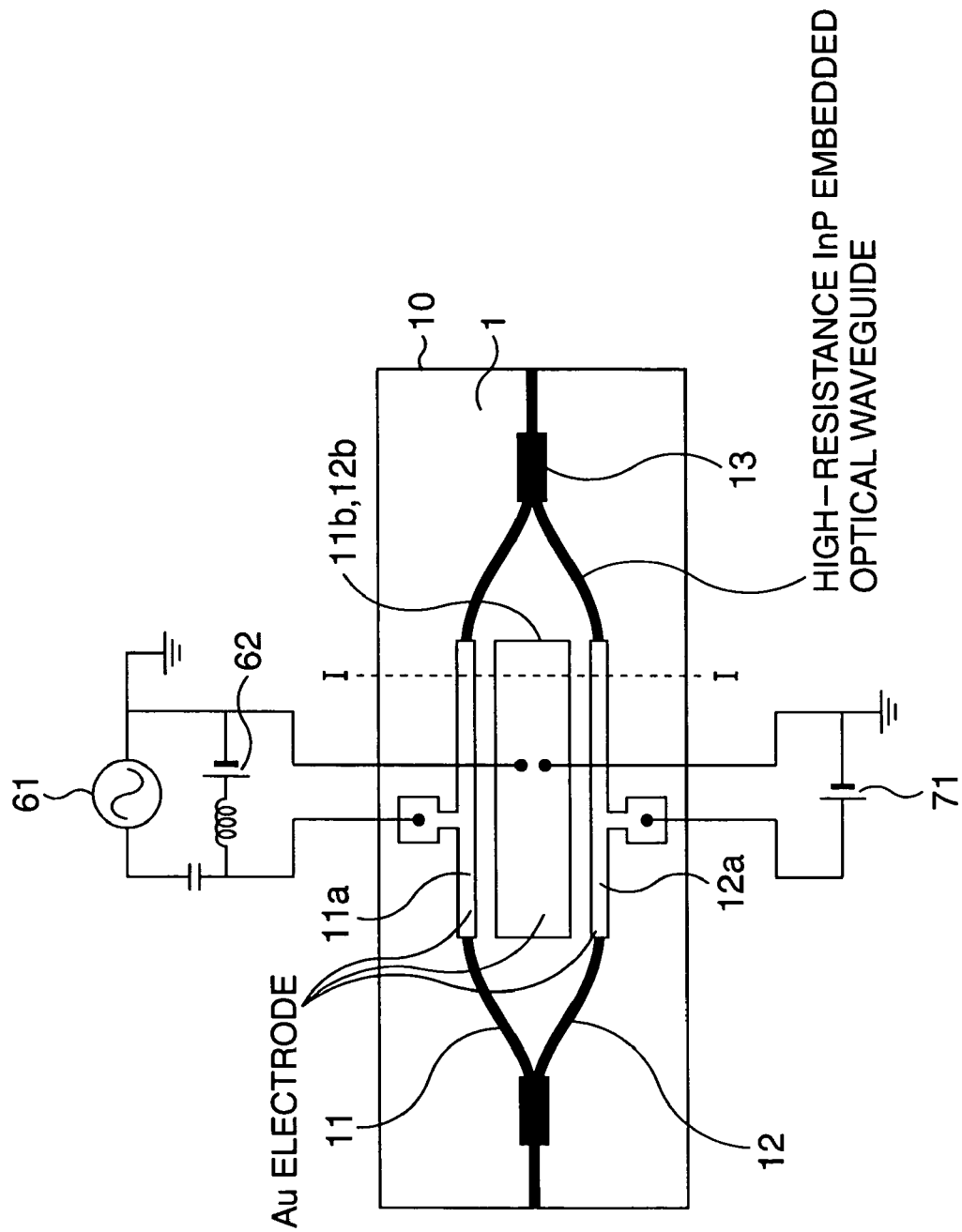
FIG. 4 is a schematic block diagram of the semiconductor Mach-Zehnder type optical modulator in the first embodiment of the present invention.
Figure 5:
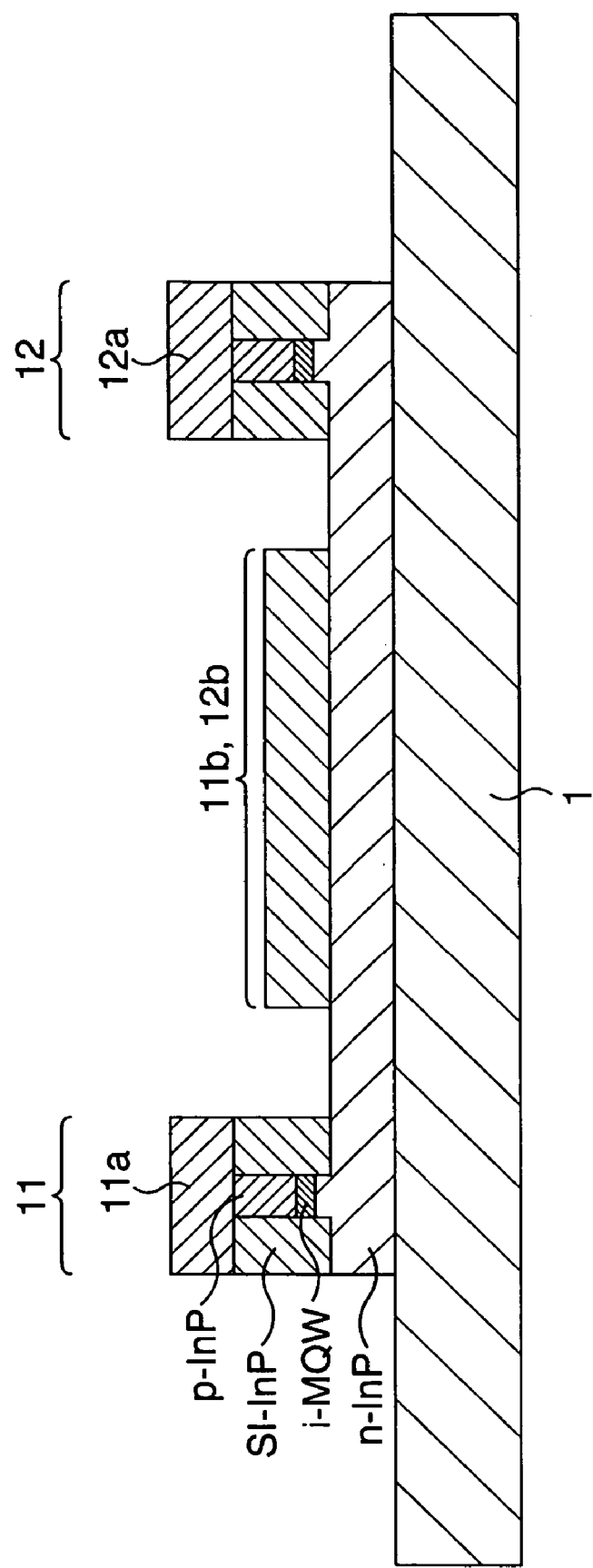
FIG. 5 is a schematic sectional view in the I to I section of the semiconductor Mach-Zehnder type optical modulator shown in FIG. 4.

FIG. 4 is a schematic block diagram of the semiconductor Mach-Zehnder type optical modulator in the first embodiment of the present invention. FIG. 5 is a schematic sectional view in I to I section of the semiconductor Mach-Zehnder type optical modulator shown in FIG. 4. Here, the same components as in FIG. 3 are given the same reference numerals and symbols in FIGS. 4 and 5.

As shown in FIG. 4, the Mach-Zehnder type optical interferometer 10 is formed on a high-resistance InP substrate 1, and the pair of electrodes 11a and 11b provided at the first arm 11 and the pair of electrodes 12a and 12b provided at the second arm 12 are formed by metal electrodes. In FIG. 4, the electrode 11b and the electrode 12b shown in FIG. 3 are formed by a common electrode (GND electrode). Further, an MMI optical coupler 13 is formed at a connecting portion of the first arm 11 and the second arm 12.

As shown in FIG. 5, in the Mach-Zehnder type optical interferometer 10, the first arm 11, the second arm 12 and the GND electrode constituted of the electrode 11b and the electrode 12b are formed on the high-resistance InP substrate 1 via an n-type InP layer.

In each of the first arm 11 and the second arm 12, an undoped multiple quantum well layer (i-MQW) with its side surfaces covered with a high-resistance SI—InP layer is formed with a film thickness of about 0.3 μm and a width of about 1.3 μm on the n-type InP layer. This multiple quantum well layer (i-MQW) becomes a core layer of the optical waveguide. In this embodiment, the multiple quantum well layer (i-MQW) has its barrier layer formed by an InP layer with a film thickness of about 10 nm, and its well layer formed by an InGaAs layer with a film thickness of about 10 nm, and the emission wavelength is set at 1.44 μm. A p-type InP layer is formed on the multiple quantum well layer (i-MQW), and further on the p-type InP layer, a contact layer made of InGaAs not shown is formed. On this contact layer, the electrodes 11a and 12a made of gold are formed with a width of about 3.0 μm.

Figure 6:
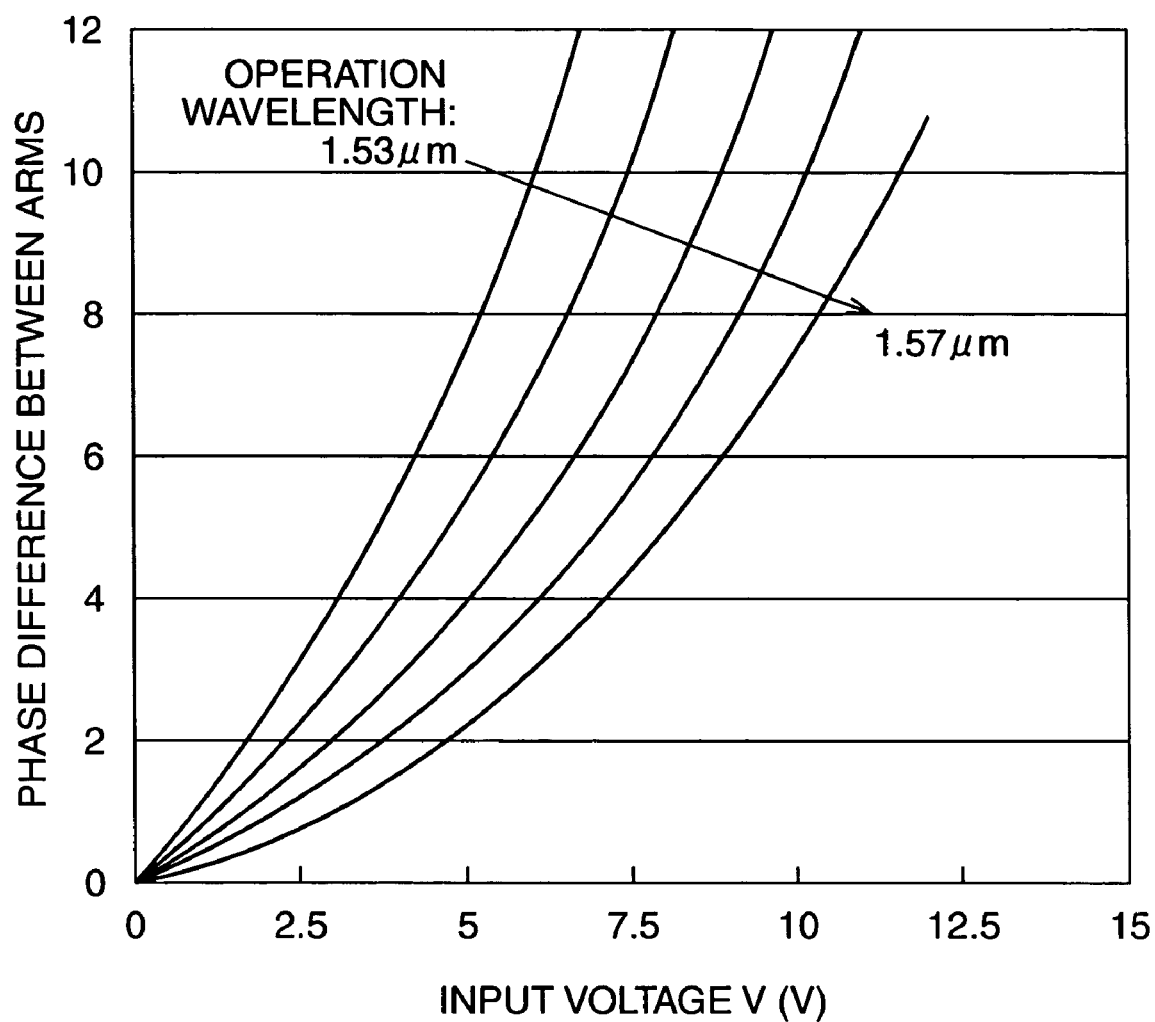
FIG. 6 is a characteristic chart of a phase difference (phase difference between arms) of lights propagating through respective arms with respect to input voltage of the semiconductor Mach-Zehnder type optical modulator in the first embodiment of the present invention.

FIG. 6 is a characteristic chart of the phase difference of the lights propagating through the respective arms (phase difference between the arms) with respect to the input voltage of the semiconductor Mach-Zehnder type optical modulator in the first embodiment of the present invention.

FIG. 6 shows the characteristic when the wavelength of the input light is changed from 1.53 μm to 1.57 μm. The high-frequency driving voltage Vpp in the semiconductor Mach-Zehnder type optical modulator, the low-level and high-level input voltage applied to the modulator, the bias voltage Vb and the phase adjusting voltage Va which are control targets at this time are as shown in the aforementioned Table 1. From Table 1, it is understood that 2.5 V of the high-frequency driving voltage Vpp is commonly supplied to the wavelength of each input light, and the change amount of about π is obtained as the phase difference between the lights propagating through the respective arms by changing the input voltage by 2.5 V, from the difference between the low-level input voltage and the high-level input voltage applied to the modulator.

In the case where the wavelength of the input light is the shortest wave of 1.53 μm, the change amount of about π is obtained as the phase difference between the lights propagating through the respective arms by setting the bias voltage Vb at 1.25 V. Similarly, when the wavelength of the input light is 1.54 μm, the bias voltage Vb is set at 3.95 V, when the wavelength of the input light is 1.55 μm, the bias voltage Vb is set at 5.75 V, when the wavelength of the input light is 1.56 μm, the bias voltage Vb is set at 7.65V, and when the wavelength of the input light is 1.57 μm, the bias voltage Vb is set at 8.75 V, whereby the change amount of about π is obtained as the phase difference between the lights propagating through the respective arms in the wavelength of each input light. By controlling the bias voltage Vb in accordance with the wavelength of the input light as described above, the change amount of the phase difference between the lights propagating through the respective arms can be always made π for the input light of a wide wavelength bandwidth.

The phase adjusting voltage Va is controlled so that the phase difference between the lights propagating through the respective arms becomes zero when the input voltage applied to the modulator is low-level, in each wavelength of the input light. When there is no asymmetry property in the structure of the two optical waveguides, the value of the phase adjusting voltage Va is usually set at an equal value to low-level input voltage applied to the modulator in the first arm 11 to which the high-frequency driving power supply 61 is connected, in the Mach-Zehnder type optical modulator. By controlling the phase adjusting voltage Va in this manner, an optical output waveform of high quality can be generated. In this embodiment, the phase adjusting voltage Va is controlled so that the phase difference of the propagating lights becomes zero when the input voltage applied to the modulator is low-level and the light of on level is outputted, but the phase adjusting voltage Va may be controlled so that the phase difference of the propagating lights is made zero when the input voltage applied to the modulator is high-level, and the light of on level is outputted.

Figure 7:
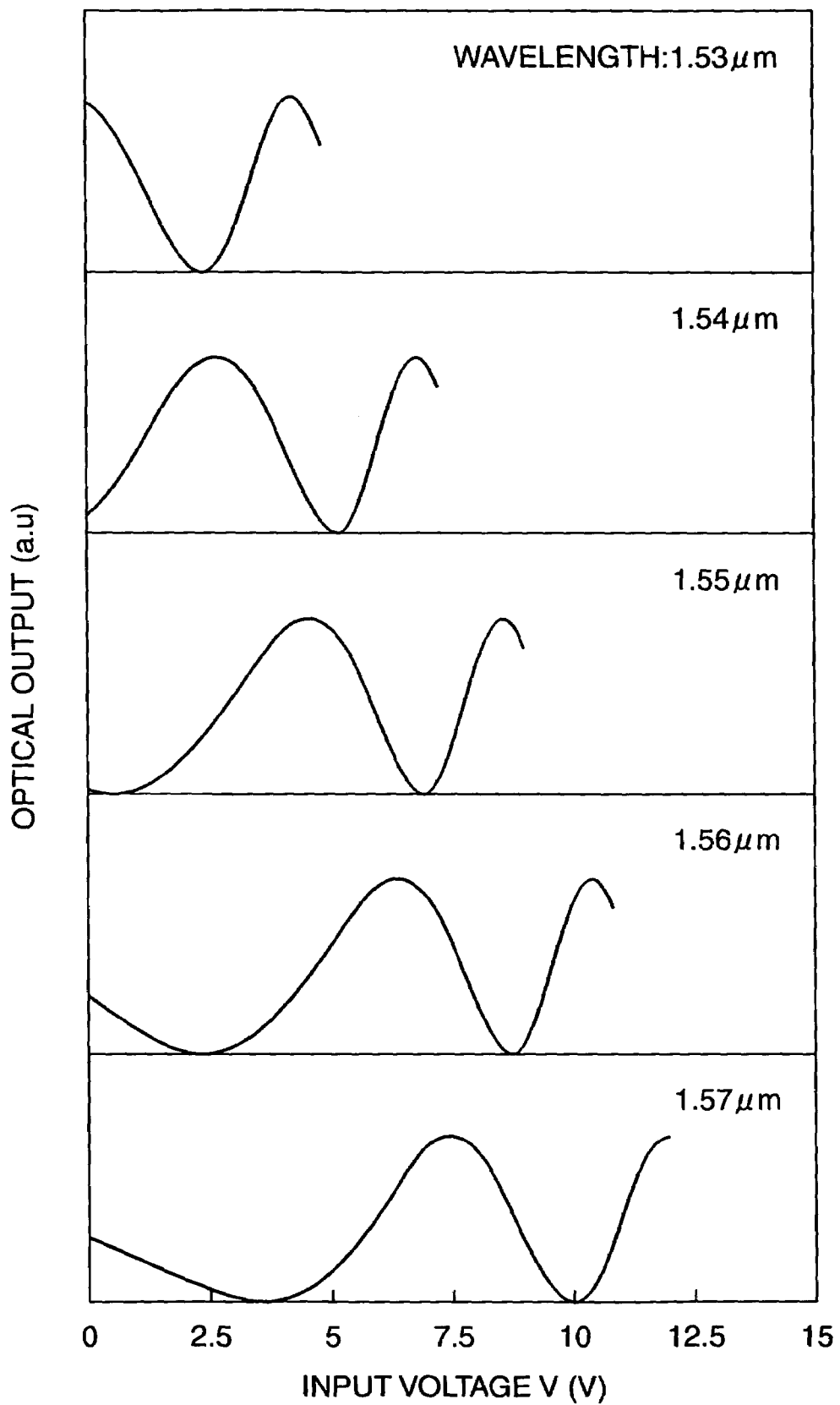
FIG. 7 is a characteristic chart showing an optical output characteristic in input voltage of the semiconductor Mach-Zehnder type optical modulator in the first embodiment of the present invention.

FIG. 7 is a characteristic chart showing the optical output characteristic in the input voltage of the semiconductor Mach-Zehnder type optical modulator in the first embodiment of the present invention. FIG. 7 is based on each wavelength of the input light shown in FIG. 6, and shows the extinction curve in the case where the optimal phase adjusting voltage Va is set for each wavelength.

As shown in FIG. 7, he extinction curve in each wavelength of the input light has the optical output of on level when the input voltage applied to the modulator shown in Table 1 is low-level, and takes the maximum value on the extinction curve. When the input voltage applied to this modulator is high-level which is larger than low-level by 2.5 V, the optical output becomes off level, and becomes the minimum value on the extinction curve.

The bias voltage Vb is made larger as the wavelength of the input light becomes long wavelength, and therefore, the change in the absorption loss of the propagating lights with respect to the wavelength of the input light can be suppressed to be small. Thereby, in the semiconductor Mach-Zehnder type optical modulator of this embodiment, the insertion loss of light can be suppressed to 8.5 dB to 10.5 dB in the wavelengths of 1.53 μm to 1.57 μm as the result of the verification.

As the wavelength tunable laser device 150 of the optical transmitter 200 in this embodiment, it is preferable to use the wavelength tunable laser device described in Non-patent Document 5. In this embodiment, the values of the optimal bias voltage Vb and phase adjusting voltage Va corresponding to the wavelength (λ) of the input light are previously stored in the control sections 63 and 72 in the optical transmitter 200, respectively, but an electronic circuit performing arithmetic operation of previously set law may be provided in the control sections 63 and 72 in the optical transmitter 200, and the aforementioned values may be calculated based on the wavelength of the input light by this electronic circuit.

Second Embodiment

In a second embodiment of the present invention, in the optical transmitter, a DFB laser device which fixes the wavelength of the input light is applied instead of the wavelength tunable laser device 150 in the first embodiment. The wavelength of the light from this DFB laser device is tuned to a specified wavelength channel in the WDM system, and the optical transmitter in this embodiment is constructed to operate only in this wavelength channel. This embodiment can be applied to the system provided with optical transmitters with the wavelengths of input lights fixed respectively in accordance with a plurality of wavelength channels in the WDM system.

In this embodiment, in each of the optical transmitters provided corresponding to a plurality of wavelength channels in the WDM system, a semiconductor Mach-Zehnder type optical modulator having the same element structure is applied. The semiconductor Mach-Zehnder type optical modulator 100 in this embodiment also adjusts the bias voltage Vb so that the phase difference between the lights propagating through the respective arms when a fixed high-frequency driving voltage Vpp is supplied equally changes by the amount of π between the on level and the off level of the output light with respect the wavelength of any input light as in the first embodiment. Further, the modulator sets the phase adjusting voltage Va so as to make the optical phase difference of the lights propagating through the respective arms zero when the input voltage applied to the modulator is low-level, and output the light of on level.

In this embodiment, each optical transmitter corresponding to a different wavelength channel is separately constructed by providing a semiconductor Mach-Zehnder type optical modulator 100 of the same element structure and a driving circuit of the same high-frequency driving power supply in each optical transmitter, so that high-quality optical output waveform is generated. As a result, cost in manufacture of the optical transmitter can be reduced greatly as compared with the case of the system of the optical transmitter provided with Mach-Zehnder type optical modulators of different structures and driving circuits of different high-frequency driving power supplies corresponding to the wavelengths of the input lights.

Third Embodiment

In a third embodiment of the present invention, a push-pull drive type of semiconductor Mach-Zehnder optical modulator is applied.

FIG. 8 is a schematic diagram of a semiconductor Mach-Zehnder type optical modulator in the third embodiment of the present invention. The II to II section in FIG. 8 is the same as what is shown in FIG. 5.

As shown in FIG. 8, in the semiconductor Mach-Zehnder type optical modulator in this embodiment, electrodes 11c and 12c for supplying the input voltage V and electrodes 11d and 12d for supplying the phase adjusting voltage Va are constructed in separate regions in the same arms. In this embodiment, connection is made so that the phase adjusting voltage Va (having same or different value between two arms on which the voltage is applied from the direct-current power supply 71 can be supplied to both arms, but the mode in which the phase adjusting voltage Va is supplied to only any one of the arms may be adopted.

Figure 9A:
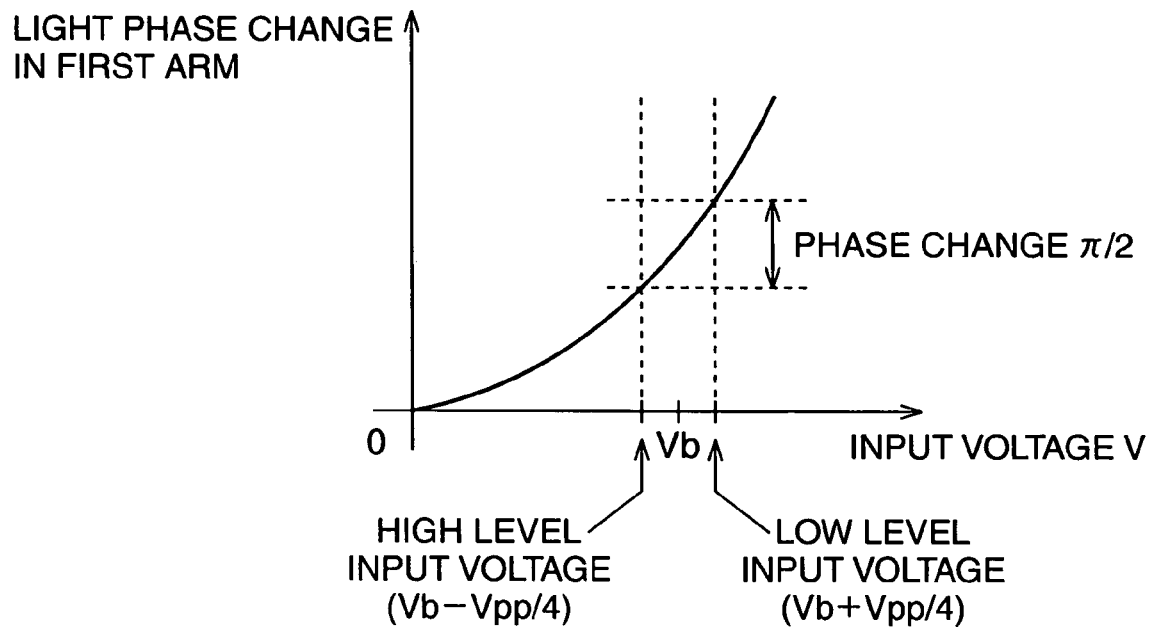
FIGS. 9A and 9B are characteristic charts each showing a phase change in each arm with respect to the input voltage of the semiconductor Mach-Zehnder type optical modulator in the third embodiment of the present invention.
Figure 9B:
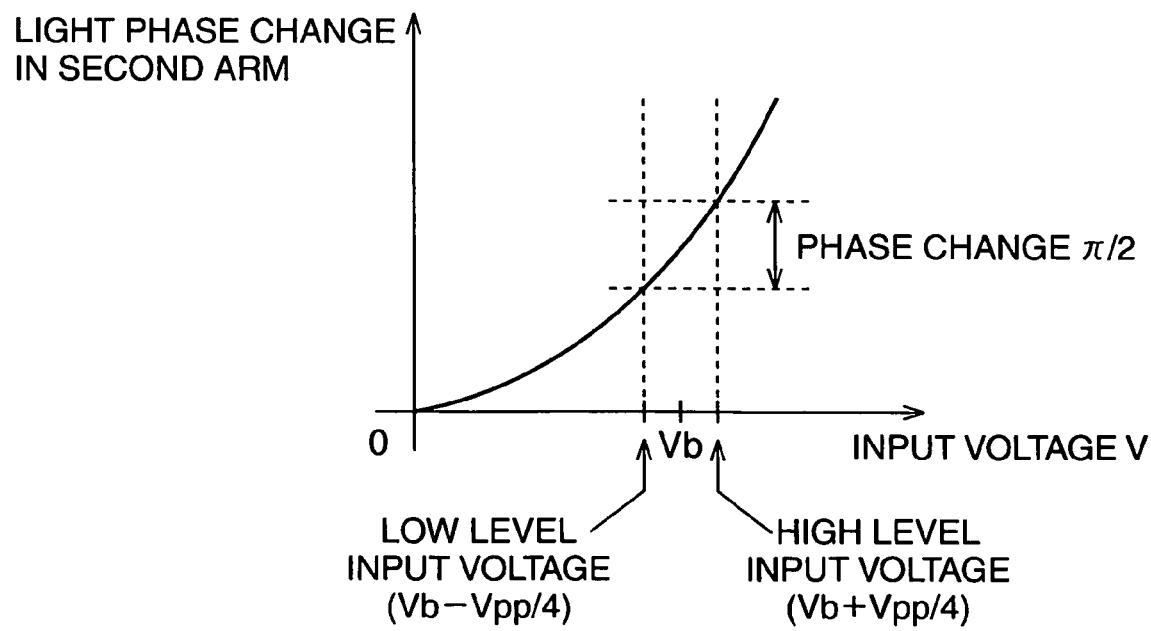

In this embodiment, the bias voltage Vb from the direct-current power supply 62 is applied to the electrodes 11b and 12b. In this embodiment, AC coupling is applied to the high-frequency driving power supply 61, and the high-frequency driving voltage outputted from the high-frequency driving power supply 61 is set as the input voltage V. Therefore, the value which the input voltage V can take is the values from (−Vpp/2) to (+Vpp/2). Here, when the input voltage V and the bias voltage Vb are applied, the voltage applied to the first and the second arms 11 and 12 of the Mach-Zehnder type optical modulator is (Vb±V/2). Accordingly, when the input voltage, which is applied to the modulator when the voltage outputted from the high-frequency driving power supply 61 is (−Vpp/2), is made low-level, and the input voltage, which is applied to the modulator when the input voltage is (+Vpp/2), is high-level, the voltage applied to the first and the second arms 11 and 12 changes respectively as shown in FIGS. 9A and 9B. Here, the horizontal axis in each of FIGS. 9A and 9B represents the input voltage V applied to each of the arms, and the vertical axis represents phase change the light propagating through each of the arms undergoes.

In this embodiment, the value of the high-frequency driving voltage Vpp is set so that the sum of the phase changes obtained in the respective arms becomes π between the time when the input voltage applied to the modulator is low-level and the time when it is high-level. The high-frequency driving voltage Vpp thus set and the phase changes are shown in FIGS. 9A and 9B. In the semiconductor Mach-Zehnder type optical modulator of this embodiment, the phase adjusting voltage Va is also adjusted so that the phase difference of the lights propagating through the respective arms is made zero and the light of on level is outputted when the input voltage applied to the modulation light is low-level, or when it is high-level.

Figure 10:
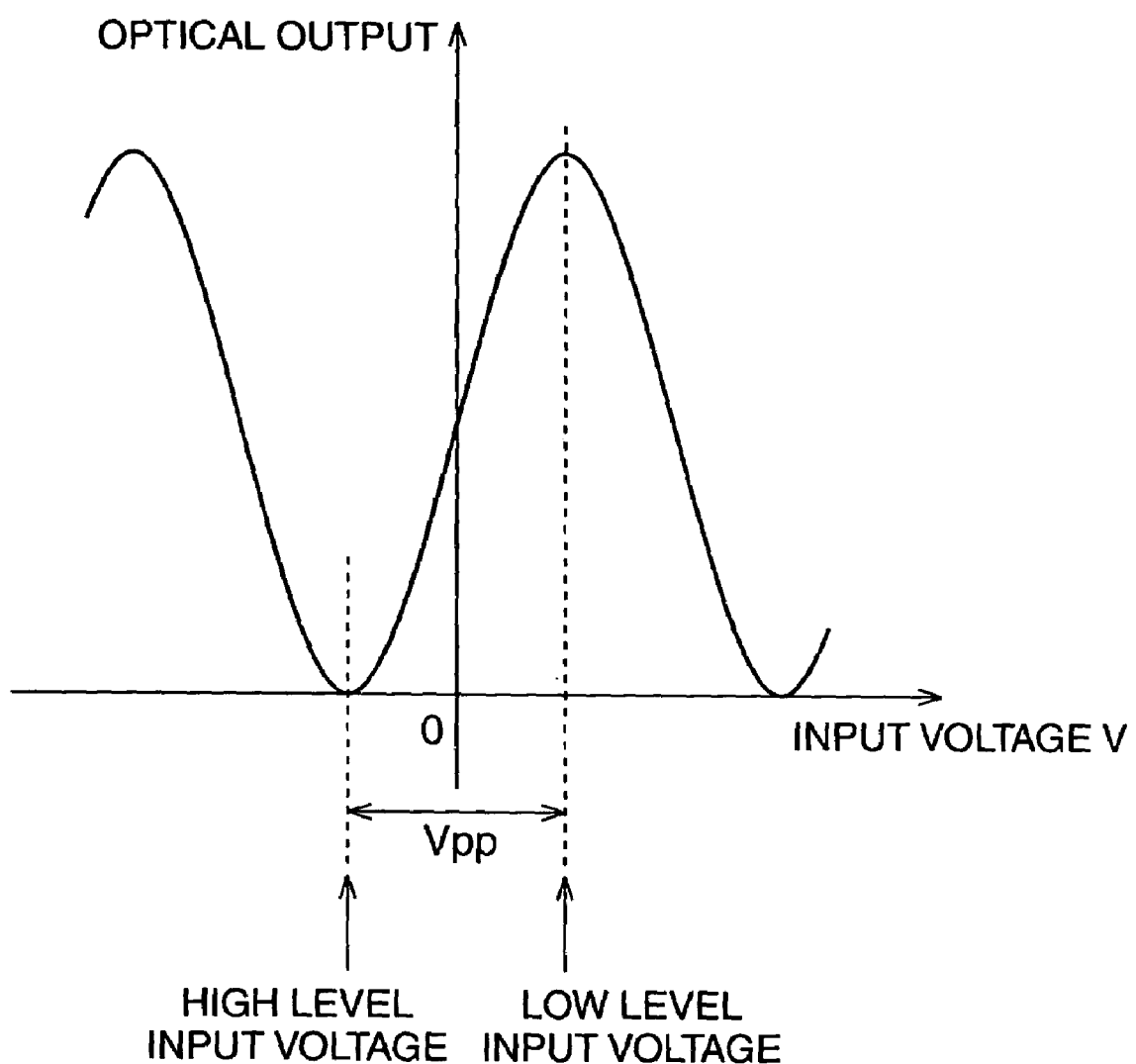
FIG. 10 is a characteristic chart showing an optical output characteristic in the input voltage of the semiconductor Mach-Zehnder type optical modulator in the third embodiment of the present invention.

FIG. 10 is a characteristic chart showing the optical output characteristic in the input voltage of the semiconductor Mach-Zehnder type optical modulator in the third embodiment of the present invention.

In the semiconductor Mach-Zehnder type optical modulator in this embodiment, the extinction curve is substantially symmetrical about a point with the input voltage V of zero as the starting point. This is due to symmetry property in the driving voltage that the voltages applied to the respective arms in the on level of the modulated light are exchanged with each other between the arms, and thereby the voltages become equal to the voltages applied to the respective arms in the off level of the modulated light. In this case, the shaping effect of the optical output waveform utilizing nonlinearity of the extinction curve can be equally obtained in the on level and the off level. Therefore, favorable optical output waveform with the on level and the off level of the modulated light is symmetric is obtained. Such effect is peculiar to the push-pull type of semiconductor Mach-Zehnder type optical modulator.

As shown in FIGS. 9A and 9B, as the bias voltage Vb becomes larger, the phase difference of the lights propagating through the respective arms also becomes larger in this embodiment. This results from the fact that the phase change of the light propagating through the optical waveguide changes nonlinearly with respect to the voltage which is applied to the optical waveguide as the case explained by using FIGS. 1A and 1B. Though not shown in FIGS. 9A and 9B, this phase change becomes larger when the wavelength of input light is short wavelength than when it is long wavelength when compared at the same input voltage V, which is also the same as in the case of the first embodiment. Accordingly, in this embodiment, the phase difference of the lights propagating through the respective arms can be always kept at π under supply of the fixed high-frequency driving voltage Vpp by controlling the bias voltage Vb corresponding to the change of the wavelength of the input light. Accordingly, a high-quality optical output waveform can be also generated in the semiconductor Mach-Zehnder type optical modulator in this embodiment.

Fourth Embodiment

As a semiconductor Mach-Zehnder type optical modulator in a fourth embodiment of the present invention, a push-pull drive type of semiconductor Mach-Zehnder type optical modulator is used as in the third embodiment.

Figure 11:
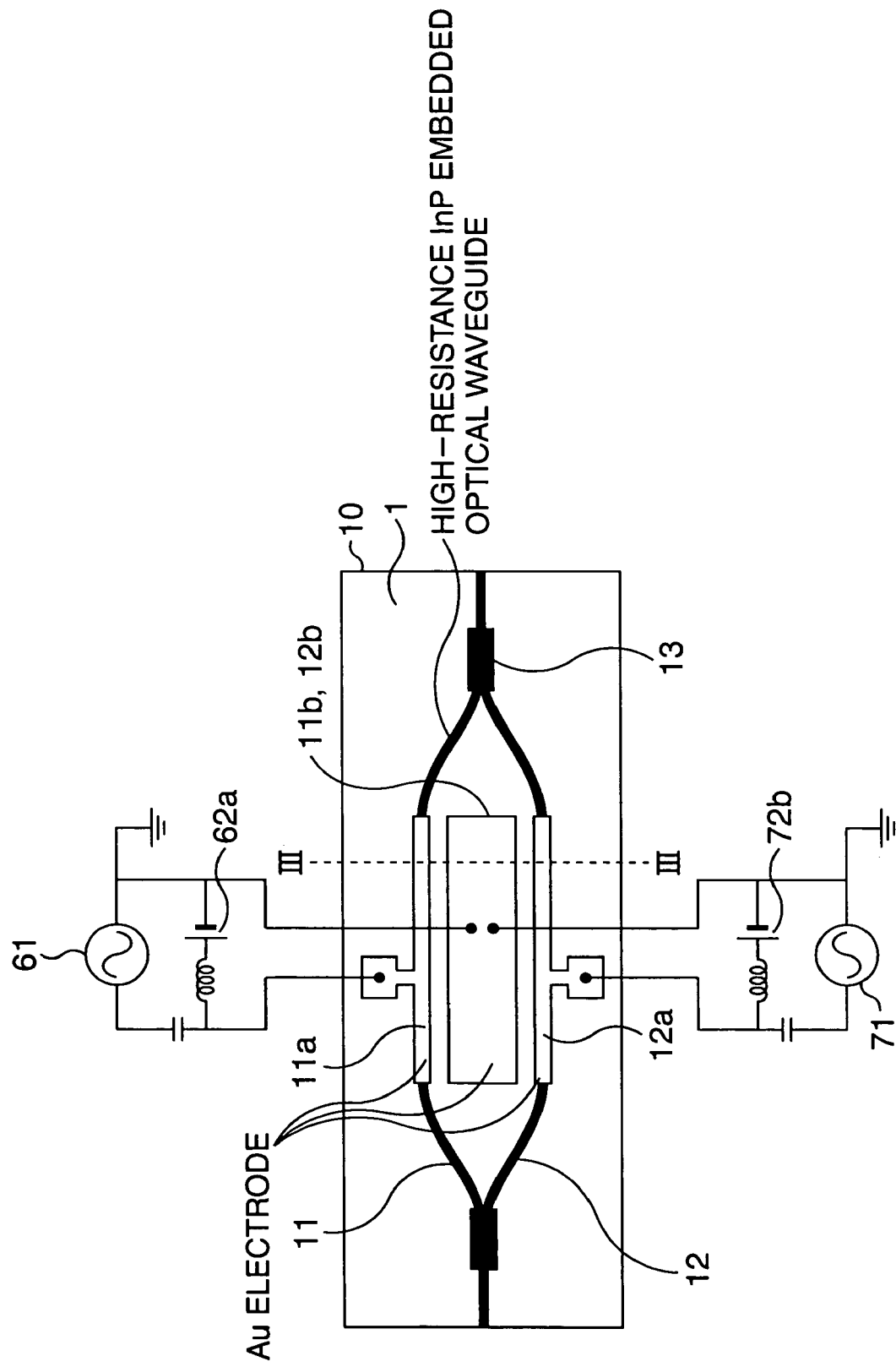
FIG. 11 is a schematic block diagram of a semiconductor Mach-Zehnder type optical modulator in a fourth embodiment of the present invention.

FIG. 11 is a schematic block diagram of a semiconductor Mach-Zehnder type optical modulator in the fourth embodiment of the present invention. The III to III section in FIG. 11 is the same as shown in FIG. 5.

The semiconductor Mach-Zehnder type optical modulator of this embodiment is constructed to supply the high-frequency driving voltage Vpp and the bias voltage Vb to both the first arm 11 and the second arm 12. In this embodiment, the high-frequency driving voltage which is supplied to the first arm 11 and the second arm 12 is Vpp and equal, and as for the phase, it is inputted in the reversed phases from each other. Here, the bias voltage which is supplied to the first arm 11 is set as Vb1, and the bias voltage which is supplied to the second arm 12 is set as Vb2.

Figure 12:
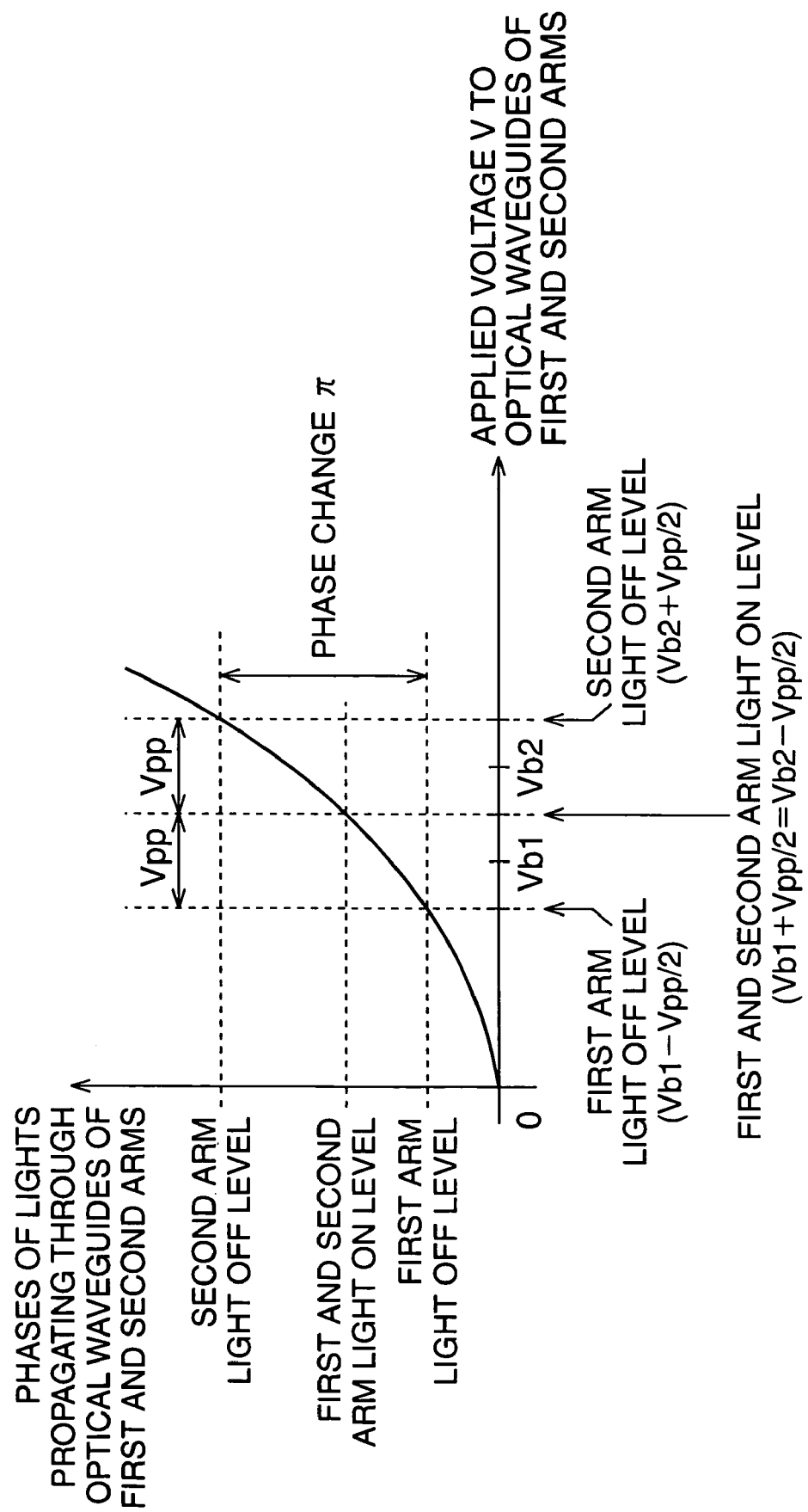
FIG. 12 is a diagram showing a setting method of a drive condition of the semiconductor Mach-Zehnder type optical modulator in the fourth embodiment of the present invention.

FIG. 12 is a diagram showing a setting method of a drive condition of the semiconductor Mach-Zehnder type optical modulator in the fourth embodiment of the present invention.

As the first setting condition, the bias voltages Vb1 and Vb2 are set so that the voltages applied to the optical waveguides of the first arm 11 and the second arm 12 are equal in the on level of the modulated light, and the phase difference of the lights propagating through the two waveguides is made zero. Subsequently, as the second setting condition, the bias voltages Vb1 and Vb2 are set so that the phase difference of the lights propagating through the respective arms becomes π in the off level of the modulated light.

In this embodiment, two bias voltages are used, and therefore, it is necessary to set the bias voltages Vb1 and Vb2 so as to satisfy both the aforementioned first and second setting conditions. Here, the characteristic of the phase difference of the lights propagating through the respective arms with respect to the input voltage shown in FIG. 12 shows the same change as in FIG. 6 with respect to the wavelength of the input light. The nonlinear characteristic with respect to the wavelength of each input light is the same as in FIG. 6. Accordingly, in this embodiment, it is also possible to set the bias voltages Vb1 and Vb2 so as to satisfy both the aforementioned first and second setting conditions in accordance with the change in the wavelength of the input light. Accordingly, a high-quality optical output waveform can be also generated in the semiconductor Mach-Zehnder type optical modulator in this embodiment.

In the first to the fourth embodiments of the present invention, the high-resistance InP substrates are used as the substrates constituting the semiconductor Mach-Zehnder type optical modulators, but the modulator may be constituted by using an n-type or p-type InP substrate. As the semiconductor Mach-Zehnder type optical modulator using an n-type InP substrate, it is preferable to use the semiconductor Mach-Zehnder type optical modulator shown in, for example, Non-patent Document 6.

The semiconductor Mach-Zehnder type optical modulator of each of the first to the fourth embodiments in the present invention is constructed by using lumped constant type electrodes, but it may be constructed by using traveling-wave type electrodes. As the semiconductor Mach-Zehnder type optical modulator with such traveling-wave type electrodes, it is preferable to use the semiconductor Mach-Zehnder type optical modulator shown in, for example, in Non-patent Document 7.

In the first to the fourth embodiments of the present invention, the wavelength of the input light is limited to the two kinds that are short wavelength and long wavelength, but the present invention can be also applied to the WDM system with the number of wavelength channels exceeding several tens. Namely, in each of the wavelength channels, the fixed high-frequency driving voltage Vpp is supplied, the bias voltage Vb is set so that the phase difference of the lights propagating through the respective arms becomes π between the on level and the off level of the modulated light, and the phase adjusting voltage Va is adjusted so that the phase difference of the lights propagating through the respective arms becomes zero at the input voltage applied at the time of off level, whereby favorable optical output waveforms using nonlinearity of the extinction curve can be obtained in all the wavelength channels number of which exceeds several tens. As for the wavelength range to which the present invention can be applied, for example, a C-band zone of the WDM system having the wavelength bandwidth of 35 nm can be cited.

In the semiconductor Mach-Zehnder type optical modulator of the first to the fourth embodiments of the present invention, even if the wavelength of the input light is changed, the high-frequency driving voltage Vpp is kept constant, and necessary adjustment of the voltage is only the bias voltage Vb and the phase adjusting voltage Va. Accordingly, the drive circuit can be constituted to be simple, and in consideration of the points of cost, size and complexity of the constitution, the optical transmitter of a wide wavelength bandwidth which is realistic for commercial use can be realized. Even when the wavelength of the input light changes, the maximum optical output and the minimum optical output in the extinction curve can be made to correspond to the on level and the off level of the modulated light, respectively. As a result, in the wavelength of any input light, variation dependence on the wavelength of the optical output waveform can be made small, and a high-quality optical output waveform utilizing the nonlinearity of the extinction curve can be generated.

Generally, the semiconductor Mach-Zehnder type optical modulator has the characteristic that the absorption amount of the light propagating through the optical waveguide changes in accordance with the wavelength of the input light. It has the characteristic that the absorption amount of light decreases as the wavelength of the input light becomes long wavelength and is away from the absorption end of the core layer of the optical waveguide and the insertion loss of light of the modulator becomes small. It also has the characteristic that the absorption amount of light increases as the applied voltage to the optical waveguide becomes larger when the wavelength of the input light is fixed. Accordingly, when the bias voltage Vb is made larger as the wavelength of the input light is made long wavelength as in the semiconductor Mach-Zehnder type optical modulator in the first to the fourth embodiments of the present invention, decrease in the absorption amount dependent on the wavelength of the input light and the increase in the absorption amount dependent on the bias voltage Vb can cancel each other out. As a result, in the semiconductor Mach-Zehnder type optical modulator of the first to fourth embodiments of the present invention, the insertion loss of the light of the modulator can be kept substantially constant even when the wavelength of the input light is changed from short wavelength to long wavelength.

According to the first to the fourth embodiments of the present invention, by controlling the bias voltage Vb in accordance with the change of the wavelength of the input light, the change amount of the phase difference of the lights propagating through the respective arms can be always kept at π under the supply of the constant high-frequency driving voltage Vpp. Further, by controlling the phase adjusting voltage Va in accordance with the change of the wavelength of the input light, the phase difference of the lights propagating through the respective arms is made zero when the input voltage applied to the modulated light is low-level, or when it is high-level, and the light of the on level can be outputted. A high-quality optical output waveform can be also generated in the semiconductor Mach-Zehnder type optical modulator.

Fifth Embodiment

A capacitively loaded type of Mach-Zehnder type optical modulator made of InP related materials as a semiconductor Mach-Zehnder type optical modulator according to this embodiment and its manufacturing method will be explained with reference to FIGS. 13 to 25.

Figure 13:
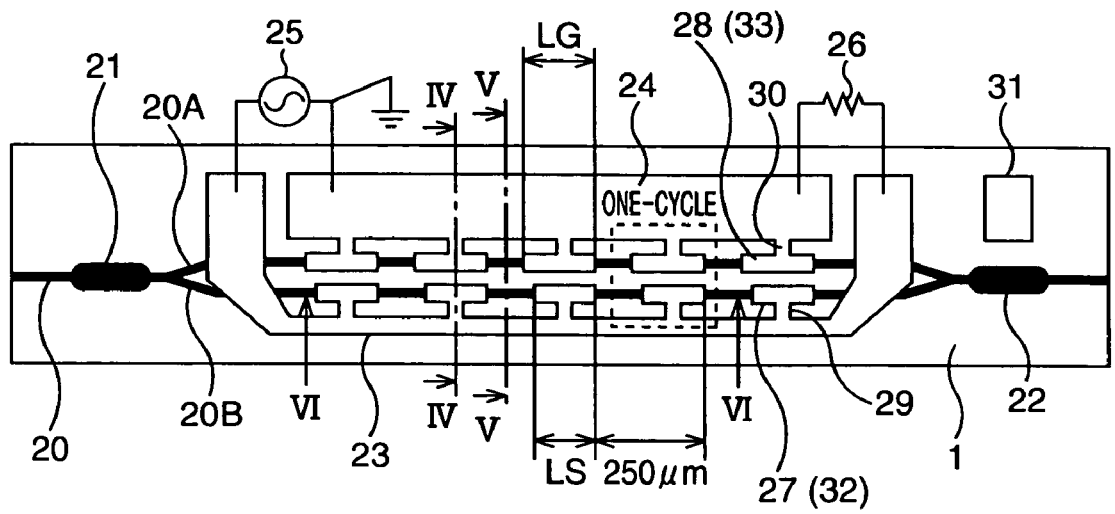
FIG. 13 is a schematic view showing a constitution of a semiconductor Mach-Zehnder type optical modulator in a fifth embodiment of the present invention.

The capacitively loaded type of Mach-Zehnder type optical modulator (optical semiconductor element) made of InP related materials in this embodiment is formed on a high-resistance InP substrate (semi-insulation semiconductor substrate) 1 as shown in FIG. 13. Here, the "InP related materials" means InP or materials capable of lattice matching with InP, or the materials of which degree of lattice mismatching with InP is zero or sufficiently small (for example, within 1.0%). The materials which can make crystal growth (for example, epitaxial growth) on the InP substrate are especially preferable.

Figure 14:
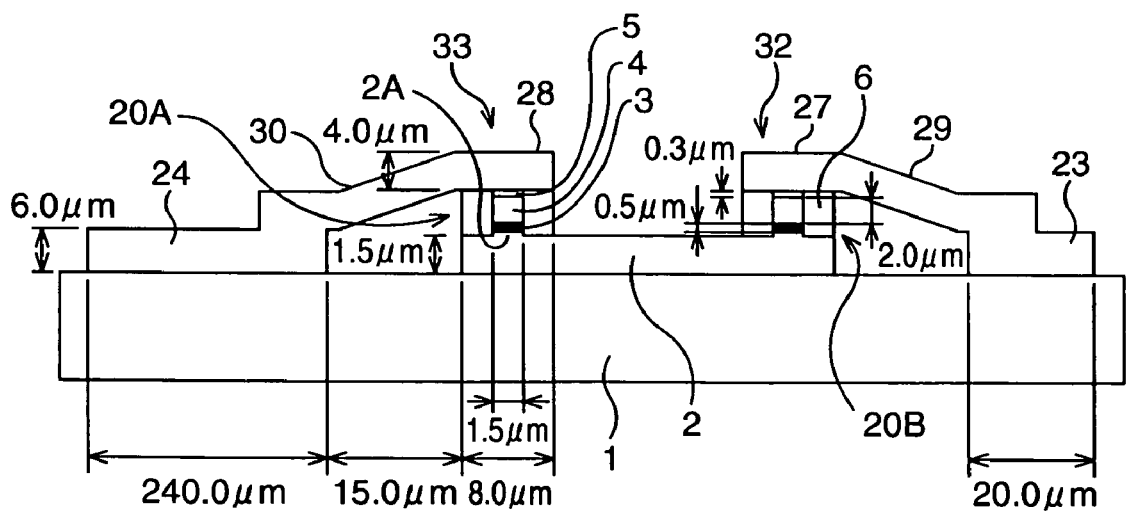
FIG. 14 is a schematic view showing a constitution of the semiconductor Mach-Zehnder type optical modulator in the fifth embodiment of the present invention, and is a sectional view in the IV to IV in FIG. 13.
Figure 15:
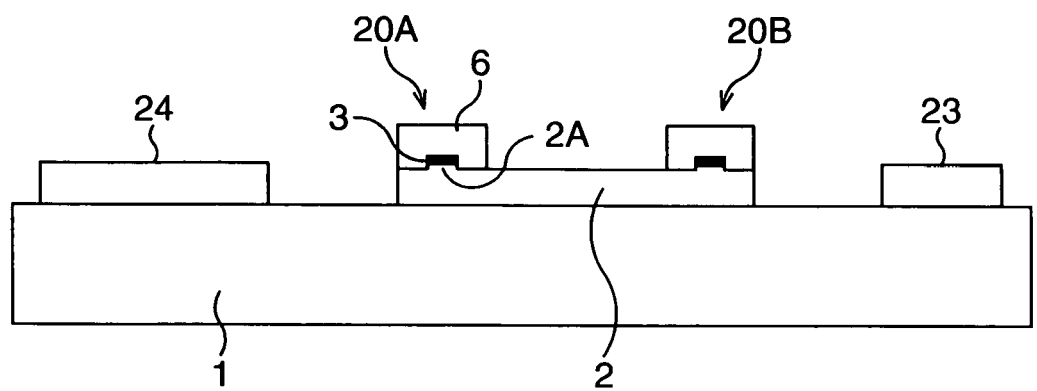
FIG. 15 is a schematic view showing a constitution of the semiconductor Mach-Zehnder type optical modulator in the fifth embodiment of the present invention, and is a sectional view in the V to V in FIG. 13.
Figure 16:
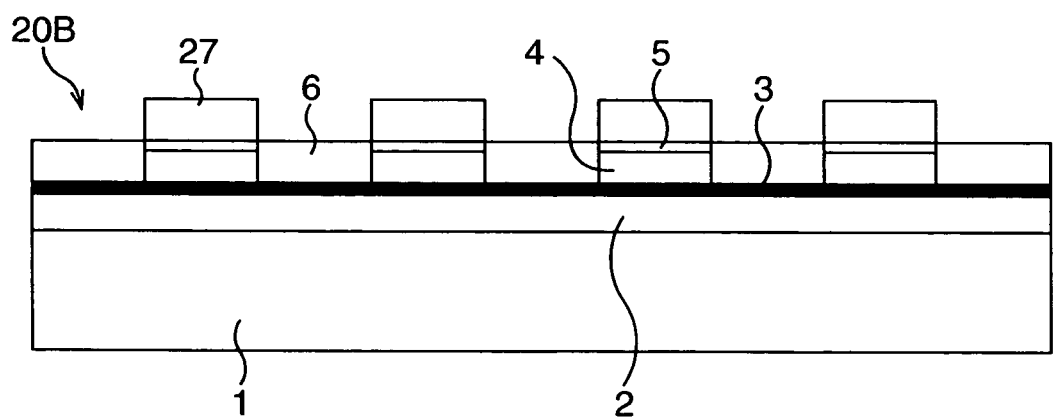
FIG. 16 is a schematic view showing a constitution of the semiconductor Mach-Zehnder type optical modulator in the fifth embodiment of the present invention, and is a sectional view in the VI to VI in FIG. 13.

An n-type conductive InP layer (n-InP layer, a conductive semiconductor layer) 2 is formed in a plane shape on the high-resistance InP substrate 1 as shown in FIGS. 14 to 16. Since the n-InP layer 2 is a layer to which DC bias is applied from a DC bias electrode 31 which will be described later, the n-InP layer 2 is also called an n-InP bias layer (high conductivity layer). The film thickness of the n-InP layer 2 is 1.5 μm. A dopant of this n-InP layer 2 is silicone (Si), and the dopant concentration is $1.0 \times 10^{18}/cm^3$.

Here, in the n-InP layer 2, two line-shaped projecting portions 2A extending in a direction of an optical axis are formed on its top surface (more specifically, the part on which an i-MQW layer 3 described later, above which two arms 20A and 20B are constructed, is formed) as shown in FIGS. 14 and 15. The film thickness of this projecting portion 2A is 0.3 μm, and is formed in uniform film thickness along the optical axis. The i-MQW layer 3 as an optical waveguide core layer which will be described later contacts this projecting portion 2A, and therefore, the n-InP layer 2 also functions as an optical waveguide clad layer (conductive semiconductor clad layer).

A buffer layer may be provided between the n-InP layer 2 and the high-resistance InP substrate 1. When the buffer layer is formed as a high-resistance InP layer, an etch stop layer (i-InGaAsP layer) constituted of undoped InGaAsP (i-InGaAsP) may be provided between the n-InP layer 2 and the high-resistance InP layer. An embedded type optical waveguide 20 including the first and the second arms (optical waveguides) 20A and 20B, and a first and a second multi mode interference (MMI) optical couplers 21 and 22 are formed on the n-InP layer 2 as shown in FIG. 13, and a Mach-Zehnder optical interferometer is constituted by them.

Here, FIG. 14 is a sectional view in the line IV to IV in FIG. 13, FIG. 15 is a sectional view in the line V to V in FIG. 13, and FIG. 16 is a sectional view in the line VI to VI in FIG. 13.

The two arms 20A and 20B which constitute the Mach-Zehnder interferometer are each constituted of the n-InP layer 2 (more specifically, the projecting portion 2A of the n-InP layer 2), the i-MQW layer 3, a p-InP layer 4, a p-InGaAs layer 5 and SI—InP layer 6. The sectional structures of the two arms 20A and 20B are totally the same here.

First, the i-MQW layer (the optical waveguide core layer, the insulating semiconductor core layer) 3 is constituted of an undoped multiple quantum well (i-MQW), and is formed in a line shape along the optical axis on the projecting portion 2A of the n-InP layer 2 as shown in FIGS. 14 to 16. The i-MQW layer 3 has 25 layers of well layers, and has the structure in which these well layers are sandwiched by barrier layers. The materials of the well layers and the barrier layers are respectively InGaAsP and InP which lattice matches InP. The film thickness of both the well layer and the barrier layer is 10 nm. Accordingly, the film thickness of the entire i-MQW layer 3 is 0.5 μm. The i-MQW layer 3 is formed to have the uniform film thickness along the optical axis. The i-MQW layer 3 has the width (here, 1.5 μm) of about a beam diameter of field distribution of propagation basic mode of the optical waveguides 20A and 20B constituting the two arms. The PL emission wavelength of the i-MQW layer 3 is 1.43 μm.

As shown in FIGS. 14 and 16, a P-type conductive InP layer (a p-InP layer, a conductive semiconductor clad layer, an optical waveguide clad layer) 4, and a p-type conductive InGaAs layer (p-InGaAs layer, a conductive semiconductor layer) 5 in order from the bottom are formed on the i-MQW layer 3. The film thickness of p-InP layer 4 is 2.0 μm, and the film thickness of p-InGaAs layer 5 is 0.3 μm. The width of these layers is equal to the width of the i-MQW layer 3, and is 1.5 μm. Dopant of the p-InP layer 4 and the p-InGaAs layer 5 is zinc (Zn), and the dopant concentrations are respectively $1.0 \times 10^{18}/cm^3$, $2.0 \times 10^{19}/cm^3$. The p-InGaAs layer 5 is the layer in contact with a discrete electrode which will be described later, and therefore, it is also called a contact layer.

As described above, the i-MQW layer 3 as the insulating semiconductor layer is made to have the structure sandwiched by the n-InP layer 2 and the p-InP layer 4 as the conductive semiconductor layers, and thereby, the electric field concentratedly occurs to the i-MQW layer 3 when the voltage is applied. An undoped InP layer (i-InP layer) of a thickness of 0.2 μm, for example, may be provided between the i-MQW layer 3 and the P—InP layer 4.

Here, as shown in FIG. 16, the P—InP layer 4 and the P—InGaAs layer 5 are formed in only the part (the part is called a phase modulation region) above which the discrete electrode which will be describe later is formed. Namely, the P—InP layer 4 and the P InGaAs layer 5 are formed between the discrete electrode which will be described later and the i-MQW layer 3 below the discrete electrode. Meanwhile, as shown in FIGS. 15 and 16, an SI—InP layer (a high-resistance InP layer, a high-resistance semiconductor layer, a semi-insulation semiconductor layer) 6 is formed between projecting portions (these portions become microscopic phase modulators) constituted of the p-InP layer 4 and the p-InGaAs layer 5 divided in the direction of the optical axis. The SI—InP layer as the high-resistance InP layer with less propagation loss is formed in the gap regions between a plurality of microscopic phase modulators like this, and thereby, the loss of a high-frequency electrical signal can be reduced. As shown in FIG. 16, the top surface of the SI—InP layer 6 formed between the projecting portions constituted of the p-InP layer 4 and the P—InGaAs layer 5 and the top surface of the P—InGaAs layer 5 are at the position of the same height, and the entire surface is a flat surface.

At the sides of the i-MQW layer 3, a ferrum (Fe)-doped SI—InP layer (a high-resistance InP layer, a hish-resistance semiconductor layer, a semi-insulation semiconductor layer) 6 is formed as shown in FIG. 14. Namely, as shown in FIG. 14, the SI—InP layer 6 is formed at both sides of each of the layers of a part of the n-InP layer 2, the i-MQW layer 3, the P—InP layer 4 and the p-InGaAs layer 5. This provides the structure in which the part of the n-InP layer 2, the i-MQW layer 3, the p-InP layer 4 and p-InGaAs layer 5 are embedded in the SI—InP layer 6.

These SI—InP layer 6, i-MQW layer 3, p-InP layer 4 and p-InGaAs layer 5 are all formed on the n-InP layer 2 and constitute a mesa structure. The width of the mesa structure is 8.0 µm. The top surface of the n-InP layer (n-InP bias layer) 2 is exposed between the first arm 20A and the second arm 20B. In this embodiment, the n-InP layer 2 formed on the underside of the i-MQW layer 3 is constituted as the layer including both the function as the optical waveguide clad layer and the function of the bias layer, but the n-InP layer 2 is not limited to this, and the n-InP layer 2 may have the structure divided into, for example, two layers that are an n-InP layer functioning as the optical waveguide clad layer and the n-InP bias layer (high conductivity layer) functioning as the bias layer. In this case, an InGaAsP etch stop layer of the thickness of 50 nm, for example, can be provided between the n-InP layer and the n-InP bias layer.

Incidentally, two coplanar/slot line type electrodes 23 and 24 are formed at the sides of the first and the second arms 20A and 20B along the light traveling direction (namely, along the arms) as shown in FIG. 13. The two coplanar/slot line electrodes 23 and 24 are formed to have a film thickness of 6.0 µm at the locations spaced from the end surfaces (namely, the end surfaces of the mesa structure and the n-InP bias layer 2) of the first and the second arms 20A and 20B by a predetermined distance (for example, 15 µm) by gold (Au) plating.

Out of the two slot line electrodes 23 and 24, one electrode 23 is connected to a signal terminal of a high-frequency driving power supply 25. This electrode 23 is called a signal side line electrode (first line electrode). The other electrode 24 is connected to a ground terminal of the high-frequency driving power supply 25. This electrode 24 is called a ground side line electrode (second line electrode). A high-frequency electrical signal is inputted from one ends of the two slot line electrodes 23 and 24, and is terminated at a terminating resistance 26 connected to the other ends of the slot line electrodes 23 and 24.

Here, the width of the signal side line electrode 23 is 20 µm, and the width of the ground side line electrode 24 is 240 µm. In this manner, the width of the ground side line electrode 24 is larger than the width of the signal side line electrode 23, which is the asymmetrical structure. A plurality of electrodes (discrete electrodes, phase modulation electrodes) 27 and 28 for phase modulation are discretely formed respectively at predetermined intervals along the light traveling direction on the first and the second arms 20A and 20B (the top part of the aforementioned mesa structure) as shown in FIG. 13. These discrete electrodes 27 and 28 are formed to have a film thickness of 4.0 µm by gold (Au) plating. Here, ten of each of the discrete electrodes 27 and 28 are respectively formed on the two arms. However, due to space limitations, the number of electrodes is reduced in FIG. 13, and only five of the respective electrodes are shown.

These slot line electrodes 23 and 24 and the discrete electrodes 27 and 28 are electrically connected respectively via air bridge wirings 29 and 30 formed by gold (Au) plating as shown in FIG. 13. The discrete electrodes 27, which are connected to the signal side line electrode 23, are called signal side discrete electrodes (first discrete electrodes) and the discrete electrodes 28, which are connected to the ground side line electrode 24, are called ground side discrete electrodes (second discrete electrodes). The optical waveguide (the second arm) 20B at the side where the signal side discrete electrodes are formed is called a signal side optical waveguide (first optical waveguide), and the optical waveguide (the first arm) 20A at the side where the ground side discrete electrodes are formed is called a ground side optical waveguide (second optical waveguide).

Microscopic phase modulators 32 and 33 are constituted by the respective discrete electrodes 27 and 28 and the optical waveguides 20A and 20B constituted of the p-InGaAs layer 5, the p-InP layer 4, the i-MQW layer 3 and the n-InP layer 2 which are formed below the respective discrete electrodes 27 and 28. Since a plurality of discrete electrodes 27 and 28 are discretely provided on the two arms 20A and 20B respectively, the two arms 20A and 20B are provided with a plurality of microscopic phase modulators 32 and 33, respectively. The microscopic phase modulators 32 at the signal side which are constituted by the signal side optical waveguide 20B and a plurality of signal side discrete electrodes 27A are called signal side phase modulators (first phase modulators), and the microscopic phase modulators 33 at the ground side which are constituted by the ground side optical waveguide 20A and a plurality of ground side discrete electrodes 28A are called ground side phase modulators (second phase modulators).

At an element end side of this optical modulator, an electrode pad for DC bias (DC bias electrode) 31 is formed to have a thickness of 4.0 µm by gold (Au) plating as shown in FIG. 13. In this part, the n-InP bias layer 2 (see FIGS. 14 to 16) formed on bottoms of the two optical waveguides (arms) 20A and 20B is formed to be drawn out to the bottom of the electrode pad 31. As a result, the DC bias electrode pad 31 is electrically connected to the n-InP bias layer 2. When the optical modulator is driven, DC bias is applied to the DC bias electrode pad 31 from the DC voltage source, and thereby the potential in the n-InP bias layer 2 at DC can be adjusted to a desired value. As shown in FIG. 14, the i-MQW layers 3 formed on the respective two arms 20A and 20B are both formed on the common n-InP bias layer 2, so that the potentials at DC on the undersurfaces of the i-MQW layers 3 are substantially equal in the two arms 20A and 20B.

Incidentally, it is one of the important objects to realize low chirping (including zero chirping) in a capacitively loaded type Mach-Zehnder optical modulator made of InP related materials. Therefore, it is necessary to clarify the structural parameter which brings about low chirping (including zero chirping) and apply this to the capacitively loaded type Mach-Zehnder optical modulator made of the InP related materials.

Here, a coefficient expressing the amount of wavelength chirping and a sign is set as a chirp parameter α, and is defined by the following formula (1).

[Mathematical formula 1]

$$\alpha = 2P \cdot \frac{\left(\frac{d\phi}{dt}\right)}{\left(\frac{dP}{dt}\right)} \qquad (1)$$

(P: output light intensity, φ: output light phase, t: time)

Figure 17A:
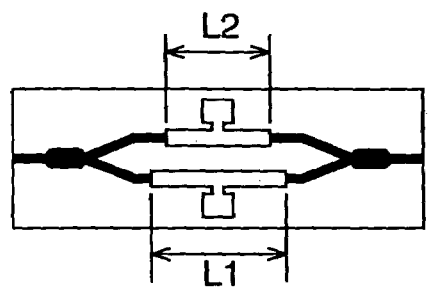
FIGS. 17A and 17B are diagrams for explaining the relationship between an electrode length asymmetry parameter r and a chirp parameter α in an ordinary push-pull type of Mach-Zehnder type optical modulator.
Figure 17B:
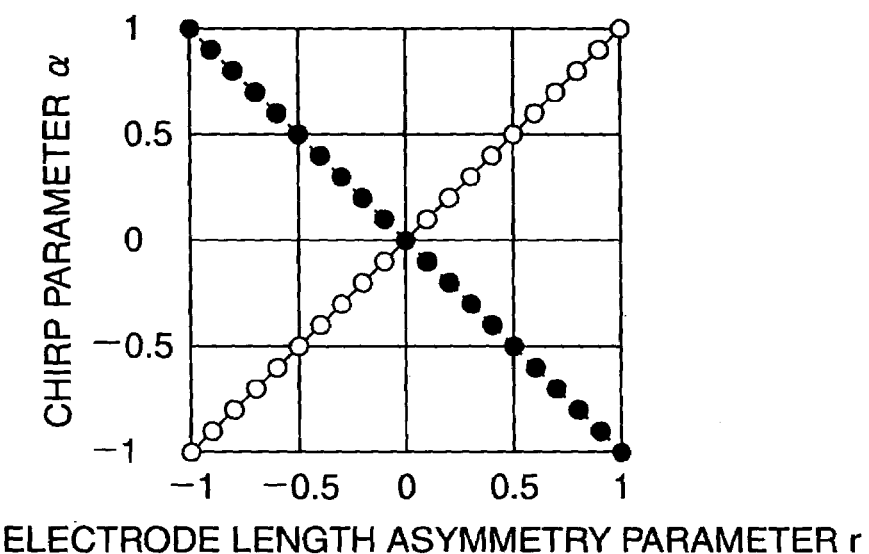
Figure 37A:
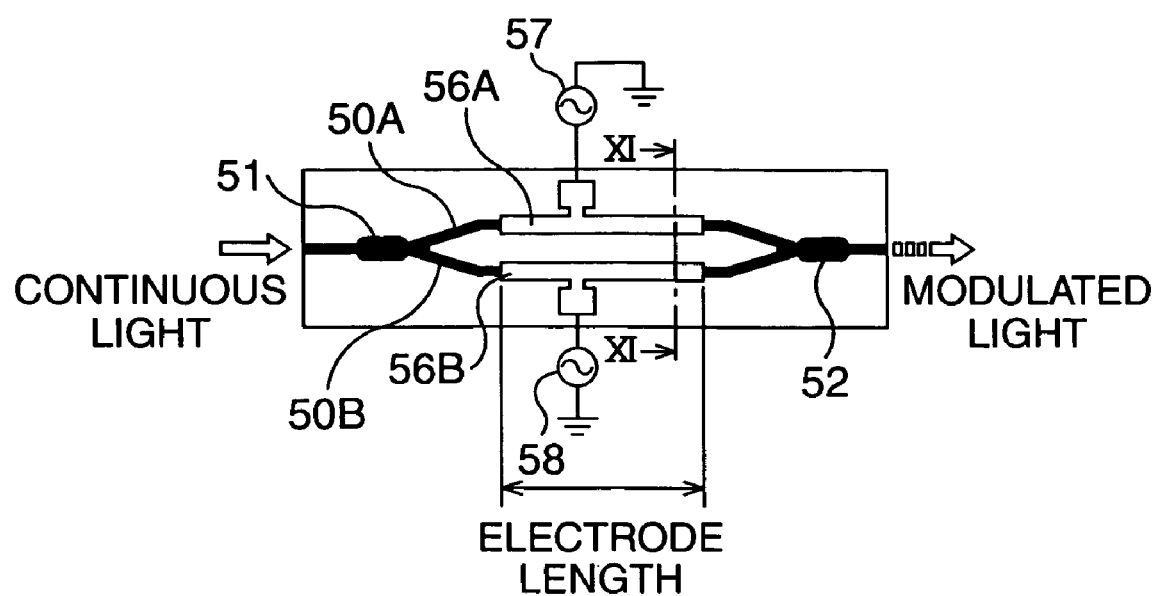
FIGS. 37A and 37B are schematic views for explaining a constitution of a conventional push-pull type of Mach-Zehnder type optical modulator.
Figure 37B:
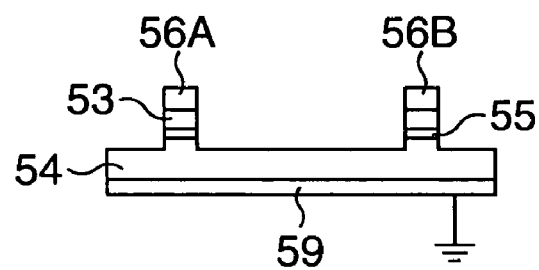
Figure 38A:
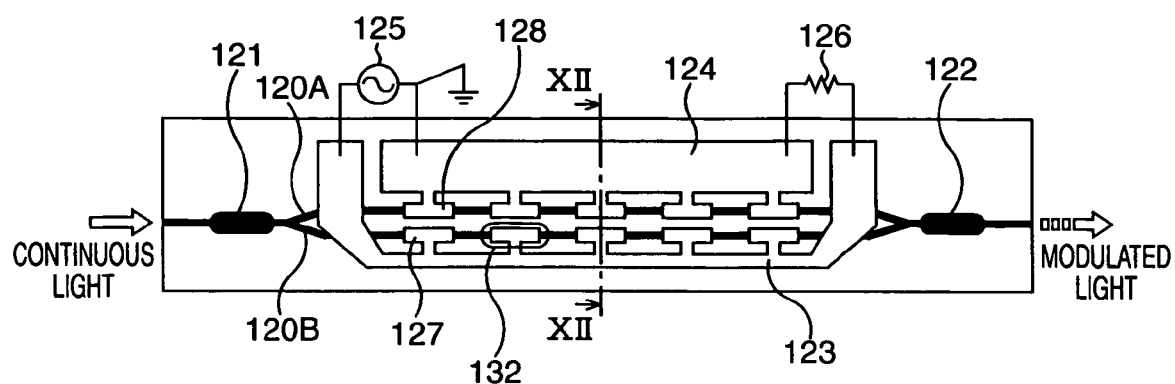
FIGS. 38A and 38B are schematic views for explaining a constitution of a Mach-Zehnder type optical modulator having a conventional capacitively loaded type electrode structure.
Figure 38B:
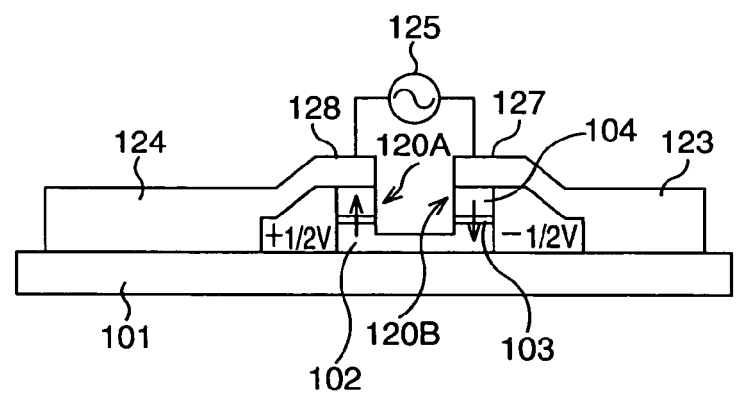

Here, FIGS. 17A and 17B are diagrams for explaining the relationship between the chirp parameter α and an electrode length asymmetry parameter r in an ordinary push-pull type of Mach-Zehnder optical modulator [for example, see FIGS. 37A and 37B]. FIG. 17A shows the structure used for calculation of the chirp parameter α, and FIG. 17B shows the values of the chirp parameter α which are obtained as the calculation results when the electrode length is changed. In FIG. 17B, the vertical axis represents the chirp parameter α and the horizontal axis represents the electrode length asymmetry parameter r.

Here, an electrode length asymmetry parameter r' in the ordinary push-pull type of Mach-Zehnder optical modulator as shown in FIG. 17A is defined by the following formula (2).

$$r'=(L2-L1)/(L2+L1) \qquad (2)$$

In FIG. 17B, the case where the chirp parameter α is zero (α=0) shows zero chirping without wavelength change. The case of α>0 shows that the light wavelength changes to the short wavelength side when the light changes from the OFF state to the ON state (or from the OFF state to the ON state). The case of α<0 shows that the light wavelength changes to the long wavelength side when the light changes from the OFF state to the ON state (or from the OFF state to the ON state). The absolute value of α indicates the magnitude of the wavelength change.

In FIG. 17B, the values of two kinds of chirp parameters α [expressed by ● and ○ respectively in FIG. 17B] are obtained for each value of the electrode length asymmetry parameter r'. These values correspond to the two kinds of drive conditions distinguished by whether the phase difference is made 0 (2π, 4π . . . , 2nπ: n is a natural number) or π (3π, 5π . . . ; (2n+1)π: n is a natural number) (namely, whether corresponding to the on state of light or the off state of light) when the voltage supplied from the high-frequency driving power supply 25 is the positive side (+V) in the Mach-Zehnder type optical modulator. Namely, these values respectively correspond to the drive condition (the first drive condition; the drive condition for adjusting the phase difference in the OFF state of light) in which the optical output becomes small when the reverse bias voltage, which is applied to the electrode (DC bias electrode for phase difference adjustment which will be described later) formed on one of the optical waveguides (arm; for example, the signal side optical waveguide), is made large, and the drive condition (the second drive condition; the drive condition for adjusting the phase difference in the ON state of light) in which the optical output becomes large contrary the first drive condition when the reverse bias voltage applied to this electrode is made large. In FIG. 17B, the value of the chirp parameter α in the case of the first drive condition is expressed by ●, and the value of the chirp parameter α in the case of the second drive condition is expressed by ○.

As shown in FIG. 17B, when the electrode lengths are equal in the two optical waveguides (arms), the values of the chirp parameters α correspond to each other in the two drive conditions and equal zero in the ordinary push-pull type of Mach-Zehnder optical modulator. Meanwhile, when the asymmetry property of the electrode length is made large (namely, the value of the electrode length asymmetry parameter r' is made large), the chirp parameters α gradually separate from zero, but the absolute values of the chirp parameters are equal in the two drive conditions, and the signs become opposite from each other.

Meanwhile, the electrode length asymmetry parameter r in the capacitively loaded type of Mach-Zehnder type optical modulator made of InP related materials is defined by the following formula (3) with a total electrode length by adding up the respective lengths of a plurality of ground side discrete electrodes 28 set as LG, and with a total electrode length by adding up the respective lengths of a plurality of signal side discrete electrodes 27 set as LS.

$$r=(LG-LS)/(LG+LS) \qquad (3)$$

When the number of ground side discrete electrodes 28 and the number of signal side discrete electrodes 27 are the same, and the lengths of these discrete electrodes 27 and 28 are all equal in the respective optical waveguides, the same electrode length asymmetry parameter r is obtained when the electrode length asymmetry parameter r is defined by the above-described formula (3) with each length of a plurality of ground side discrete electrodes 28 set as LG and with each length of a plurality of signal side discrete electrodes 27 set as LS. In this embodiment, the number of ground side discrete electrodes 28 and the number of signal side discrete electrodes 27 are the same, and the lengths of these discrete electrodes 27 and 28 are all equal in the respective optical waveguides, and therefore, the electrode length asymmetry parameter r is calculated with each length of a plurality of ground side discrete electrodes 28 set as LG and each length of a plurality of signal side discrete electrodes 27 set as LS for convenience.

Figure 18:
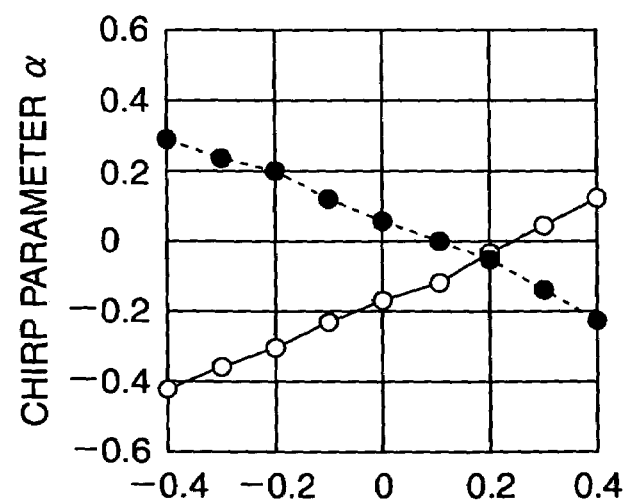
FIG. 18 is a diagram for explaining the relationship between an electrode length asymmetry parameter r and a chirp parameter α in the semiconductor Mach-Zehnder type optical modulator in the fifth embodiment of the present invention, and shows values of the chirp parameter α obtained as calculation results when the electrode length is changed.

Here, FIG. 18 is a diagram for explaining the relationship between the chirp parameter α and the electrode length asymmetry parameter r in the capacitively loaded type of Mach-Zehnder type optical modulator made of InP related materials, and shows the values of the chirp parameter α which are obtained as calculation results when the electrode length is changed. In FIG. 18, the vertical axis represents the chirp parameter α, and the horizontal axis represents the electrode asymmetry parameter r.

In FIG. 18, the values of two kinds of chirp parameters α [expressed respectively by ● and ○ in FIG. 18] are obtained for each value of the electrode length asymmetry parameter r. These values correspond to the two kinds of drive conditions distinguished by whether the phase difference is made 0 (2π, 4π . . . , 2nπ: n is a natural number) or π (3π, 5π . . . ; (2n+1)π: n is a natural number) (namely, whether the phase difference is made to correspond to the on state of light or the off state of light) when the voltage supplied from the high-frequency driving power supply 25 is at a positive side (+V) in the Mach-Zehnder type optical modulator. Namely, these values respectively correspond to the drive condition (the first drive condition; the drive condition for adjusting the phase difference in the OFF state of light) in which the optical output becomes small when the reverse bias voltage, which is applied to the electrode (DC bias electrode for phase difference adjustment which will be described later) formed on one of the optical waveguides (arm; for example, the signal side optical waveguide), is made large, and the drive condition (the second drive condition; the drive condition for adjusting the phase difference in the ON state of light) in which the optical output becomes large contrary to the first condition when the reverse bias voltage applied to this electrode is made large. In FIG. 18, the value of the chirp parameter $\alpha$ in the case of the first drive condition is expressed by ●, and the value of the chirp parameter $\alpha$ in the case of the second drive condition is expressed by ○.

Here, as shown in FIG. 13, the capacitively loaded type of Mach Zehnder type optical modulator has the structure in which the width of the ground side line electrode 24 and the width of the signal side line electrode 23 are asymmetrical (asymmetry property of the electrodes). As shown in FIG. 18, in the capacitively loaded type of Mach-Zehnder type optical modulator, the lengths of the discrete electrodes 27 and 28 (electrode length) discretely formed on the two optical waveguides (arms) 20A and 20B are all equal on the respective arms 20A and 20B. In calculation, the operation wavelength is set at 1.54 μm. The reverse bias voltage of 6V is further applied to the two optical waveguides 20A and 20B via the DC bias electrode 31. The frequency chirping of the output light when an electrical signal of a small amplitude which changes in a sign wave of 10 GHz is inputted from the high-frequency driving power supply 25 in this state and the modulating operation is performed, is calculated. The amplitude ratio of the voltages which are applied to the two optical waveguides 20A and 20B by the high-frequency driving voltage is obtained by three-dimensional finite element electromagnetic field analysis, and is considered in the calculation of chirping. As for the refraction index change and absorption coefficient change of the optical waveguide with respect to the applied voltage, the values actually measured with respect to the element structure in this embodiment are used. The value of the chirp parameter $\alpha$ is calculated based on the optical output change rate and the wavelength chirping at the point of time when the change rate of the optical output intensity with respect to time is the largest.

By comparing the calculation result of FIG. 18 and the aforementioned calculation result in FIGS. 17A and 17B, it has been found out that the relationship between the chirp parameter $\alpha$ and the electrode length asymmetry parameter r in the capacitively loaded type of Mach-Zehnder type optical modulator made of InP related materials has the following qualitative characteristics due to the absorption of light in the InP related materials and the asymmetry property of the electrodes in the capacitively loaded type of Mach-Zehnder type optical modulator.

Namely, in the calculation result in FIGS. 17A and 17B, the values of the chirp parameters $\alpha$ just correspond to each other between the two drive conditions when the electrode lengths are symmetric (the electrode length asymmetry parameter r=0), but in the calculation result in FIG. 18, the chirp parameters $\alpha$ correspond to each other between the two drive conditions when the electrode lengths are asymmetrical (the electrode length asymmetry parameter r>0; namely, when the length LG of the ground side discrete electrode 28 or the total electrode length LG by adding up the respective lengths of a plurality of ground side discrete electrodes 28 is longer).

In the calculation results in FIGS. 17A and 17B, two straight lines expressing the values of the chirp parameter $\alpha$ are symmetrical about the line of the chirp parameter $\alpha=0$, and therefore, when the chirp parameters $\alpha$ correspond to each other in the two drive conditions, the value of the chirp parameters $\alpha$ becomes zero. On the other hand, in the calculation result in FIG. 18, the intersection of the two straight lines expressing the values of the chirp parameter $\alpha$ moves to the negative side of the chirp parameter $\alpha$. Therefore, when the values of the chirp parameter $\alpha$ correspond to each other in the two drive conditions, the value of them is a smaller value than zero. What causes the chirp parameter $\alpha$ to displace to the negative side is considered to be the influence of the absorption of light by the InP related materials.

It is possible to utilize the qualitative tendency of the chirp parameter $\alpha$ with respect to asymmetry property of the electrode length for setting the structural parameters (for example, design value of the electrode length) which brings about low chirping (including zero chirping) in the capacitively loaded type of Mach-Zehnder type optical modulator made of InP related materials. Namely, it has become obvious that by making the electrode length of the ground side discrete electrode 28 longer than the electrode length of the signal side discrete electrode 27 (namely, the electrode length asymmetry parameter r defined as described above is set to be larger than zero) based on the qualitative tendency of the chirp parameter $\alpha$ with respect to asymmetry property of the electrode length as described above, the value of the chirp parameter $\alpha$ can be made closer to zero as compared when the electrode lengths are equal in the two arms.

More specifically, as understood from the calculation result of FIG. 18, by setting the electrode length asymmetry parameter r at 0.1 (in the case of the first drive condition) or 0.25 (in the case of the second drive condition), the chirp parameter $\alpha$ can be made substantially equal to zero in any one of the two different drive conditions. Namely, by setting the electrode length of the ground side discrete electrode 28 and the electrode length of the signal side discrete electrode 27 so that the electrode length asymmetry parameter r becomes 0.1 or 0.25 in accordance with the drive condition, it is possible to make the chirp parameters $\alpha$ substantially equal to zero in any one of the two different drive conditions.

This means that each electrode length of the ground side discrete electrodes 28 and the signal side discrete electrodes 27 is set based on the characteristic (chirp parameter electrode length asymmetry parameter characteristic; see FIG. 18) expressing the relationship between the chirp parameter $\alpha$ expressing the chirping amount (more specifically, the value constituted by the chirping amount and a sign showing whether it is in the long wavelength side or the short wavelength side) and the electrode length asymmetry parameter r showing the asymmetry property of the electrode length (more specifically, the value showing the ratio of the difference between the ground side discrete electrode 28 and the signal side discrete electrode 27 to the total electrode length of all the discrete electrodes 27 and 28).

The zero chirping operation can be realized in the semiconductor Mach-Zehnder type optical modulator by manufacturing the capacitor-loaded type of semiconductor Mach-Zehnder type optical modulator made of the InP related materials so that the respective electrode lengths of the ground side discrete electrodes 28 and the signal side discrete electrodes 27 become the respective electrode lengths which are set by using the electrode length asymmetry parameter r as the structural parameter.

In this embodiment, it becomes possible to make the chirp parameter α substantially zero (α=0) in any of the two kinds of drive conditions by setting the value of the electrode length asymmetry parameter r at 0.1 or 0/25. The value of the electrode length asymmetry parameter r which makes this chirp parameter α substantially zero (α=0) changes in accordance with the element structure and the other drive conditions. For example, in this embodiment, the reverse bias voltage applied to the two waveguides via the DC bias electrode 31, which is one of the other drive conditions, is set at 6V. On the other hand, in the case where the reverse bias voltage is set at 7.3 V, and the absorption of light occurring in the optical waveguide is further increased, it becomes possible to make the chirp parameter α substantially zero (α=0) in any one of the two kinds of drive conditions when the value of the electrode length asymmetry parameter r is 0.05 (in the case of the first drive condition) or 0.36 (in the case of the second drive condition). In the case where the reverse bias voltage is set at 3 V or 9.2 V, it becomes possible to make the chirp parameter α substantially zero (α=0) in any one of the two kinds of drive conditions when the value of the electrode length asymmetry parameter r is 0.17 (in the case of the first and second drive conditions) in either case.

In summary, in the case of the first drive condition, when the value of the electrode asymmetry parameter r is set to be within the range of 0.05 to 0.17, it is possible to make the chirp parameter α substantially zero, and the zero chirping operation can be realized in the capacitively loaded type of Mach-Zehnder type optical modulator made of InP related materials. In the case of the second drive condition, when the value of the electrode length asymmetry parameter r is set to be within the range of 0.17 to 0.36, it is made possible to make the chirp parameter α substantially zero, and the zero chirping operation can be realized in the capacitively loaded type of Mach-Zehnder type optical modulator made of InP related materials.

More specifically, the electrode length of the ground side discrete electrode 28 and the electrode length of the signal side discrete electrode 27 can be set as follows. In the capacitively loaded type of Mach-Zehnder type optical modulator in this embodiment, the lengths of the discrete electrodes 27 and 28 (electrode lengths) discretely formed on the two arms (optical waveguides) 20A and 20B differ in the two arms 20A and 20B as shown in FIG. 13. Here, the length (electrode length) of the signal side discrete electrode 27 is set as LS μm and the length of the ground side discrete electrode 28 is set as LG μm.

The positions of one end portions of a pair of discrete electrodes 27 and 28 opposed to each other in the two arms 20A and 20B are aligned. The discrete electrodes 27 and 28 are respectively formed at fixed intervals on the respective arms 20A and 20B. Here, the cycles of the discrete electrodes 27 and 28 are each 250 μm. Thereby, the advantage that the structure of the element is simplified and becomes easy to make is provided. A plurality of discrete electrodes 27 and 28 may be provided so that the positions of the one end portions are displaced. A plurality of discrete electrodes 27 and 28 may be provided at different intervals (different cycles).

In this embodiment, the values of LS and LG are set as follows corresponding to each of r=0.1, 0.25.

LS=90 μm, LG=110 μm (in the case of r=0.1; in the case of the first drive condition)

LS=75 μm, LG=125 μm (in the case of r=0.25; in the case of the second drive condition)

By setting the electrode length LS of the signal side discrete electrode 27 and the electrode length LG of the ground side discrete electrode 28 in this manner, the zero chirping operation to make the chirping parameter α zero (α=0) can be performed by only selecting any one of the two kinds of drive conditions in the capacitively loaded type of Mach-Zehnder type optical modulator in this embodiment.

Here, as for the method for selecting any one of two drive conditions, the phase difference adjustment regions are respectively provided by forming the phase adjusting DC bias electrode pads on the two optical waveguides (arms) constituting the Mach-Zehnder interferometer and the DC bias voltage is applied to these phase difference adjustment regions via the phase adjusting DC bias electrode pads, whereby a desirable drive condition is selected out of the two kinds of drive conditions distinguished in accordance with whether the phase difference of the branched lights propagating through the two optical waveguides (arms) is set at 0 (2π, 4π . . . ; 2nπ: n is a natural number) or whether it is set at π (3π, 5π . . . ; (2n+1)π: n is a natural number) as described in, for example, Patent Document 6.

In this embodiment, by making the electrode length of the ground side discrete electrode 28 longer than the electrode length of the signal side discrete electrode 27, the electrode lengths of the discrete electrodes 27 and 28, which are respectively provided on the two optical waveguides 20A and 20B, are made asymmetrical, and the conductive p-InP layer 4 and the p-InGaAs layer 5 formed below these electrodes 27 and 28 are also formed to have the same lengths as the electrode lengths. However, it is considered that after the electrode lengths of the discrete electrodes 27 and 28 are made equal and symmetrical, the length of the p-InP layer 4 or the p-InGaAs layer 5 constituting the ground side optical waveguide (first arm) 20A is made longer than the length of the P—InP layer 4 or the P—InGaAs layer 5 constituting the signal side optical waveguide (second arm) 20B by using at least one of the P—InP layer (clad layer) 4 and the P—InGaAs layer (contact layer) 5 formed below the discrete electrodes 27 and 28 as the parameter, thereby making them asymmetrical. In this case, it is considered that the same relationship as in the aforementioned FIG. 18 is obtained between the asymmetry parameter defined in accordance with the lengths of these layers and the chirp parameter α. Accordingly, the same effect as the effect according to this embodiment can be obtained.

Namely, the electrode lengths of the discrete electrodes 27 and 28 are used as the parameters (design parameters) in this embodiment, but the present invention is not limited to this, and it is suitable to constitute the operation length in the ground side phase modulator (the second phase modulator) 33 to be longer than the operation length in the signal side phase modulator (first phase modulator) 32 by using the effective operation lengths (the lengths of the portions at which the light is practically modulated) of the microscopic phase modulators 32 and 33 constituted by the discrete electrodes 27 and 28 and the optical waveguides 20A and 20B formed below the discrete electrodes 27 and 28 as the parameters. It is the length of the p-InP layer 4 as the clad layer that has a large influence on the modulation of light, and therefore, if the length of the p-InP layer (clad layer) 4 is made asymmetrical, the effect can be obtained most efficiently.

In this embodiment, the electrode lengths of individual discrete electrodes 28 (or 27) provided on the one optical waveguide 20A (or 20B) are all made equal, and the electrode length of the ground side discrete electrode 28 is constituted to be longer than the electrode length of the signal side discrete electrode 27 in the two optical waveguides 20A and 20B, but the present invention is not limited to this, and it is suitable to constitute at least the total electrode length which is obtained by adding up the electrode lengths of a plurality of ground side discrete electrodes 28 provided on the ground side optical waveguide 20A to be longer than the total electrode length which is obtained by adding up the electrode lengths of a plurality of signal side discrete electrodes 27 provided on the signal side optical waveguide 20B. Namely, it is suitable to constitute the total operation length which is obtained by adding up the operation lengths of a plurality of ground side phase modulators 33 to be longer than the total operation length which is obtained by adding up the operation lengths of a plurality of signal side phase modulators 32.

For example, the electrode lengths of the individual ground side discrete electrodes 28 and signal side discrete electrodes 27 are constituted to be different from each other. In this case, when the electrode length of one of the ground side discrete electrodes 28 is compared with the wavelength of one of the signal side discrete electrodes 27, the electrode length of the ground side discrete electrode 28 may be shorter than the electrode length of the signal side discrete electrode 27. Only the electrode length of one of the ground side discrete electrodes 28 may be constituted to be longer than the electrode lengths of the other ground side discrete electrodes 28 and the signal side discrete electrodes 27.

In short, it is suitable to constitute the average value of the respective lengths of a plurality of ground side discrete electrodes 28 to be larger than the average value of the respective lengths of a plurality of signal side discrete electrodes 27. Namely, it is suitable to constitute the average value of the respective operation lengths of a plurality of ground side phase modulators 33 to be larger than the average value of the respective operation lengths of a plurality of signal side phase modulators 32.

Next, a manufacturing method of the capacitively loaded type of Mach-Zehnder type optical modulator made of InP related materials in this embodiment will be explained with reference to FIGS. 19 to 25. For convenience of explanation, the explanation will be made by cutting out only a one-cycle portion enclosed by the dotted line in FIG. 13.

Figure 19A:
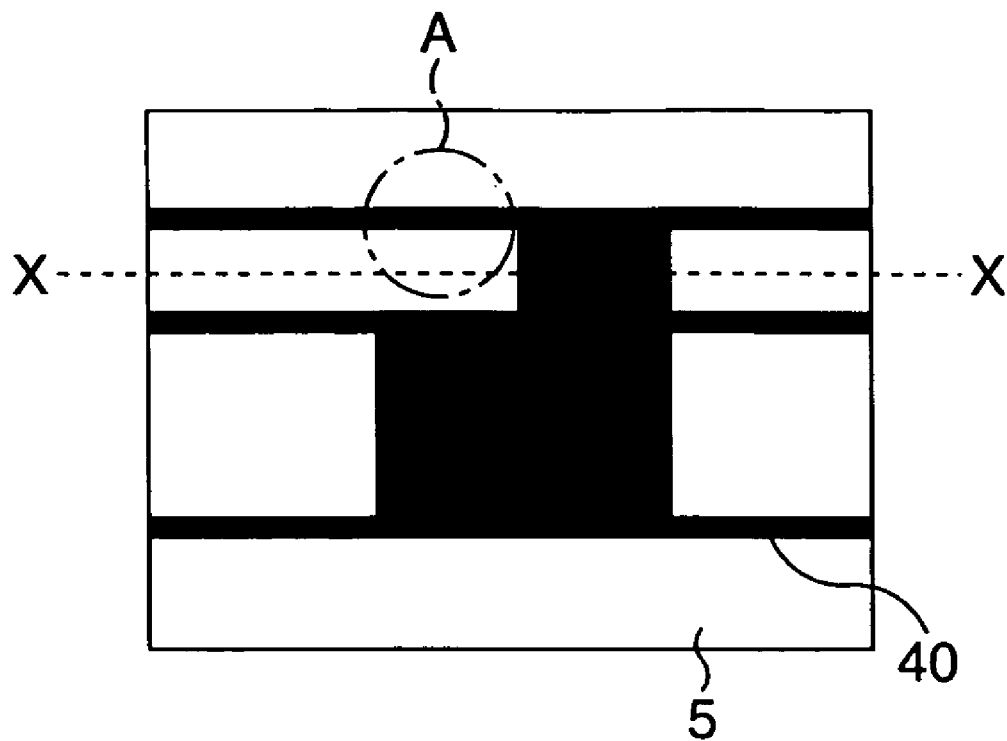
FIGS. 19A and 19B are views for explaining a manufacturing method of the semiconductor Mach-Zehnder type optical modulator in the fifth embodiment of the present invention.
Figure 19B:
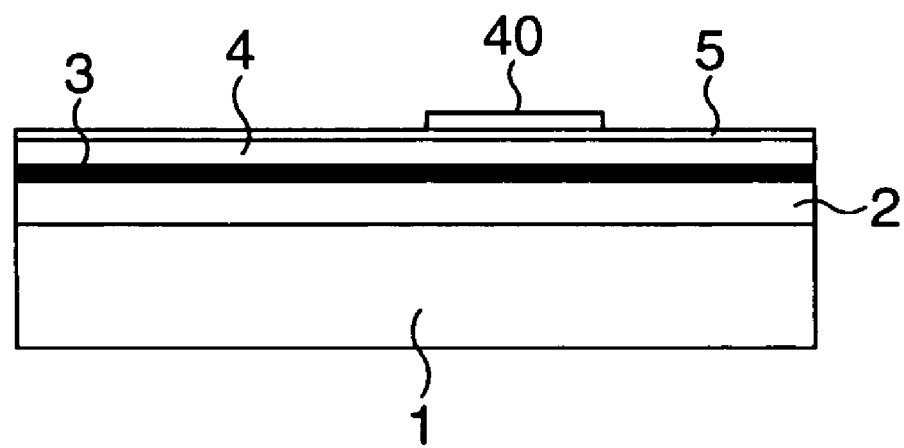

First, as shown in FIG. 19B [a sectional view taken along the line X to X in FIG. 19A], a wafer with the n-InP layer (the n-InP clad layer) 2, the i-MQW layer (the undoped multiple quantum well layer, the i-MQW optical waveguide core layer) 3, the p-InP layer (p-InP clad layer) 4 and the p-InGaAs layer (p-InGaAs contact layer) 5 formed uniformly in this order on the high-resistance InP substrate 1 by crystal growth within the wafer surface, by, for example, the MOVPE (Metal Organic Vapor Phase Epitaxy) method, is prepared.

The wafer may be constituted to include a buffer layer between the high-resistance InP substrate 1 and the n-InP layer 2. When this buffer layer is formed as the high-resistance InP layer, an etch stop layer (i-InGaAsP layer) constituted of undoped InGaAsP (i-InGaAsP) may be provided between the n-InP layer 2 and the high-resistance InP layer. Next, as shown in FIG. 19A, a mask 40 constituted of SiO$_2$ is formed on one part of the top surface of this wafer (the part including the phase modulation region).

Figure 20A:
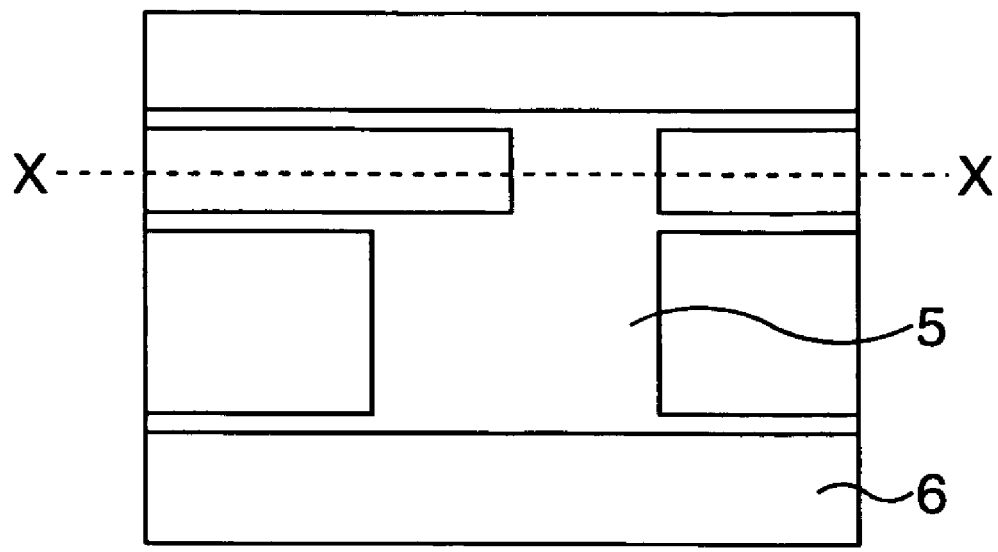
FIGS. 20A and 20B are views for explaining a manufacturing method of the semiconductor Mach-Zehnder type optical modulator in the fifth embodiment of the present invention.
Figure 20B:
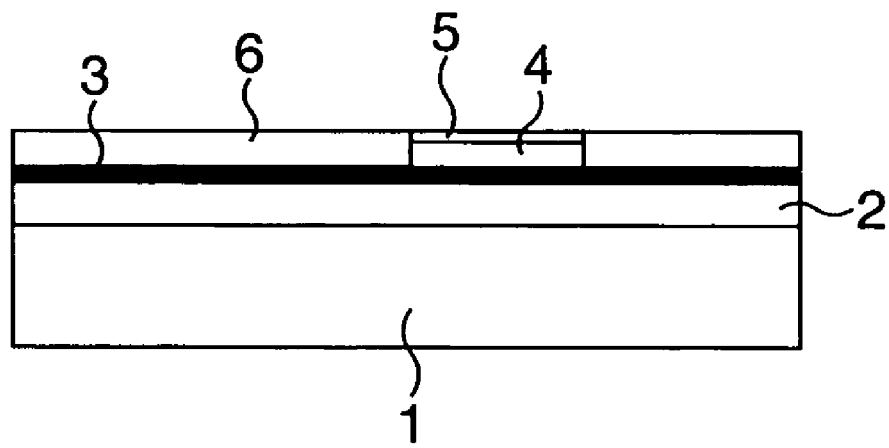

The p-InGaAs layer 5 and the p-InP layer 4 which are at the part that is not covered with this mask 40 are removed by etching, and after the i-MQW layer 3 is exposed, an SI—InP layer 6 is formed on the exposed i-MQW layer 3 by crystal regrowth or the like by, for example, the MOVPE method as shown in FIGS. 20A and 20B [FIG. 20B is the sectional view taken along the line X to X in FIG. 20A]. After the SI—InP layer 6 is formed in this manner, the mask is removed.

Figure 21A:
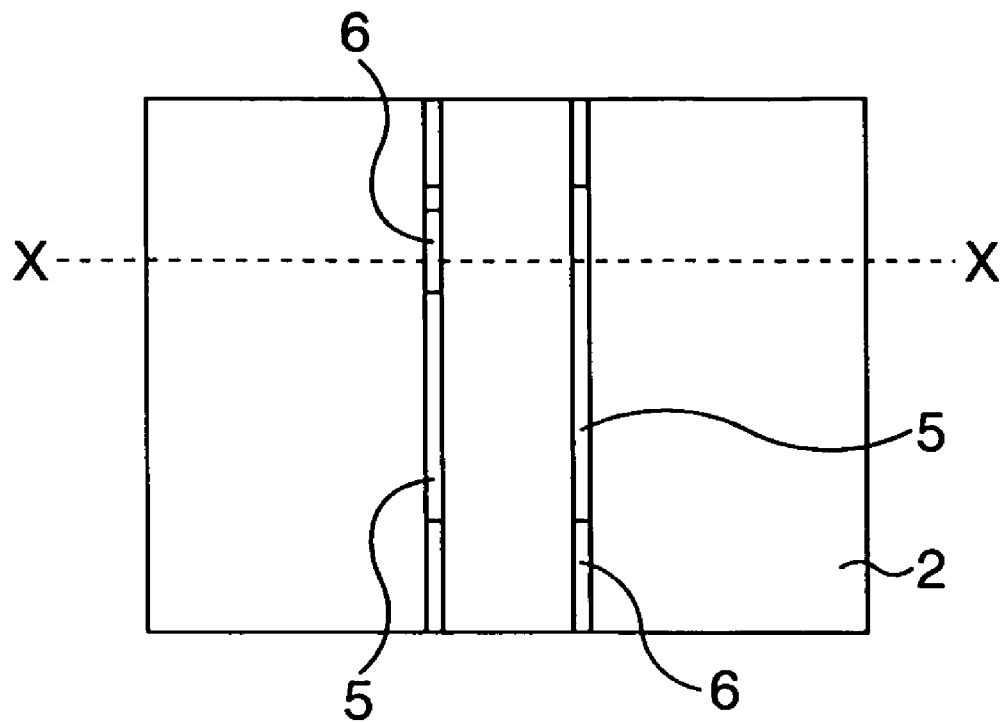
FIGS. 21A and 21B are views for explaining a manufacturing method of the semiconductor Mach-Zehnder type optical modulator in the fifth embodiment of the present invention.
Figure 21B:
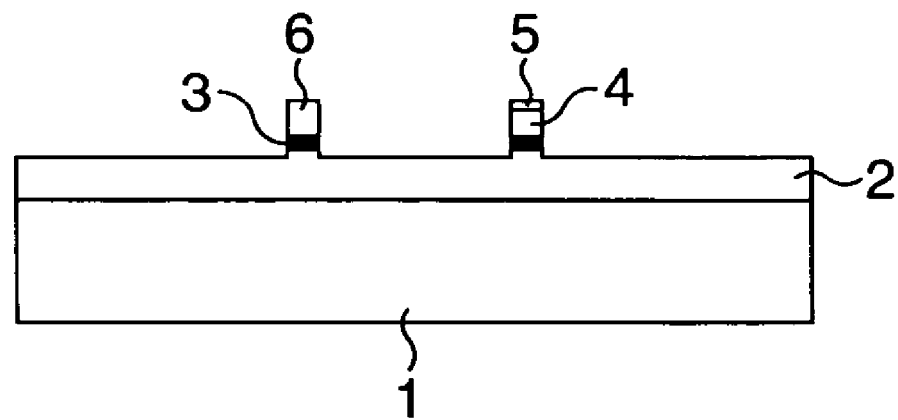

Next, as shown in FIGS. 21A and 21B [FIG. 21B is the sectional view taken along the line X to X in FIG. 21A], from the wafer top surface up to a midpoint of the n-InP layer 2, namely, part of the p-InGaAs layer 5, the p-InP layer 4, the SI—InP layer 6, the i-MQW layer 3 and the n-InP layer 2 is removed, and a mesa structure is formed. In this case, a mask constituted of SiO$_2$ is also previously formed on the parts which are to be the optical waveguides on the SI—InP layer 6 and the p-InGaAs layer 5. The parts of the mesa structure thus formed become the two optical waveguides (arms) 20A and 20B which constitute the Mach-Zehnder interferometer. Here, only the one cycle portion which is encircled by the dotted line in FIG. 13 is explained, and therefore, the arms 20A and 20B constituting the Mach-Zehnder interferometer are formed, but the MMI optical couplers 21 and 22, and the optical waveguides 20 at the input side and the output side are formed at the same time as will be understood.

Figure 22A:
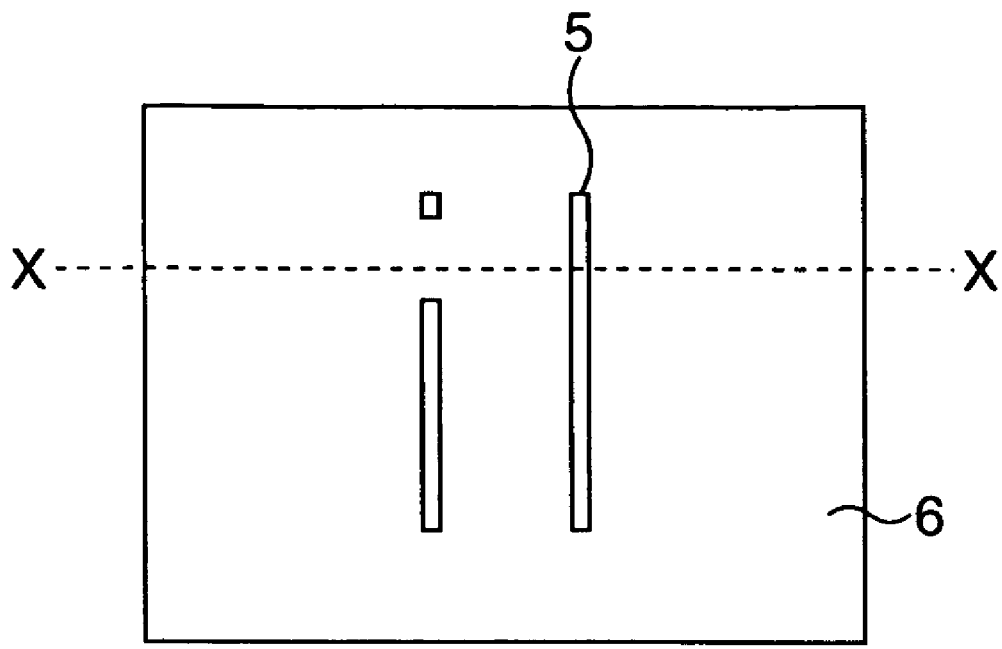
FIGS. 22A and 22B are views for explaining a manufacturing method of the semiconductor Mach-Zehnder type optical modulator in the fifth embodiment of the present invention.
Figure 22B:
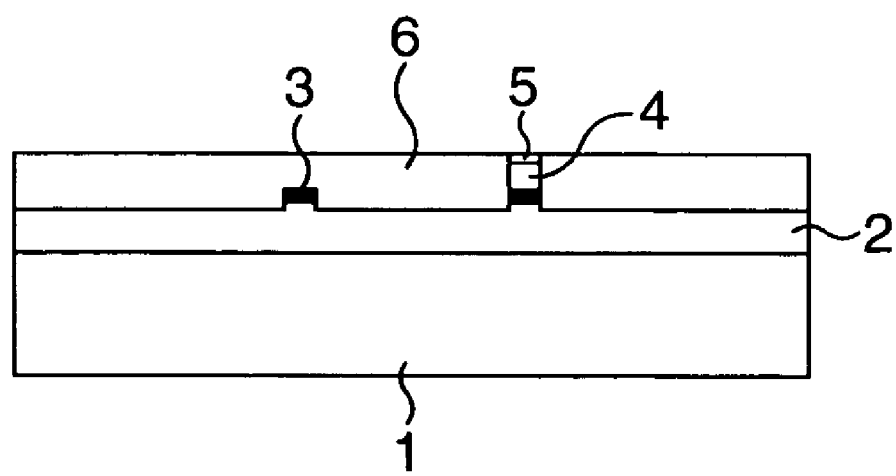

Subsequently, in the state in which the SiO$_2$ mask is left, the SI—InP layer 6 is formed at the portions at both sides of the mesa structures (optical waveguides) on the n-InP layer 2, which is exposed by dry etching, by crystal growth by using embedded growth technique by, for example, the MOVPE method as shown in FIGS. 22A and 22B [FIG. 22B is the sectional view taken along the line X-X in FIG. 22A). Thereafter, the SiO$_2$ mask is removed.

Figure 23A:
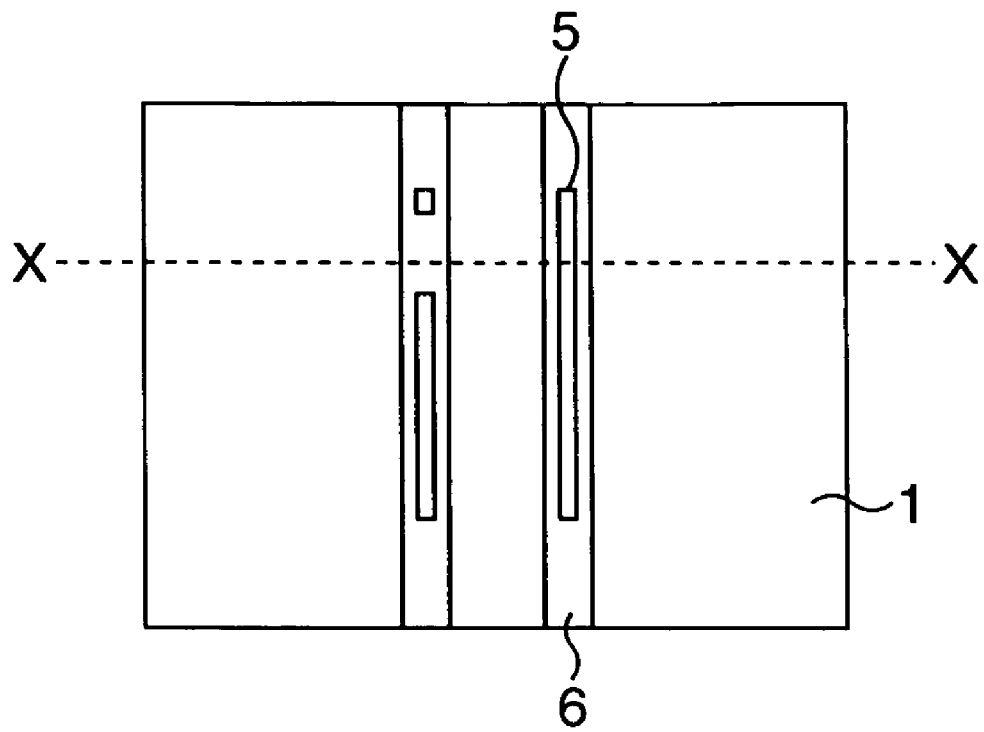
FIGS. 23A and 23B are views for explaining a manufacturing method of the semiconductor Mach-Zehnder type optical modulator in the fifth embodiment of the present invention.
Figure 23B:
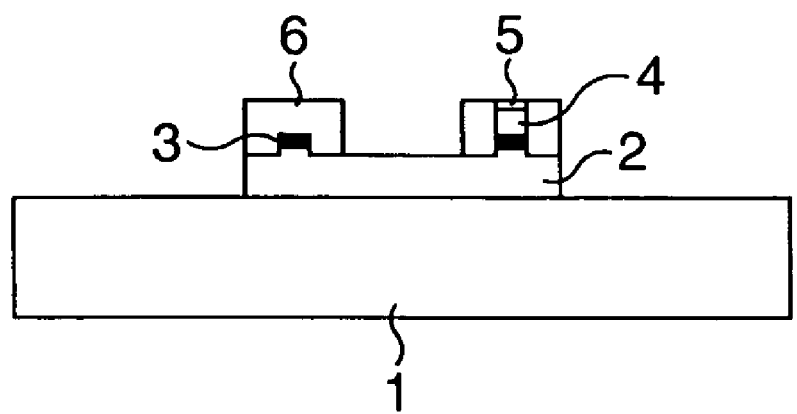

Next, after a mask constituted of SiO$_2$ is formed on the parts to be the optical waveguides on the SI—InP layer 6 and the p-InGaAs layer 5 is formed, in order to leave the SI—InP layer 6 of predetermined width at the respective outer side surface portions of two mesa structures (optical waveguides), the SI—InP layer 6 at the outer side from the predetermined width is removed by wet etching (the first etching), and the high-resistance InP substrate 1 is exposed, as shown in FIGS. 23A and 23B [FIG. 23B is the sectional view taken along the line X to X in FIG. 23A]. Subsequently, after the SiO$_2$ mask is removed, the SI—InP layer 6 between the two mesa structures (optical waveguides) is removed in order to leave the SI—InP layer 6 of predetermined width at the respective inner side surface portions of the two mesa structures (optical waveguides), and the n-InP layer 2 is exposed by wet etching (the second etching). The n-InP layer 2 thus formed becomes a bias layer. If the etch stop layer is provided, etching can be performed with high precision.

Figure 24A:
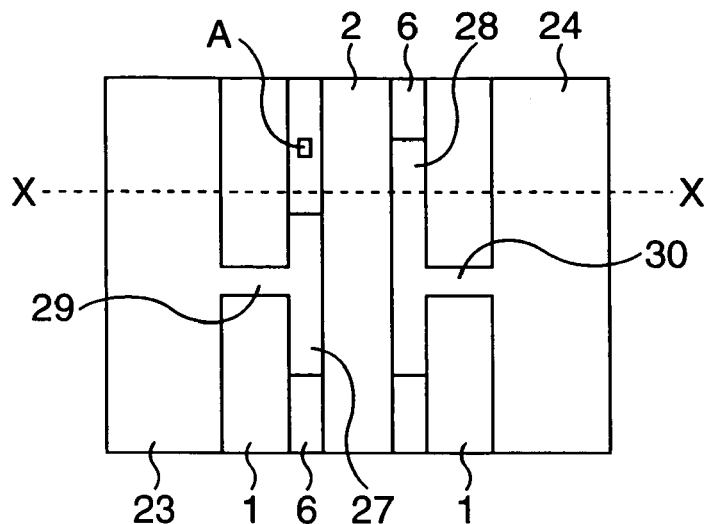
FIGS. 24A and 24B are views for explaining a manufacturing method of the semiconductor Mach-Zehnder type optical modulator in the fifth embodiment of the present invention.
Figure 24B:
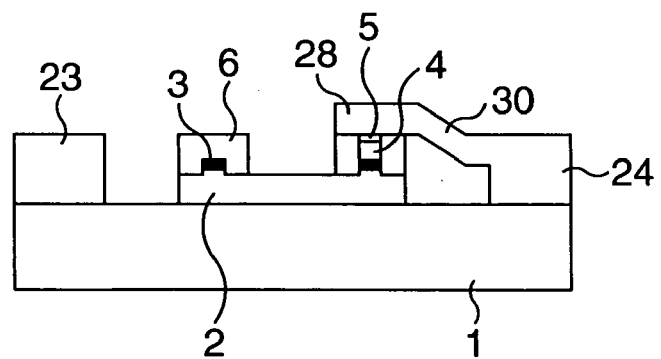

Finally, as shown in FIGS. 24A and 24B [FIG. 24B is the sectional view taken along the line X-X in FIG. 24A], the slot line electrodes 23 and 24, the discrete electrodes 27 and 28, and the air bridge wirings 29 and 30 are formed on the surface of the element produced as described above by gold (Au) plating. At the same time, the DC bias electrode pad 31 is formed. Specifically, gold (Au) plating is divided into two and performed twice. Namely, by the first plating, the slot line electrodes 23 and 24 (and the DC bias electrode pad 31) are formed. Next, by the second plating, the discrete electrodes 27 and 28 are formed. At this time, the slot line electrodes 23 and 24 and the discrete electrodes 27 and 28 are connected by the air bridge wirings 27 and 28. When these electrodes 23, 24, 27 and 28 are formed by gold (Au) plating, they are formed by, for example, the selective plating method using the resist pattern. Before the second plating, for example, a resist is formed between the p-InGaAs layer 5 and the slot line electrodes 23 and 24, and the resist pattern is removed after the gold (Au) plating, whereby a space is formed under the air bridge wirings 29 and 30.

As shown in FIG. 13, the signal side slot line electrode 23 is drawn to the ground side slot line electrode 24 side by going over the two optical waveguides (arms) 20A and 20B. In this case, for example, the resist is also formed on the two optical waveguides 20A and 20B, and after the air bridge structure is formed by gold (Au) plating, the resist is removed.

By adjusting the respective lengths of the discrete electrodes 27 and 28, the proportions of the discrete electrodes 27 and 28 in the entire lengths of the optical waveguides 20A and 20B, and the like, the characteristic impedance as the traveling-wave electrode can be made to correspond to a desired value.

As is understood from the aforementioned element manufacturing method, in the parts where the discrete electrodes 27 and 28 of the optical waveguides 20A and 20B are formed, the P—InP clad layer 4 and the P—InGaAs contact layer 5 are formed above the i-MQW layer 3 (namely, between the discrete electrodes 27 and 28, and the i-MQW layer 3). On the other hand, in the other part, the SI—InP layer 6 is basically formed above the i-MQW layer 3. However, as shown by the symbol A in FIG. 24A, only in the part of the optical waveguides 20A and 20B, there is the part in which the P—InP clad layer 4 and the p-InGaAs contact layer 5 are left above the i-MQW layer 3 (namely, between the discrete electrodes 27 and 28, and the i-MQW layer 3) in the part where the discrete electrodes 27 and 28 are not formed on the upper portion. This is because a part of the $SiO_2$ master pattern shown by the symbol A in FIG. 19A is left by being transferred. This part is omitted in FIG. 13.

Hereinafter, this will be explained.

Figure 25:
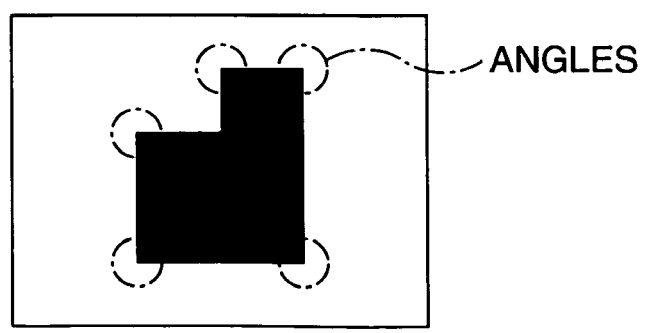
FIG. 25 is view showing an example of an unfavorable mask pattern.

In the $SiO_2$ master pattern 40 in FIG. 19B, including the portion of the reference symbol A, thin line-shaped patterns are formed by being drawn to the outer sides in the lateral direction of the parts which are to be the optical waveguides 20A and 20B later. The reason why the patterns are formed in this manner is to prevent angles projecting outside from being formed in the $SiO_2$ master pattern when the $SiO_2$ master pattern 40 is seen from above. Namely, without providing these line-shaped patterns drawn to the outer sides in the lateral direction, the $SiO_2$ master pattern has a number of angles as shown in FIG. 25, and these angles cause abnormal growth and are unfavorable on the occasion of crystal regrowth for forming the structure as shown in FIGS. 20A and 20B.

Especially, when the electrodes which differ in length in the two optical waveguides 20A and 20B are formed as in this embodiment, it is necessary to form the $SiO_2$ master pattern by adding thin line-shaped patterns extending to the outer side in the lateral direction as shown by the reference symbol A in FIG. 19A. As a result, one of the optical waveguides partially has the P—InP clad layer 4 and the P—InGaAs contact layer 5 though having no discrete electrode above it.

According to the fifth embodiment of the present invention, the advantage of making it possible to realize the low chirping operation (including zero chirping operation) by using the structural parameter (for example, electrode length or the like) which brings about low chirping (including zero chirping) in the semiconductor Mach-Zehnder type optical modulator having the capacitively loaded type of electrode structure made of an InP related semiconductor material. Thereby, it is possible to control chirping (chirp parameter) in the semiconductor Mach-Zehnder type optical modulator having the capacitively loaded type electrode structure made of InP related semiconductor material.

Sixth Embodiment

Figure 26:
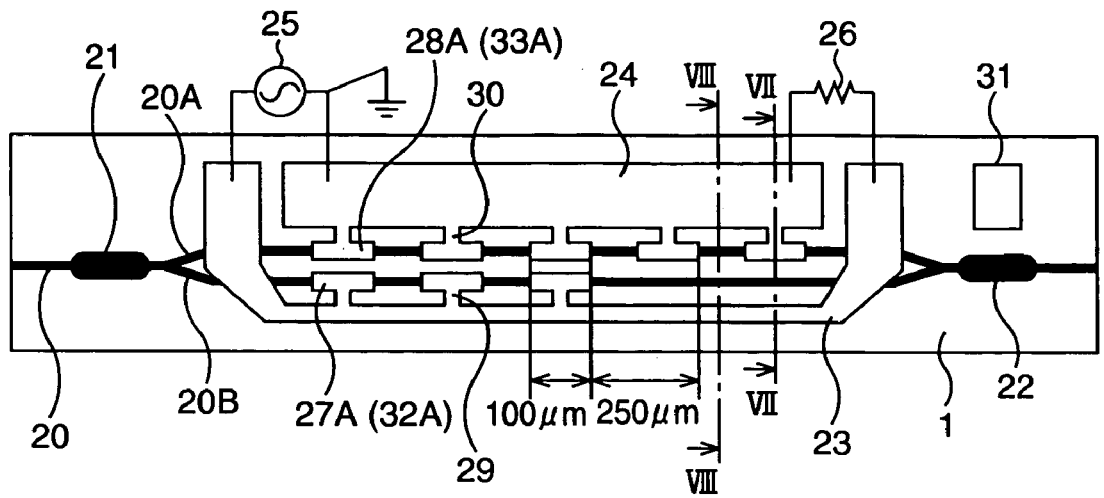
FIG. 26 is a schematic view showing a constitution of a semiconductor Mach-Zehnder type optical modulator in a sixth embodiment of the present invention.
Figure 27:
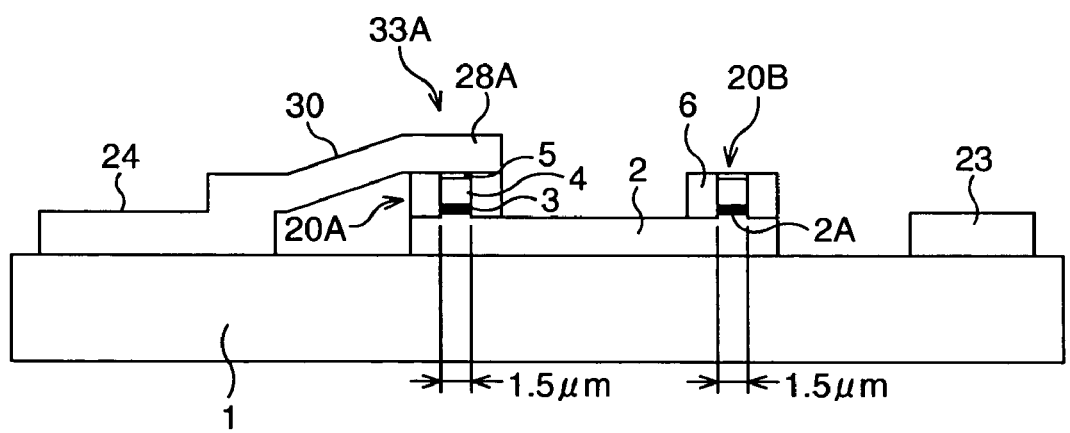
FIG. 27 is a schematic view showing a constitution of the semiconductor Mach-Zehnder type optical modulator in the sixth embodiment of the present invention, and is a sectional view in the VII to VII in FIG. 26.
Figure 28:
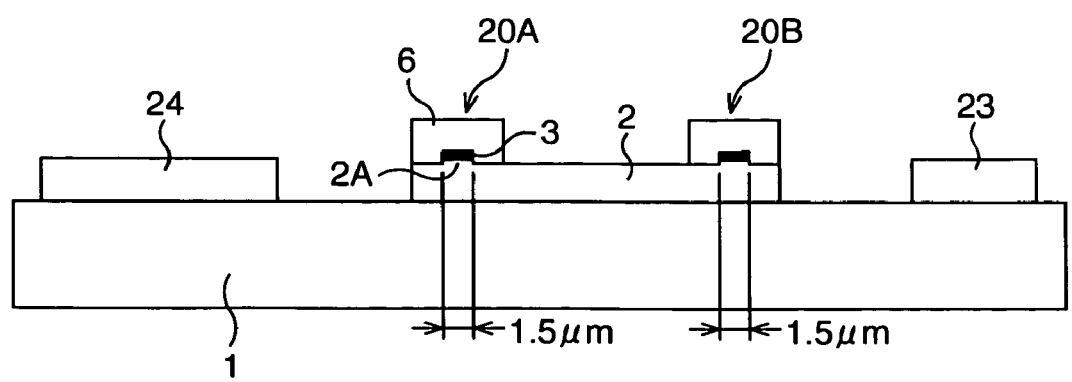
FIG. 28 is a schematic view showing a constitution of the semiconductor Mach-Zehnder type optical modulator in the sixth embodiment of the present invention, and is a sectional view in the VIII to VIII in FIG. 26.

Next, a semiconductor Mach-Zehnder type optical modulator and its manufacturing method in a sixth embodiment of the present invention will be explained with reference to FIGS. 26 to 28. In FIGS. 26 to 28, the same things as in the aforementioned fifth embodiment are given the same reference numerals and symbols.

The semiconductor Mach-Zehnder type optical modulator in this embodiment differs from the aforementioned fifth embodiment in the respect that the lengths of the discrete electrodes (electrode lengths) are made equal in the two optical waveguides (arms), and the total number of the discrete electrodes (namely, the total number of microscopic phase modulators) provided on the optical waveguide of each of the two optical waveguides is made different. Namely, in this embodiment, the total number of ground side discrete electrodes (namely, the total number of ground side phase modulators) is made larger than the total number of signal side discrete electrodes (namely, the total number of signal side phase modulators).

For example, as shown in FIG. 26, the number of signal side discrete electrodes 27A on a signal side optical waveguide 20B is set at any one of seven, eight and nine, and the number of ground side discrete electrodes 28A on a ground side optical waveguide 20A is correspondingly set at 13, 12 and 11, respectively. However, in FIG. 26, the number of the discrete electrodes 27A and 28A is shown by omitting some of them for convenience of explanation.

In this embodiment, the lengths (electrode lengths) of a plurality of discrete electrodes 27A and 28A formed on the respective optical waveguides (arms) 20A and 20B are all equal (here, 100 μm each), and the lengths of the discrete electrodes 27A and 28A are equal to each other in the two optical waveguides 20A and 20B. On the other hand, the value (total electrode length) obtained by adding up all the lengths of the discrete electrodes 27A (or 28A) formed on one optical waveguide 20A (or 20B), namely, the value which is obtained by multiplying the length of each of the discrete electrodes 27A (or 28A) by the number of discrete electrodes 27A (or 28A) formed on the optical waveguide 20A (or 20B) is compared, the total electrode length obtained by adding up the electrode lengths of the ground side discrete electrodes 28A formed on the ground side optical waveguide 20A is longer than the total electrode length obtained by adding up the electrode lengths of the signal side discrete electrodes 27A formed on the signal side optical waveguide 20B.

When the electrode length asymmetry parameter r [r=(LG−LS)/(LG+LS)] by using these values of the total electrode lengths (in this case, the total electrode length of the ground side discrete electrodes 28A is set as LG, and the total electrode length of the ground side discrete electrodes 27A is set as LS), r=0.1 to 0.3. Accordingly, as is obvious from FIG. 18, it is also possible to make the value of the chirp parameter α close to zero in this embodiment.

As described above, the number of the ground side discrete electrodes 28A and the number of the signal side discrete electrodes 27A are made different from each other in this embodiment, and therefore, there exist regions where the discrete electrodes 28A are formed on the one optical waveguide 20A, but the discrete electrodes 27A are not formed on the other optical waveguide 20B as shown in FIG. 27 (sectional view in VII to VII in FIG. 26). Meanwhile, in the region between a plurality of discrete electrodes, the two arms 20A and 20B are both constituted of the n-InP layer 2, the i-MQW layer 3 and the SI—InP layer 6 as in the aforementioned fifth embodiment as shown in FIG. 28 (sectional view in VIII to VIII in FIG. 26).

The other constitution and manufacturing method are the same as those in the aforementioned fifth embodiment, and therefore, the explanation of them will be omitted here. In this embodiment, the total number of the ground side discrete electrodes 28A is made larger than the total number of the signal side discrete electrodes 27A, and thereby the total electrode length obtained by adding up the electrode lengths of a plurality of ground side discrete electrodes 28A is made longer than the total electrode length obtained by adding up the electrode lengths of a plurality of signal side discrete electrodes 27A. This means that the total number of ground side phase modulators 33A constituted of the ground side discrete electrodes 28A and the optical waveguide 20A formed below them is made larger than the total number of signal side phase modulators 32A constituted of the signal side discrete electrodes 27A and the optical waveguide 20B formed below them, and thereby, the total operation length obtained by adding up the operation lengths of a plurality of ground side phase modulators 33A is constituted to be longer than the total operation length obtained by adding up the operation lengths of a plurality of signal side phase modulators 32A.

When the P—InP layer (clad layer) 4 and the P—InGaAs layer (contact layer) 5 are formed only below the discrete electrodes 27A and 28A as in the aforementioned fifth embodiment, the total number of the P—InP layers (clad layers) 4 or the P—InGaAs layers (contact layers) 5 which are formed below the ground side discrete electrodes 28A is larger than the total number of the p-InP layers (clad layers) 4 or the p-InGaAs layers (contact layers) 5 which are formed below the signal side discrete electrodes 27A.

According to the sixth embodiment of the present invention, there is provided the advantage of making it possible to realize a low chirping operation (including a zero chirping operation) by using a structural parameter (for example, electrode length or the like) which brings about low chirping (including zero chirping) in the semiconductor Mach-Zehnder type optical modulator having a capacitively loaded type of electrode structure made of an InP related semiconductor material. As a result, it is made possible to control chirping (chirp parameter) in the semiconductor Mach-Zehnder type optical modulator having a capacitively loaded type of electrode structure made of an InP related semiconductor material.

Seventh Embodiment

Figure 29:
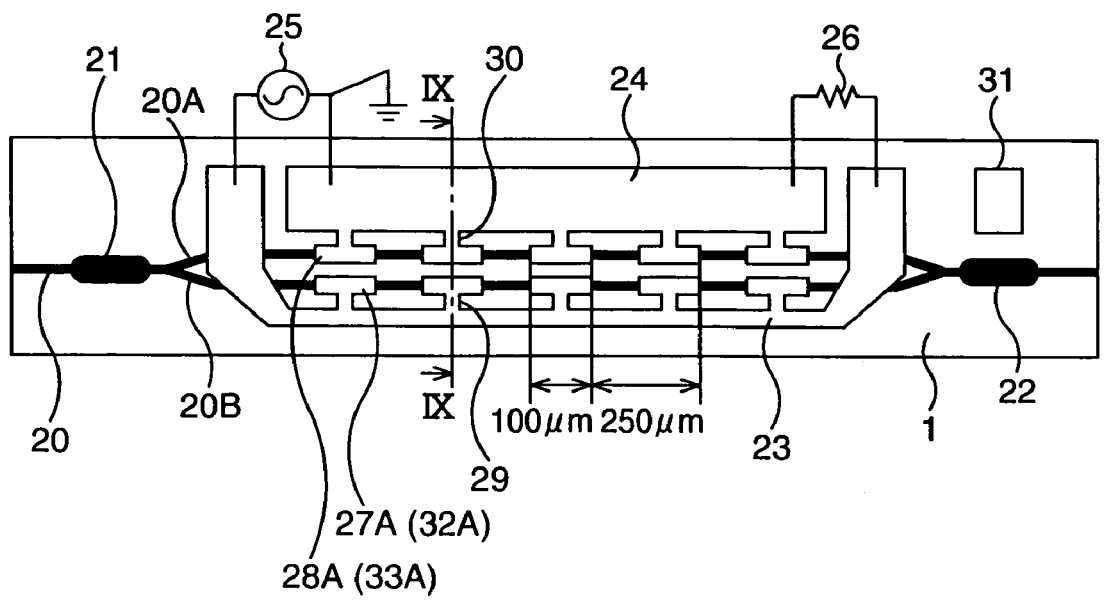
FIG. 29 is a schematic view showing a constitution of a semiconductor Mach-Zehnder type optical modulator in a seventh embodiment of the present invention.
Figure 30:
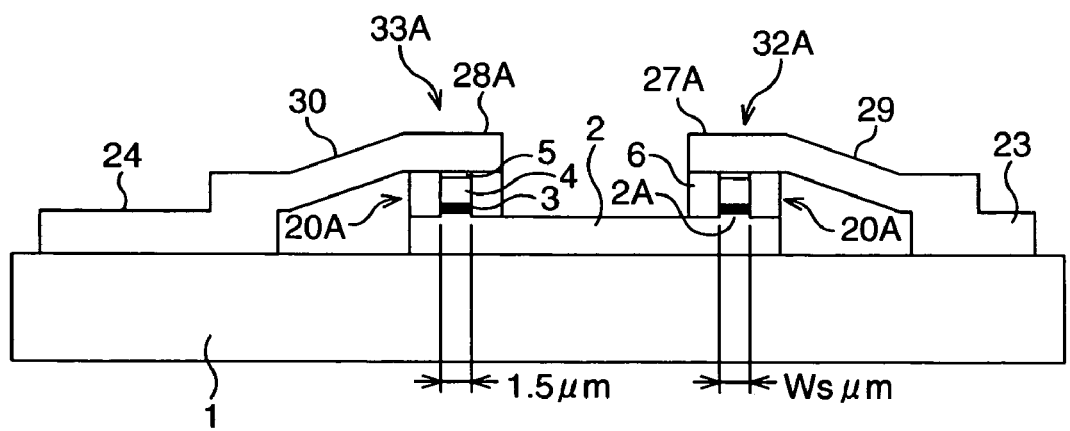
FIG. 30 is a schematic-view showing a constitution of the semiconductor Mach-Zehnder type optical modulator in the seventh embodiment of the present invention, and is a sectional view in the IX to IX in FIG. 29.
Figure 31:
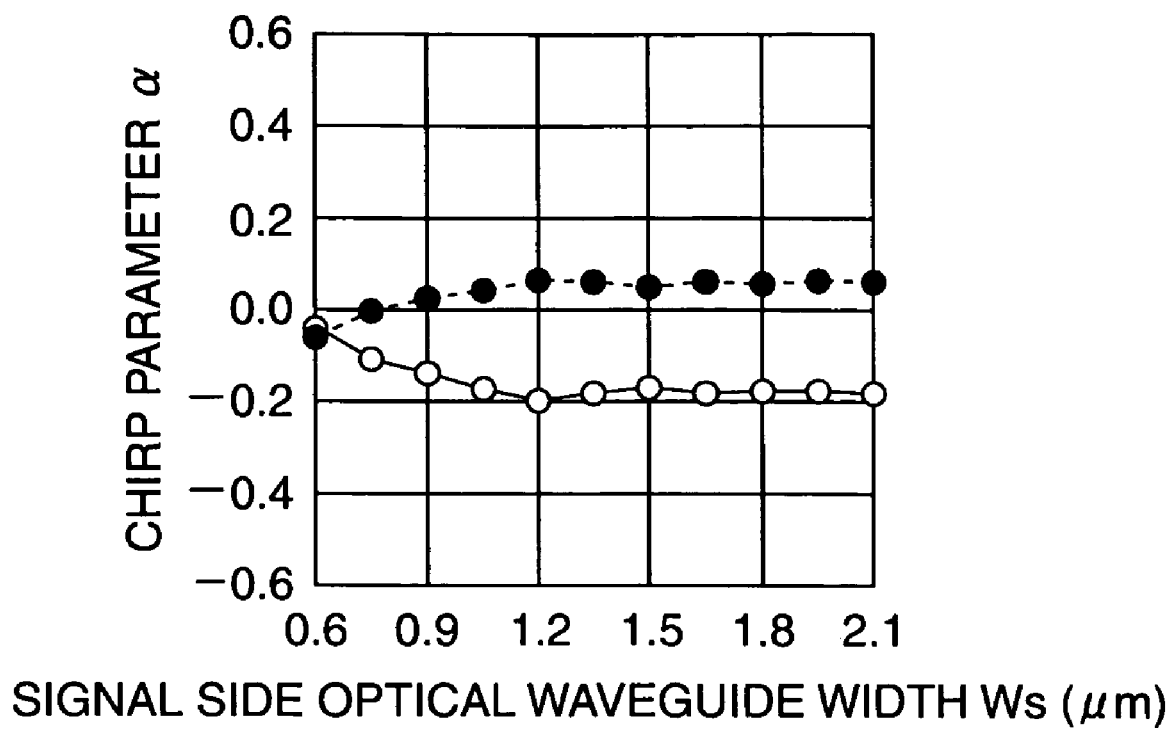
FIG. 31 is a diagram for explaining the relationship between a width Ws of a signal side optical waveguide and a chirp parameter α in the semiconductor Mach-Zehnder type optical modulator in the seventh embodiment of the present invention, and shows values of the chirp parameter α when the width Ws of the signal side optical waveguide is changed in a state in which the width of the ground side optical waveguide is kept constant at 1.5 µm.
Figure 32:
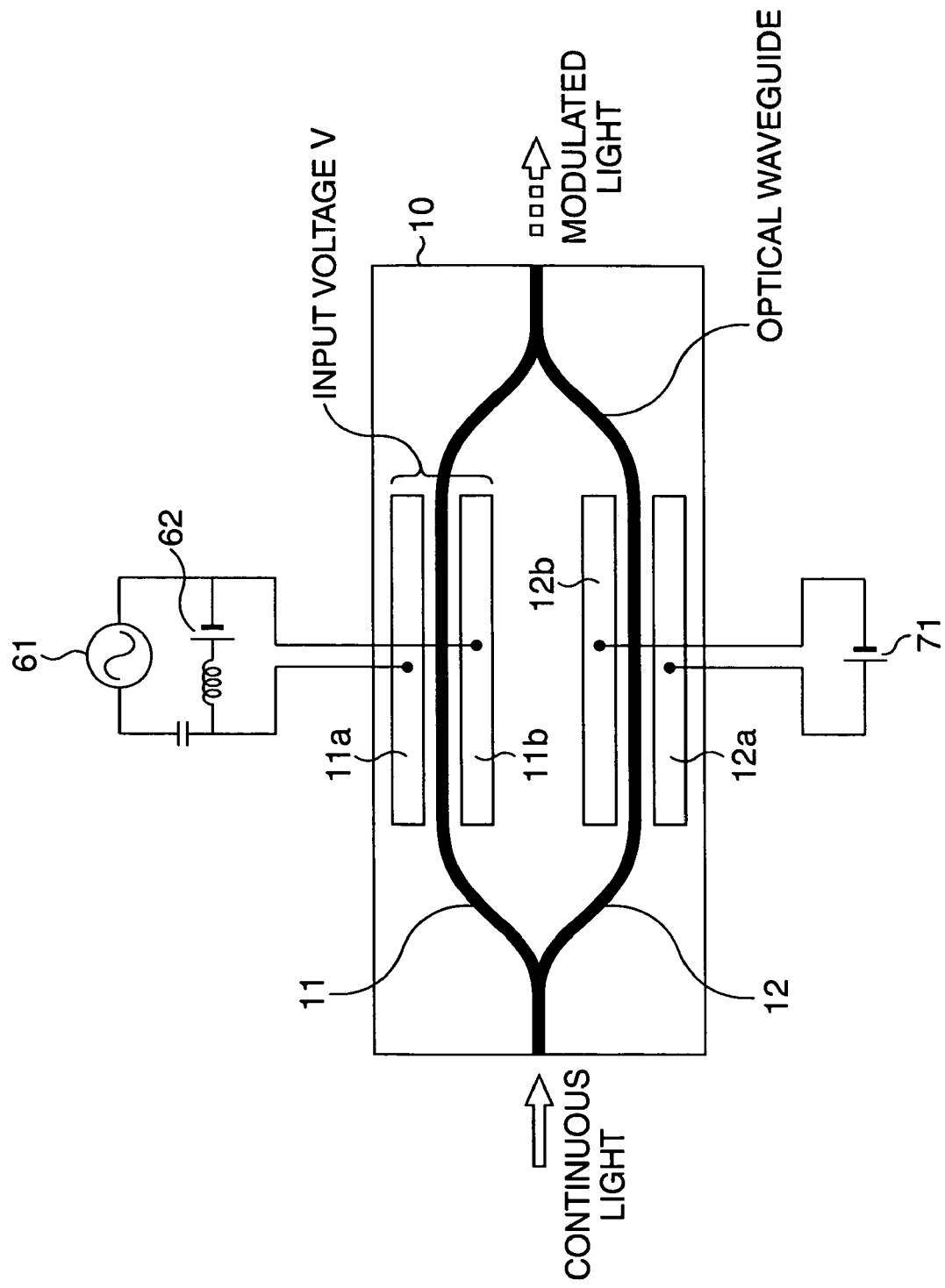
FIG. 32 is a schematic view of a semiconductor Mach-Zehnder type optical modulator.
Figure 33:
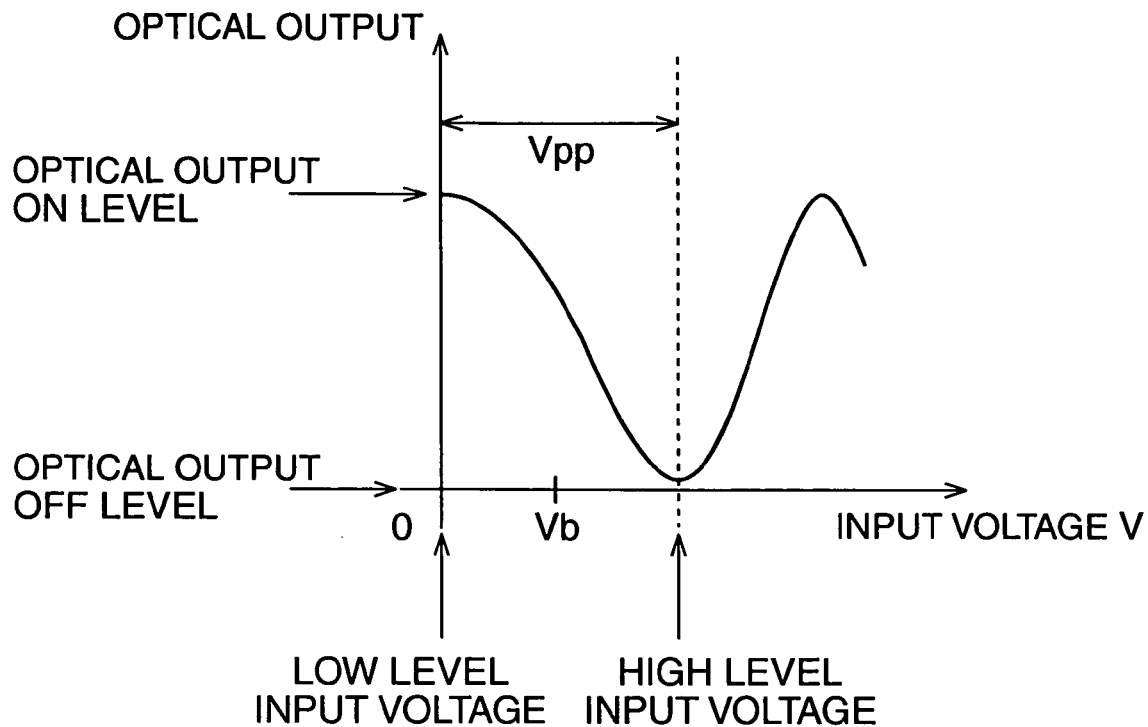
FIG. 33 is a characteristic chart showing an optical output characteristic in the input voltage of the semiconductor Mach-Zehnder type optical modulator shown in FIG. 32.
Figure 34:
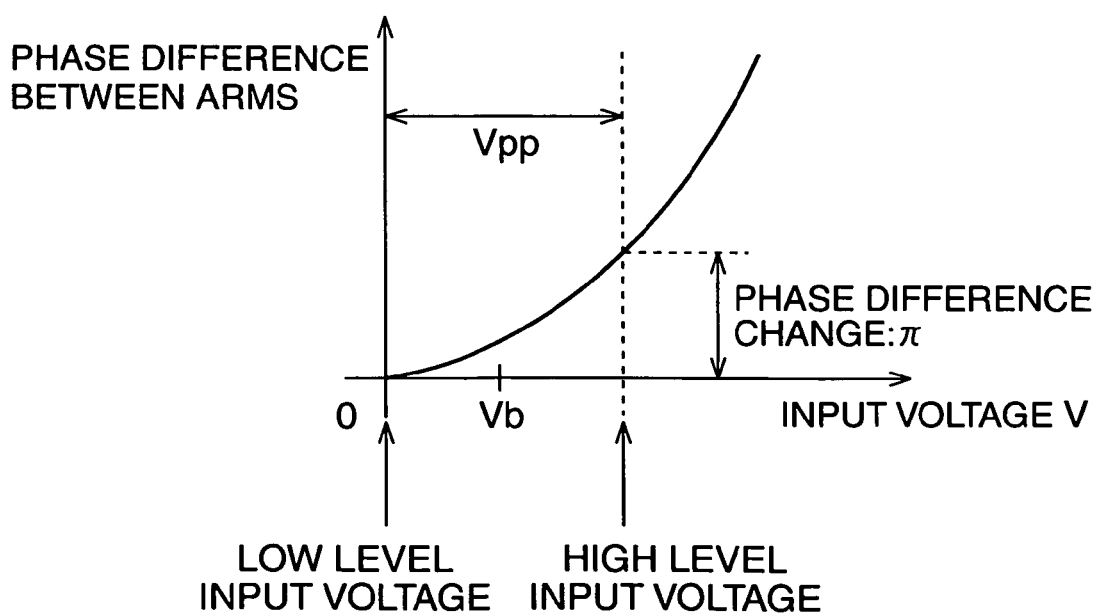
FIG. 34 is a characteristic chart showing a phase difference (phase difference between arms) of lights propagating through respective arms with respect to the input voltage of the semiconductor Mach-Zehnder type optical modulator shown in FIG. 32.
Figure 35:
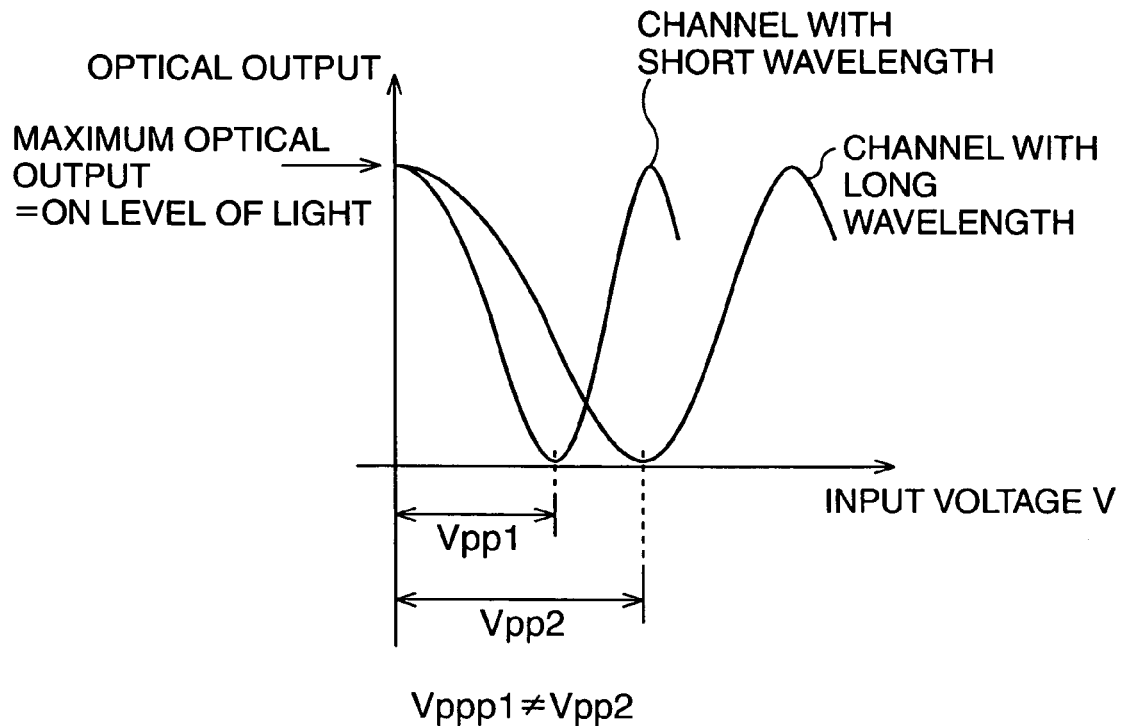
FIG. 35 is a diagram showing a setting method of a drive condition with respect to a channel with short wavelength and a channel with long wavelength of a semiconductor Mach-Zehnder type optical modulator in Non-patent document 1.
Figure 36:
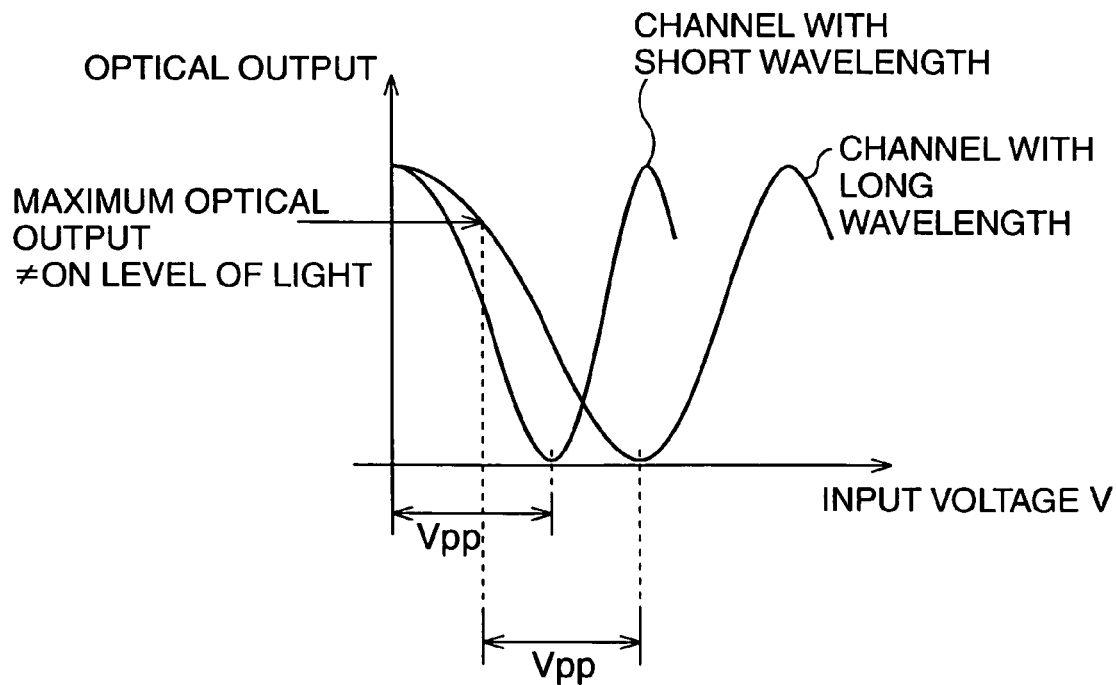
FIG. 36 is a diagram showing a setting method of a drive condition with respect to a channel with short wavelength and a channel with long wavelength of a semiconductor Mach-Zehnder type optical modulator in a second known example.

Next, a semiconductor Mach-Zehnder type optical modulator in a seventh embodiment of the present invention and its manufacturing method will be explained with reference to FIGS. 29 to 31. In FIGS. 29 to 31, the same things as in the aforementioned fifth embodiment are given the same reference numerals and symbols.

The semiconductor Mach-Zehnder type optical modulator in this embodiment differs from the aforementioned fifth embodiment in the respect that the lengths of the discrete electrodes (electrode lengths) are made equal in the two optical waveguides (arms), and the widths (specifically, the widths of optical waveguide core layers) of two optical waveguides (arms) are made different. Namely, in this embodiment, the lengths (electrode lengths) of the discrete electrodes 27A and 28A are made equal in the two optical waveguides (arms) 20A and 20B (here, 100 μm each), and the width of the ground side optical waveguide 20A (specifically, the width of the optical waveguide core layer 3) on which the ground side discrete electrodes 28A are provided is fixed at 1.5 μm, while the width of the signal side optical waveguide 20B (specifically, the width of the optical waveguide core layer 3) on which the signal side discrete electrodes 27A are provided is set at Ws μm, as shown in FIGS. 29 and 30 (sectional view in the line IX to IX in FIG. 29). A concrete numeral value of the width Ws of the signal side optical waveguide will be described later.

Here, FIG. 31 shows the values of the chirp parameter α which are obtained by calculation when the width Ws of the signal side optical waveguide 20B is changed in the state in which the width of the ground side optical waveguide 20A is kept constant at 1.5 μm in the capacitively loaded type Mach-Zehnder modulator made of InP related materials of the structure as shown in FIGS. 29 and 30.

In FIG. 31, the values of two kinds of chirp parameters α [expressed respectively by ● and ○ in FIG. 31] are obtained for each value of the width Ws of the signal side optical waveguide 20B. These values correspond to the two kinds of drive conditions distinguished by whether the phase difference is made 0 ($2\pi, 4\pi \ldots, 2n\pi$: n is a natural number) or $\pi$ ($3\pi, 5\pi \ldots$; $(2n+1)\pi$: n is a natural number) (namely, whether corresponding to the on state of light or the off state of light) when the voltage supplied from the high-frequency driving power supply 25 is at the positive side (+V) in the Mach-Zehnder type optical modulator. Namely, these values respectively correspond to the drive condition (the first drive condition; the drive condition for adjusting the phase difference in the OFF state of light) in which the optical output becomes small when the reverse bias voltage, which is applied to the electrode (DC bias electrode for phase difference adjustment which will be described later) formed on one of the optical waveguides (arm; for example, the signal side optical waveguide), is made larger, and the drive condition (the second drive condition; the drive condition for adjusting the phase difference in the ON state of light) in which the optical output becomes large when the reverse bias voltage applied to this electrode is made larger. In FIG. 31, the value of the chirp parameter α in the case of the first drive condition is expressed by ●, and the value of the chirp parameter α in the case of the second drive condition is expressed by ○.

Here, the light confinement factor changing in accordance with the width of the optical waveguide is analyzed by the finite element method, and used for calculation. The other conditions and method for calculation are the same as those in the aforementioned fifth embodiment. As shown in FIG. 31, it can be understood that the width Ws μm of the signal side optical waveguide 20B is made narrower as compared with 1.5 μm which is the width of the ground side optical waveguide 20A and thereby, the value of the chirp parameter α is closer to zero.

It is possible to utilize the qualitative tendency of the chirp parameter α with respect to asymmetry property of the widths of the optical waveguides for setting the structural parameters (for example, the width of the optical waveguide) which brings about low chirping (including zero chirping) in the capacitively loaded type of Mach-Zehnder type optical modulator made of InP related materials. Namely, it has become obvious that by making the width of the signal side optical waveguide 20B (specifically, the width of the optical waveguide core layer 3) narrower than the width of the ground side optical waveguide 20A (specifically, the width of the optical waveguide core layer 3)

based on the qualitative tendency of the chirp parameter α with respect to the asymmetry property of the widths of the optical waveguides as described above, the value of the chirp parameter α can be made close to zero as compared with the case where the widths of the two optical waveguides 20A and 20B are equal.

As understood from the calculation result of FIG. 31, by setting the width of the ground side optical waveguide 20A at 1.50 μm, and setting the width Ws of the signal side optical waveguide 20B within the range of 0.60 μm to 0.90 μm (preferably, 0.75 μm), the chirp parameter α can be made practically equal to zero in one of the drive conditions (first drive condition). This means that the width of the optical waveguide is set based on the characteristic (chirp parameter optical wavelength width characteristic; see FIG. 31) expressing the relationship between the chirp parameter α expressing the chirping amount (more specifically, the value constituted by the chirping amount and the sign showing whether it is in the long wavelength side or the short wavelength side) and the width of the optical waveguide (arm) (here, the width Ws of the signal side optical waveguide 20B).

In this embodiment, the width of the ground side optical waveguide 20A is set to be larger than 1 μm (here, 1.50 μm), and the width of the signal side optical waveguide 20B is set to be smaller than 1 μm (here, 0.75 μm). The width of the optical waveguide as the structural parameter is set in this manner, and the capacitively loaded type of semiconductor Mach-Zehnder type optical modulator made of InP related materials is manufactured so as to have the set width of the optical waveguide, whereby the zero chirping operation can be realized in the semiconductor Mach-Zehnder type optical modulator.

The light confinement factor in the optical waveguide changes when the width of the optical waveguide is changed as described above. As a result, in the situation where a fixed voltage is applied, the phase change amount the propagated lights receive can be changed. Accordingly, the width of the one optical waveguide 20A is kept constant and only the width of the other optical waveguide 20B is changed, whereby the magnitude of the phase change occurring between the branched lights propagating through these optical waveguides can be made asymmetrical. Therefore, in the semiconductor Mach-Zehnder type optical modulator having the capacitor-loaded type of electrode structure made of an InP related semiconductor material, in which practical zero chirping cannot be obtained due to the absorption of light in the InP related material and asymmetry property of the electrodes in the capacitively loaded type of Mach-Zehnder type optical modulator even if the electrode lengths are made equal and symmetrical between the two arms (optical waveguides) 20A and 20B, zero chirping can be realized as in the case of the fifth embodiment where the electrode lengths are made asymmetrical.

In this embodiment, as one of the means which makes the chirp parameter α zero, the width of the signal side optical waveguide 20B is made smaller than the width of the ground side optical waveguide 20A. The essence of this means is that the phase change of the light propagating through the ground side waveguide 20A is made larger than the phase change of the light propagating through the signal side optical waveguide 20B by making the light confinement factor of the ground side optical waveguide 20A [specifically, the light confinement factor of the i-MQW layer (optical waveguide core layer) 3 constituting the ground side optical waveguide 20A] larger than the light confinement factor of the signal side optical waveguide 20B [specifically, the light confinement factor of the i-MQW layer (optical waveguide core layer) 3 constituting the signal side optical waveguide 20B].

Accordingly, other structural parameters which make the light confinement factor small can be used without being limited to the width of the optical waveguide. For example, the thickness of the core layer 3 of the ground side optical waveguide 20A may be constituted to be larger than the thickness of the core layer 3 of the signal side optical waveguide 20B, or the refraction index change amount of the core layer 3 of the ground side optical waveguide 20A may be constituted to be larger than the refractive index change amount of the core layer 3 of the signal side optical waveguide 20B.

The other constitution and manufacturing method are the same as those in the aforementioned fifth embodiment, and therefore, the explanation of them will be omitted here.

According to the seventh embodiment of the present invention, there is provided the advantage of making it possible to realize a low chirping operation (including a zero chirping operation) by using a structural parameter (for example, electrode length or the like) which brings about low chirping (including zero chirping) in the semiconductor Mach-Zehnder type optical modulator having a capacitively loaded type of electrode structure made of an InP related semiconductor material. As a result, it is made possible to control chirping (chirp parameter) in the semiconductor Mach-Zehnder type optical modulator having a capacitively loaded type of electrode structure made of an InP related semiconductor material.

In the aforementioned fifth embodiment to seventh embodiment, the explanation is made by citing the concrete numeral values of the electrode lengths and the widths of the optical waveguides, but the capacitively loaded type Mach-Zehnder modulator made of InP related materials of the present invention can be constituted based on the other numeral values than those of the concrete electrode lengths and the widths of the optical waveguides explained in the aforementioned fifth embodiment to seventh embodiment.

When the other numeral values than the concrete electrode length asymmetry parameters and width of the optical waveguide (the width of the signal side optical waveguide) as shown in the aforementioned fifth embodiment to seventh embodiment are used, the chirp parameter α is considered to displace a little from the aforementioned calculation results. In this case, in the Mach-Zehnder type optical modulator using the InP related materials in which absorption of light exists and having the capacitively loaded type of electrode structure of asymmetry property, the qualitative tendency of the chirp parameter α can be obtained as explained by using FIGS. 18 and 31. Accordingly, even when the other numeral values than the concrete numeral values shown in the aforementioned fifth embodiment to seventh embodiment, the value of the chirp parameter α can be made closer to zero by making the electrode length of the ground side discrete electrode 28 longer than the electrode length of the signal side discrete electrode 27, or by making the width of the signal side optical waveguide 20B smaller than the width of the ground side optical waveguide 20A. Detailed values can be obtained by performing numerical calculation in consideration of the structures of the elements as shown in the aforementioned fifth embodiment to seventh embodiment.

While in the conventional capacitively loaded type of Mach-Zehnder type optical modulator made of the InP related materials, the length and the numbers of the discrete electrodes, and the optical waveguide sectional structures are the same at the signal side and the ground side, and are in the symmetrical structure, the respective lengths of the discrete electrodes, the widths of the optical waveguides, and the numbers of the discrete electrodes are made different at the signal side and the ground side, and in the asymmetrical structure in the aforementioned fifth embodiment to seventh embodiment. As a result, the relative magnitude of the phase change in the ground side optical waveguide 20A with respect to the phase change in the signal side optical waveguide 20B is increased as compared with the conventional optical modulator, and thereby, zero chirping can be realized. Accordingly, with the structure in which the relative magnitude of the phase change of the ground side optical waveguide 20A with respect to the phase change of the signal side optical waveguide 20B can be ultimately made larger, the operation and effect of the present invention can be obtained, and zero chirping can be attained, without being limited to those in the aforementioned fifth embodiment to seventh embodiment.

For example, the structure in which the refraction index change of the optical waveguide with respect to the unit voltage change, namely, the refraction index modulation efficiency of the optical waveguide is made larger in the ground side optical waveguide 20A than in the signal side optical waveguide 20B may be adopted. Such a structure is realized by the structure or the composition in which, for example, the difference between the photo luminescence wavelength and the operation wavelength of the i-MQW layer (optical waveguide core layer) 3 is taken to be smaller in the ground side optical waveguide 20A than in the signal side optical waveguide 20B. Even in the case where the difference in the wavelength is symmetrical, the refraction index modulation efficiency can be also made asymmetrical by making the inner layer structure or the composition of the i-MQW layer 3 asymmetrical.

In the aforementioned fifth embodiment to seventh embodiment, the section of the optical waveguides 20A and 20B has the embedded structure by SI—InP, but the present invention is not limited to this, and, for example, a ridge type optical waveguide, a high mesa type optical waveguide, or the optical waveguides of the other sectional structures may be applied to the present invention.

In this case, the same effect as in each of the aforementioned embodiments can be obtained, and as a result, zero chirping can be achieved, by increasing the relative magnitude of the phase change in the ground side optical waveguide 20A with respect to the phase change in the signal side optical waveguide 20B as compared with the conventional capacitively loaded type of Mach-Zehnder type optical modulator made of the InP related materials by making the lengths of the discrete electrodes, the numbers of the discrete electrodes, the widths of the optical waveguides, or the other parts asymmetrical at the signal side and the ground side.

In the aforementioned fifth embodiment to seventh embodiment, MMI optical couplers 21 and 22 of 1×2 are used, but the optical couplers are not limited to this, and the present invention can be also applied to the case where MMI optical couplers of 2×2, or MMI optical couplers of the other structures are used.

In this case, the same effect as in each of the aforementioned fifth embodiment to seventh embodiment can be obtained, and as a result, zero chirping can be achieved, by increasing the relative magnitude of the phase change in the ground side optical waveguide 20A with respect to the phase change in the signal side optical waveguide 20B as compared with the conventional capacitively loaded type of Mach-Zehnder type optical modulator made of InP related materials by making the lengths of the discrete electrodes, the numbers of the discrete electrodes, the widths of the optical waveguides, or the other parts asymmetrical at the signal side and the ground side as in the aforementioned fifth embodiment to seventh embodiment.

In the aforementioned fifth embodiment to seventh embodiment, the p-InP layer 4 is made the upper clad layer in the regions of the microscopic phase modulators 32, 32A, 33 and 33A constituted of the discrete electrodes and the optical waveguides formed below the discrete electrodes, and in the other regions (the regions or the like between the microscopic phase modulators 32, 32A, 33, 33A), the SI—InP layer 6 is made the upper clad layer. However, without being limited to the capacitively loaded type Mach-Zehnder modulator of such a structure, the present invention can be also applied to the case where the capacitively loaded type Mach-Zehnder modulator of such a structure as shown in, for example, Non-patent Document 8. Namely, the present invention can be also applied to the structure in which an undoped InP clad layer (i-InP clad layer) of the thickness of about 0.5 to 1.5 μm, for example, is uniformly formed on the entire surface on the i-MQW layer (optical waveguide core layer) 3, and the p-InP clad layer is formed on only the parts on the InP clad layer, at which the discrete electrodes 32, 32A 33 and 33A are provided.

The present invention can be also applied to the structure in which the P—InP clad is formed on the entire surface on the i-MQW Layer (optical waveguide core layer) 3, for example. The present invention can be also applied to the optical modulators of the structures as described in, for example, Patent Document 3 and Patent Document 6. In this case, the same effect as in each of the aforementioned embodiments can be obtained, and as a result, zero chirping can be achieved, by increasing the relative magnitude of the phase change in the ground side optical waveguide 20A with respect to the phase change in the signal side optical waveguide 20B as compared with the conventional capacitively loaded type of Mach-Zehnder type optical modulator made of InP related materials by making the lengths of the discrete electrodes, the numbers of the discrete electrodes, the widths of the optical waveguides, or the other parts asymmetrical at the signal side and the ground side as in the aforementioned fifth embodiment to seventh embodiment.

In the aforementioned fifth embodiment to seventh embodiment, the i-MQW layer 3 constituted of the well layer of InGaAsP and the barrier layer of InP is used as the optical wavelength core layer, but the present invention is not limited to the MQW layer of such a structure, and the present invention can be also applied to the case where MQW constituted of the other materials which can be formed on the InP substrate such as InAlGaAs(P) and GaInAsN(P), for example.

In this case, the same effect as in each of the aforementioned embodiments can be obtained, and as a result, zero chirping can be achieved, by increasing the relative magnitude of the phase change in the ground side optical waveguide 20A with respect to the phase change in the signal side optical waveguide 20B as compared with the conventional capacitively loaded type of Mach-Zehnder type optical modulator made of InP related materials by making the lengths of the discrete electrodes, the numbers of the discrete electrodes, the widths of the optical waveguides, or the other parts asymmetrical at the signal side and the ground side as in the aforementioned fifth embodiment to seventh embodiment.

In the aforementioned fifth embodiment to seventh embodiment, the i-MQW layer 3 constituted of the barrier layer of InP and the well layer of InGaAsP is used as the optical wavelength core layer. The p-InP clad layer 4 and the n-InP clad layer 2 are used respectively for the clad layers on and under the i-MQW layer 3 as the optical waveguide core layer. These are all InP related materials, but not only these materials but also the other InP related materials than them can be used.

For example, it is possible to use InGaAsP, InGaAs, InGaAlAs and InAlAs as the materials of the clad layers 2 and 4. The kinds of the electrical conductivities of the upper and lower clad layers 2 and 4 may be any one of p type and n type respectively, and both of the upper and lower clad layers may be made n type, or p type. As the optical waveguide core layer, the MQW layer with the barrier layer constituted of any one of InAlAs and InAlGaAs, and the well layer constituted of any one of InGaAs and InGaAlAs may be used. The MQW layer using any one or more layers of InSb, InAs, InAsP, InSbP and InAsSbP may be used. As is described, the InP related material includes any of the materials of InP, InGaAsP, InGaAs, InGaAlAs, InAlAs, InSb, InAs, InAsP, InSbP and InAsSbP.

In the aforementioned fifth embodiment to seventh embodiment, the electrode lengths of the discrete electrodes, the numbers of the discrete electrodes and the widths of the optical waveguides are made different in the signal side and the ground side, but those in these embodiments may be combined.

According to the present invention, a high-quality optical output waveform can be generated with a simple apparatus constitution.

In concrete, in the present invention, direct-current voltage is supplied to at least one optical waveguide out of the two optical waveguides, and the direct-current voltage is controlled in accordance with the wavelength of the input light. Thereby, a high-quality optical output waveform can be generated with the simple apparatus constitution when the input light of a wide-range wavelength region is modulated.

Further, in the present invention, control of chirping (chirp parameter) is performed by using a structural parameter (for example, electrode length or the like) which achieves low chirping (including zero chirping) in the optical modulator made of InP related materials, and therefore a high-quality optical output waveform can be generated with the simple apparatus constitution.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An optical modulator, comprising:
    an optical interference unit branching inputted input light into two optical waveguides, and combining respective branched lights propagating through the respective optical waveguides and outputting the combined light;
    high-frequency voltage supplier supplying hiah-frequency voltage to at least one optical waveguide out of the two optical waveguides;
    a direct-current voltage supplier supplying direct-current voltage to optical waveguides supplied high-frequency voltage by the high-frequency voltage supplier; and
    a direct-current voltage controller controlling a value of the direct-current voltage supplied by said direct-current voltage supplier, in accordance with wavelength of the input light.

2. The optical modulator according to claim 1, wherein said direct-current voltage controller controls the value of the direct-current voltage so that a phase difference between the respective branched lights changes by an amount of it between an off level and an on level of the combined light.

3. The optical modulator according to claim 1, further comprising a phase adjustor adjusting a phase of at least one of the respective branched lights.

4. The optical modulator according to claim 3, wherein said phase adjustor adjusts a phase of at least one of the respective branched lights so that a phase difference between the respective branched lights becomes zero at a low level or a high level of the high-frequency voltage supplied by the high-frequency voltage supplier, and the combined light of an on level is outputted.

5. The optical modulator according to claim 3, wherein said phase adjustor adjusts the phase of at least one of the respective branched lights by controlling at least any one element of voltage, electric current and heat.

6. The optical modulator according to claim 3, wherein said phase adjustor adjusts the phase of at least one of the respective branched lights in accordance with the wavelength of the input light.

7. An optical modulator, comprising:
    an optical interference unit branching inputted input light into two optical waveguides, and combining respective branched lights propagating through the respective optical waveguides and outputting the combined light;
    a high-frequency voltage supplier supplying high-frequency voltage to at least one optical waveguide out of the two optical waveguides;
    a direct-current voltage supplier supplying direct-current voltage to at least one optical waveguide out of the two optical waveguides;
    a direct-current voltage controller controlling a value of the direct-current voltage supplied by said direct-current voltage supplier, in accordance with wavelength of the input light; and said high-frequency voltage supplier supplying high-frequency voltage of fixed amplitude to the optical waveguide supplied with the direct-current voltage, irrespective of the wavelength of the input light.

8. The optical modulator according to claim 3, wherein the direct-current voltage by the direct-current voltage supplier and the high-frequency voltage by the high-frequency voltage supplier are supplied to one optical waveguide out of the two optical waveguides by being superimposed on each other, and adjustment by the phase adjustor is performed for the other optical waveguide.

9. The optical modulator according to claim 7, wherein the direct-current voltage by the direct-current voltage supplier and the high-frequency voltage by the high-frequency voltage supplier are superimposed, and different voltages from each other are supplied to the two optical waveguides.

10. The optical modulator according to claim 3, wherein each of the optical waveguides is provided with a pair of electrodes, and at least one of supply of the direct-current by the direct-current voltage supplier, supply of the high-frequency voltage by the high-frequency voltage supplier, and control by the phase adjuster is performed via the pair of electrodes.

11. An optical modulator, comprising:
    an optical interference unit branching inputted input light into two optical waveguides, and combining respective branched lights propagating through the respective optical waveguides and outputting the combined light;

a high-frequency voltage supplier supplying high-frequency voltage to at least one optical waveguide out of the two optical waveguides;

a direct-current voltage supplier supplying direct-current voltage to at least one optical waveguide out of the two optical waveguides;

a direct-current voltage controller controlling a value of the direct-current voltage supplied by said direct-current voltage supplier, in accordance with wavelength of the input light; and an absolute value of the direct-current voltage supplied from the direct-current voltage supplier increases as the wavelength of the input light inputted to the optical interference unit changes from short wavelength to long wavelength.

12. The optical modulator according to claim 1, wherein a core layer constituting the optical waveguides is formed by a semiconductor multiple quantum well layer.

13. An optical transmitter, comprising:

an optical modulator comprising an optical interference unit branching inputted input light into two optical waveguides, combining respective branched lights propagating through the respective optical waveguides and outputting the combined light, a high-frequency voltage supplier supplying high-frequency voltage to at least one optical waveguide out of the two optical waveguides, a direct-current voltage supplier supplying direct-current voltage to at least one optical waveguide out of the two optical waveguides, and a direct-current voltage controller controlling a value of the direct-current voltage supplied by the direct-current voltage supplier, in accordance with wavelength of the input light; and a wavelength tunable laser device inputting the input light to the optical interference unit of said optical modulator by tuning the wavelength.

14. An optical transmitter, comprising:

an optical modulator comprising an optical interference unit branching inputted input light into two optical waveguides, combining respective branched lights propagating through the respective optical waveguides and outputting the combined light, a high-frequency voltage supplier supplying high-frequency voltage to at least one optical waveguide out of the two optical waveguides, a direct-current voltage supplier supplying direct-current voltage to optical waveguides supplied high-frequency voltage by the high-frequency voltage supplier, and a direct-current voltage controller controlling a value of the direct-current voltage supplied by the direct-current voltage supplier, in accordance with wavelength of the input light; and a wavelength fixed laser device inputting the input light to the optical interference unit of said optical modulator by fixing the wavelength.

15. An optical modulation method on an occasion of branching inputted input light into two optical waveguides, combining the respective branched lights propagating through the respective optical waveguides and outputting the combined light, comprising the step of:

supplying high-frequency voltage to at least one optical waveguide out of the two optical waveguides; and controlling a value of direct-current voltage in accordance with wavelength of the input light on an occasion of supplying direct-current voltage to optical waveguides supplied high-frequency voltage.

16. The optical modulation method according to claim 15, wherein a value of the direct-current voltage is controlled so that a phase difference between the respective branched lights changes by an amount of $\pi$ between an on level and an off level of the combined light.

17. The optical modulation method according to claim 15, further comprising the step of adjusting a phase of at least one of the respective branched lights.

18. The optical modulation method according to claim 17, wherein the phase in the respective branched lights is adjusted so that a phase difference of the respective branched lights becomes zero at a low level or a high level of the high-frequency voltage.

19. The optical modulation method according to claim 17, wherein adjustment of the phases in the respective branched lights is performed by controlling at least any one element of voltage, electric current, and heat.

20. The optical modulation method according to claim 17, wherein adjustment of the phases in the respective branched lights is performed in accordance with the wavelength of the input light.

21. An optical modulation method on an occasion of branching inputted input light into two optical waveguides, combining the respective branched lights propagating through the respective optical waveguides and outputting the combined light, comprising the step of:

controlling a value of direct-current voltage supplied to at least one optical waveguide out of the two optical waveguides in accordance with wavelength of the input light; and supplying high-frequency voltage of fixed amplitude is supplied to the optical waveguide supplied with the direct-current voltage, irrespective of the wavelength of the input light.

22. The optical modulation method according to claim 21, further comprising the step of;

adjusting a phase of at least one of the respective branched lights; and supplying the direct-current voltage and the high-frequency voltage to one optical waveguide out of the two optical waveguides by superimposing them on each other, and performing control of adjusting the phase for the other optical waveguide.

23. The optical modulation method according to claim 21, further comprising the step of supplying different voltages from each other to the two waveguides by superimposing the direct-current voltage and the high-frequency voltage.

24. An optical modulation method on an occasion of branching inputted input light into two optical waveguides, combining the respective branched lights propagating through the respective optical waveguides and outputting the combined light, comprising the step of:

controlling a value of direct-current voltage supplied to at least one optical waveguide out of the two optical waveguides in accordance with wavelength of the input light; and increasing an absolute value of the direct-current voltage as the wavelength of the input light changes from short wavelength to long wavelength.

25. An optical modulator, comprising:

a first and a second optical waveguides formed by InP related materials and constituting an optical interference unit;

a first line electrode formed at a side of said first optical waveguide;

a second line electrode formed at a side of said second optical waveguide and having wider width than the first line electrode;

a plurality of first discrete electrodes discretely formed on said first optical waveguide and connected to said first line electrode; and a plurality of second discrete electrodes discretely formed on said second optical waveguide and connected to said second line electrode,
wherein a plurality of first phase modulators are constituted by the plurality of first discrete electrodes and the first optical waveguide located below the plurality of first discrete electrodes,
wherein a plurality of second phase modulators are constituted by the second discrete electrodes and the second optical waveguide located below the second discrete electrodes, and
wherein a total operation length obtained by adding up operation lengths of the plurality of second phase modulators is constituted to be longer than a total operation length obtained by adding up operation lengths of the plurality of first phase modulators.

26. The optical modulator according to claim 25, wherein a total electrode length obtained by adding up lengths of said plurality of second discrete electrodes is constituted to be longer than a total electrode length obtained by adding up lengths of said plurality of first discrete electrodes.

27. The optical modulator according to claim 25, wherein an average value of the respective operation lengths of the plurality of second phase modulators is constituted to be larger than an average value of the respective operation lengths of the plurality of first phase modulators.

28. The optical modulator according to claim 25, wherein an average value of the respective lengths of said plurality of second discrete electrodes is constituted to be larger than an average value of the respective lengths of said plurality of first discrete electrodes.

29. The optical modulator according to claim 25, wherein a total number of said second discrete electrodes is constituted to be larger than a total number of said first discrete electrodes.

30. The optical modulator according to claim 25,
wherein said first line electrode is a signal side slot line electrode,
wherein said second line electrode is a ground side slot line electrode,
wherein said first discrete electrode is a signal side discrete electrode,
wherein said second discrete electrode is a ground side discrete electrode,
wherein said first phase modulator is a signal side phase modulator, and
wherein said second phase modulator is a ground side phase modulator.

31. An optical modulator, comprising:
a first and a second optical waveguides formed by InP related materials and constituting an optical interference unit;
a first line electrode formed at a side of said first optical waveguide;
a second line electrode formed at a side of said second optical waveguide and having wider width than the first line electrode;
a plurality of first discrete electrodes discretely formed on said first optical waveguide and connected to said first line electrode; and
a plurality of second discrete electrodes discretely formed on said second optical waveguide and connected to said second line electrode,
wherein in a case of a drive condition that optical output becomes small when an absolute value of applied voltage of a negative sign applied to said second discrete electrodes is made large, with a total electrode length obtained by adding up respective lengths of said plurality of second discrete electrodes set as LG, a total electrode length obtained by adding up respective lengths of said plurality of first discrete electrodes set as LS, and an electrode length asymmetry parameter set as r=(LG−LS)/(LG+LS), a value of the electrode length asymmetry parameter r is constituted to be within a range of 0.05 to 0.17.

32. An optical modulator, comprising:
a first and a second optical waveguides formed by InP related materials and constituting an optical interference unit;
a first line electrode formed at a side of said first optical waveguide;
a second line electrode formed at a side of said second optical waveguide and having wider width than said first line electrode;
a plurality of first discrete electrodes discretely formed on said first optical waveguide and connected to said first line electrode; and
a plurality of second discrete electrodes discretely formed on said second optical waveguide and connected to said second line electrode,
wherein in a case of a drive condition that optical output becomes large when an absolute value of applied voltage of a negative sign applied to said second discrete electrodes is made large, with a total electrode length obtained by adding up respective lengths of said plurality of second discrete electrodes set as LG, a total electrode length obtained by adding up respective lengths of said plurality of first discrete electrodes set as LS, and an electrode length asymmetry parameter set as r=(LG−LS)/(LG+LS), a value of the electrode length asymmetry parameter r is constituted to be within a range of 0.17 to 0.36.

33. The optical modulator according to claim 25, wherein a part having a same layer constitution on a core layer constituting said first and second optical waveguides as a layer constitution of a part provided with either said first discrete electrode or said second discrete electrode is partially included in a part of said first optical waveguide without being provided with said first discrete electrode, or a part of said second optical waveguide without being provided with said second discrete electrode.

34. An optical modulator, comprising:
a first and a second optical waveguides formed by InP related materials and constituting an optical interference unit;
a first line electrode formed at a side of said first optical waveguide;
a second line electrode formed at a side of said second optical waveguide and having wider width than said first line electrode;
a plurality of first discrete electrodes discretely formed on said first optical waveguide and connected to said first line electrode; and
a plurality of second discrete electrodes discretely formed on said second optical waveguide and connected to said second line electrode,
wherein an light confinement factor of said second optical waveguide is constituted to be larger than a light confinement factor of said first optical waveguide.

35. The optical modulator according to claim 34, wherein a width of said first optical waveguide provided with said first discrete electrode is constituted to be narrower than a width of said second optical waveguide provided with said second discrete electrode.

36. The optical modulator according to claim 35, wherein the width of said first optical waveguide is constituted to be narrower than 1 μm.

37. The optical modulator according to claim 25, wherein said first discrete electrode and said second discrete electrode are constituted so that positions of at least one end portions are aligned.

38. The optical modulator according to claim 25, wherein said first and second optical waveguides are constituted to include a structure with a conductive semiconductor clad layer, an insulating semiconductor core layer and a conductive semiconductor clad layer formed in layers in sequence.

39. The optical modulator according to claim 25, wherein said first and second optical waveguides are formed on a conductive semiconductor layer having a DC bias electrode pad connected thereto and supplied with DC bias voltage.

40. The optical modulator according to claim 25, wherein said first and second optical waveguides are formed on an InP substrate.

41. A manufacturing method of an optical modulator comprising
a first and a second optical waveguides formed by InP related materials and constituting an optical interference unit,
a first line electrode formed at a side of the first optical waveguide,
a second line electrode formed at a side of the second optical waveguide and having wider width than the first line electrode,
a plurality of first discrete electrodes discretely formed on the first optical waveguide and connected to the first line electrode, and
a plurality of second discrete electrodes discretely formed on the second optical waveguide and connected to the second line electrode, comprising the steps of:
setting respective electrode lengths of the first discrete electrode and the second discrete electrode based on a characteristic indicating relationship between a chirp parameter indicating a chirping amount and an electrode length asymmetry parameter indicating asymmetry property of the electrode length; and
manufacturing the optical modulator so that the respective electrode lengths of the first discrete electrode and the second discrete electrode become the respective set electrode lengths.

42. The manufacturing method of an optical modulator according to claim 41, wherein the respective electrode lengths of the first discrete electrode and the second discrete electrode are set so that a value of the electrode length asymmetry parameter r is within a range of 0.05 to 0.17 in a case of a drive condition that optical output becomes small when an absolute value of applied voltage of a negative sign applied to the second discrete electrode is made large, with a total electrode length obtained by adding up respective lengths of the plurality of second discrete electrodes set as LG, a total electrode length obtained by adding up respective lengths of the plurality of first discrete electrodes set as LS, and an electrode length asymmetry parameter set as r=(LG−LS)/(LG+LS).

43. The manufacturing method of an optical modulator according to claim 41, wherein the respective electrode lengths of the first discrete electrode and the second discrete electrode are set so that a value of the electrode length asymmetry parameter r is within a range of 0.17 to 0.36 in a case of a drive condition that optical output becomes large when an absolute value of applied voltage of a negative sign applied to the second discrete electrodes is made large, with a total electrode length obtained by adding up respective lengths of the plurality of second discrete electrodes set as LG, a total electrode length obtained by adding up respective lengths of the plurality of first discrete electrodes set as LS, and an electrode length asymmetry parameter set as r=(LG−LS)/(LG+LS).

44. A manufacturing method of an optical modulator comprising
a first and a second optical waveguides formed by InP related materials and constituting an optical interference unit,
a first line electrode formed at a side of the first optical waveguide,
a second line electrode formed at a side of the second optical waveguide and having wider width than the first line electrode,
a plurality of first discrete electrodes discretely formed on the first optical waveguide and connected to the first line electrode, and
a plurality of second discrete electrodes discretely formed on the second optical waveguide and connected to the second line electrode, comprising the steps of:
setting widths of the first and second optical waveguides based on a characteristic indicating relationship between a chirp parameter indicating a chirping amount and the width of the optical waveguide; and
manufacturing the optical modulator so that the respective widths of the first and second optical waveguides become the respective set widths.

* * * * *